US007058539B2

(12) United States Patent
Fujita et al.

(10) Patent No.: US 7,058,539 B2
(45) Date of Patent: Jun. 6, 2006

(54) DEVICES RELATING TO ROLLED PRODUCT

(75) Inventors: Taijiro Fujita, Kanagawa (JP);
Masayuki Nakagiri, Shizuoka-ken (JP);
Takehiko Nakayama, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/024,447

(22) Filed: Dec. 30, 2004

(65) Prior Publication Data
US 2005/0125198 A1 Jun. 9, 2005

Related U.S. Application Data

(62) Division of application No. 10/191,454, filed on Jul. 10, 2002, now Pat. No. 6,857,359.

(30) Foreign Application Priority Data

| Jul. 12, 2001 | (JP) | .............................. 2001-212170 |
| Jul. 27, 2001 | (JP) | .............................. 2001-227904 |
| Sep. 7, 2001 | (JP) | .............................. 2001-271504 |
| Sep. 10, 2001 | (JP) | .............................. 2001-273433 |

(51) Int. Cl.
*B41F 17/00* (2006.01)
*G06F 11/00* (2006.01)

(52) U.S. Cl. ........................................ 702/157; 101/73
(58) Field of Classification Search ................ 101/73; 702/97, 157, 158; 242/534.2, 390.1, 564.1, 242/534
See application file for complete search history.

(56) References Cited

U.S. PATENT DOCUMENTS

| 2,692,074 | A | | 10/1954 | Mueller et al. |
| 3,889,444 | A | | 6/1975 | Davis et al. |
| 4,052,599 | A | * | 10/1977 | Whiteley et al. .............. 702/97 |
| 4,593,643 | A | | 6/1986 | Saviolo |
| 4,817,883 | A | * | 4/1989 | Hoffmann et al. .......... 242/534 |
| 4,823,538 | A | | 4/1989 | Takamura |
| 4,884,504 | A | | 12/1989 | Sillars |
| 5,547,501 | A | | 8/1996 | Maruyama et al. |
| 5,570,632 | A | | 11/1996 | Cumens et al. |
| 5,856,048 | A | | 1/1999 | Tahara et al. |
| 5,945,595 | A | * | 8/1999 | Mori et al. .................... 73/105 |
| 5,953,127 | A | | 9/1999 | Washio et al. |
| 6,629,659 | B1 | * | 10/2003 | Innala et al. .............. 242/413.5 |
| 2004/0034980 | A1 | * | 2/2004 | Pollkoetter ............... 29/407.05 |

OTHER PUBLICATIONS

Machine translation of JP 08259115 to Ishida from Japanese Patent Office website.

(Continued)

*Primary Examiner*—Hal Wachsman
*Assistant Examiner*—Paul Kim
(74) *Attorney, Agent, or Firm*—Sughrue Mion, PLLC

(57) ABSTRACT

A code applying device is provided which can efficiently manufacture an information recording paper roll having a code relating to the information recording paper. The code applying device includes a tubular body holding section which holds a tubular body and can rotate around an axis; a code forming section forming a code, which expresses specific information, on an end surface of the tubular body held by the tubular body holding section; and a control section rotating the tubular holding section which is holding the tubular body, and applying the code to the end surface of the tubular body along a peripheral direction.

11 Claims, 62 Drawing Sheets

OTHER PUBLICATIONS

Japanese Abstract No. 200109267, dated Apr. 18, 2000.
Japanese Abstract No. 04323544, dated Nov. 12, 1992.
Japanese Abstract No. 05280967, dated Oct. 29, 1993.
Japanese Abstract No. 63237970, dated Oct. 4, 1988.

* cited by examiner b: BIT

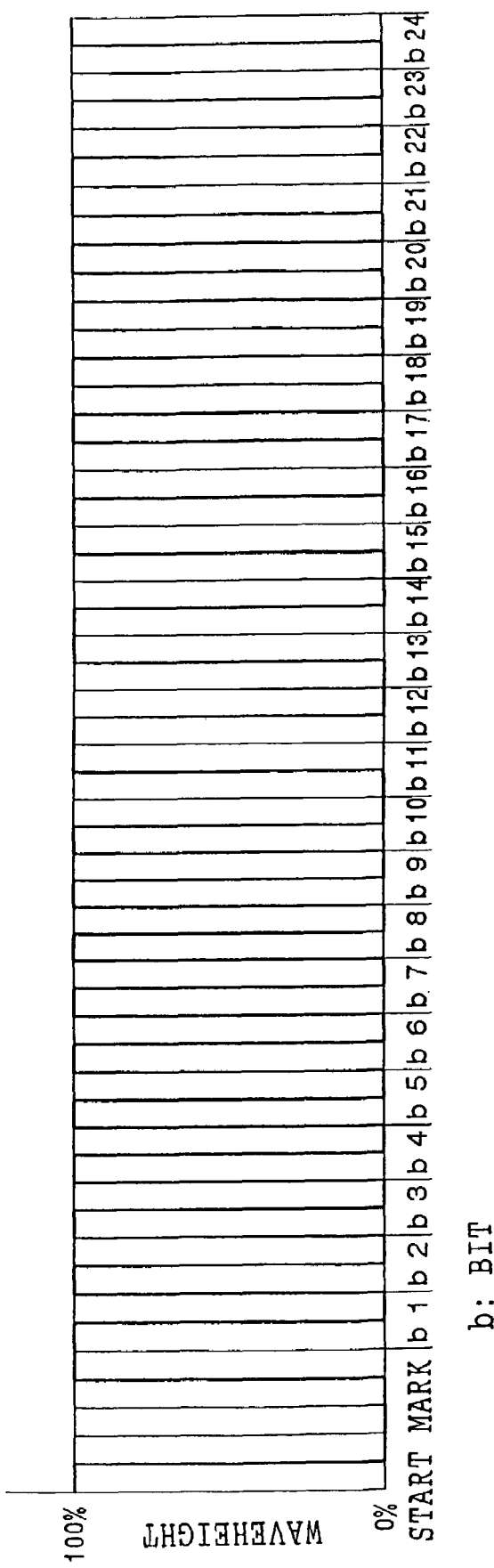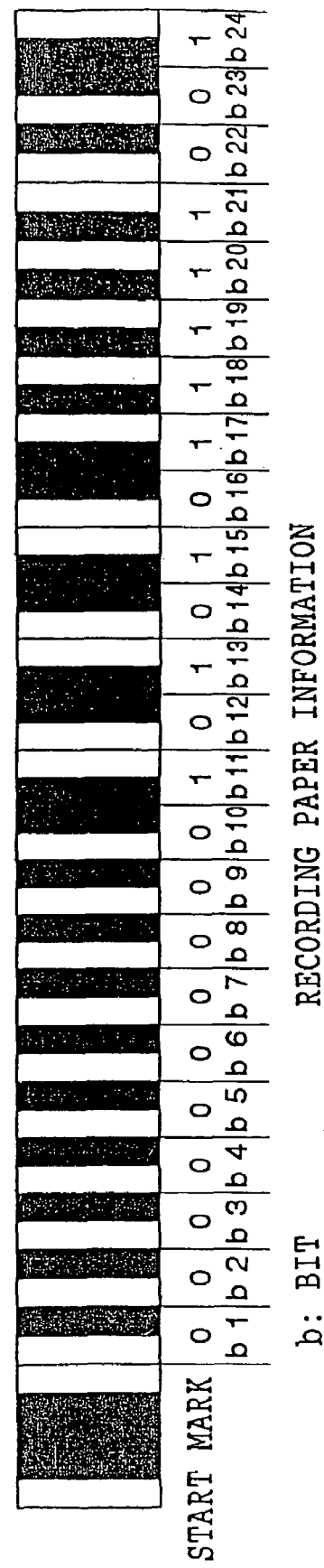

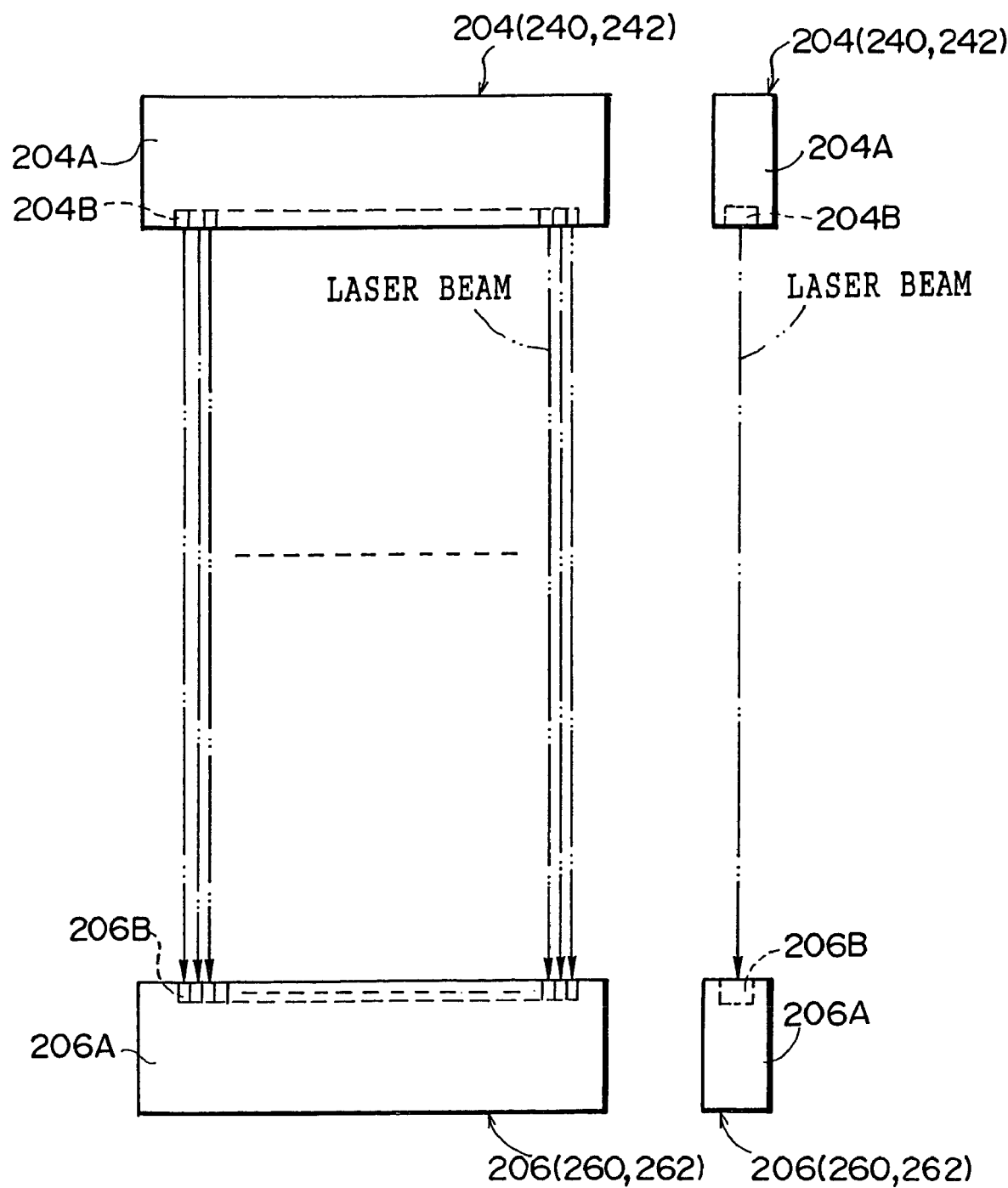

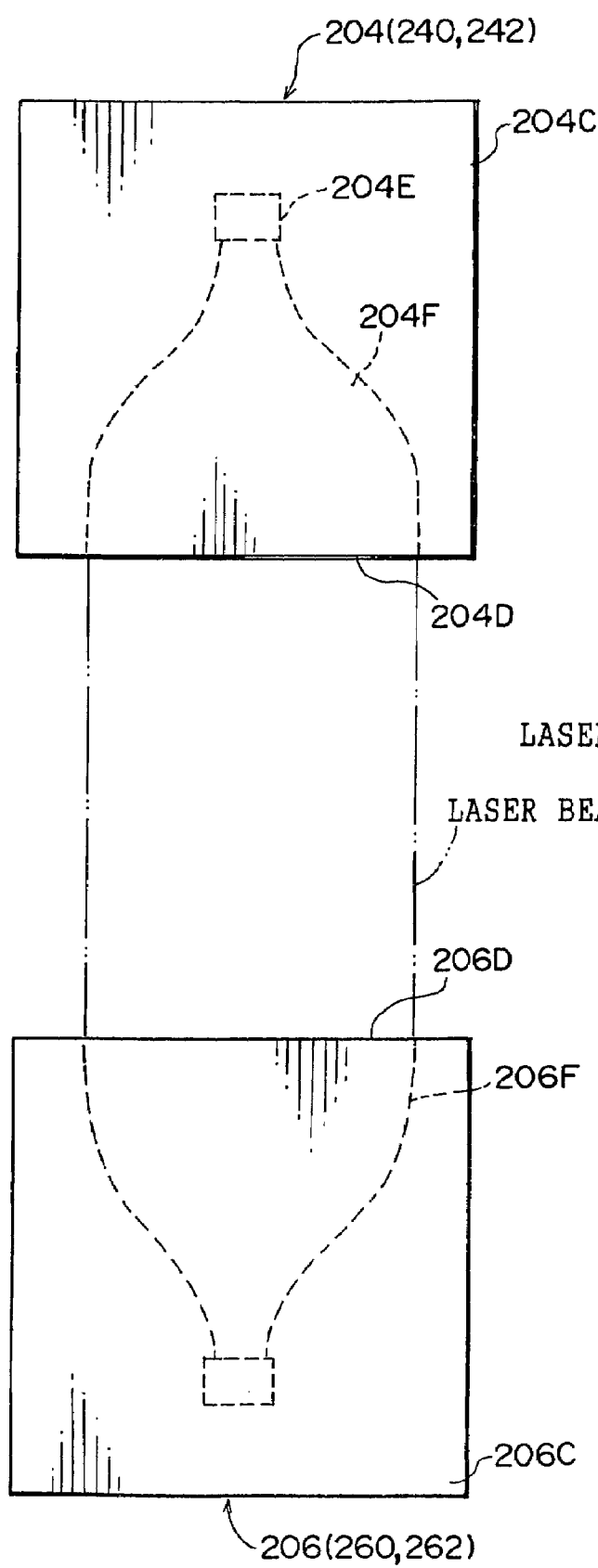
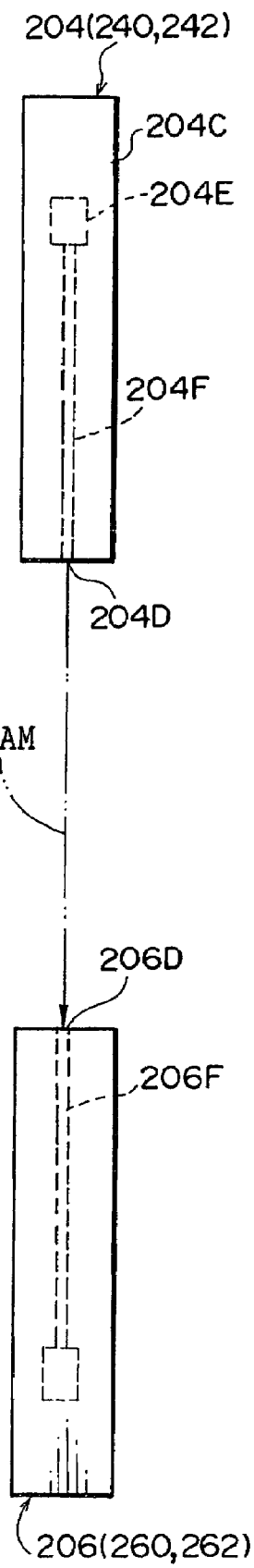

LASER BEAM

LASER BEAM

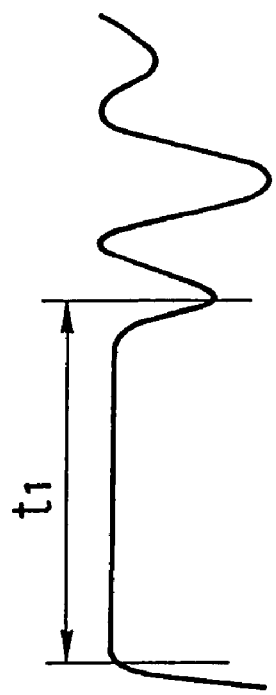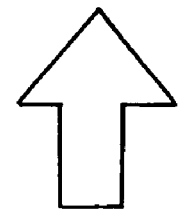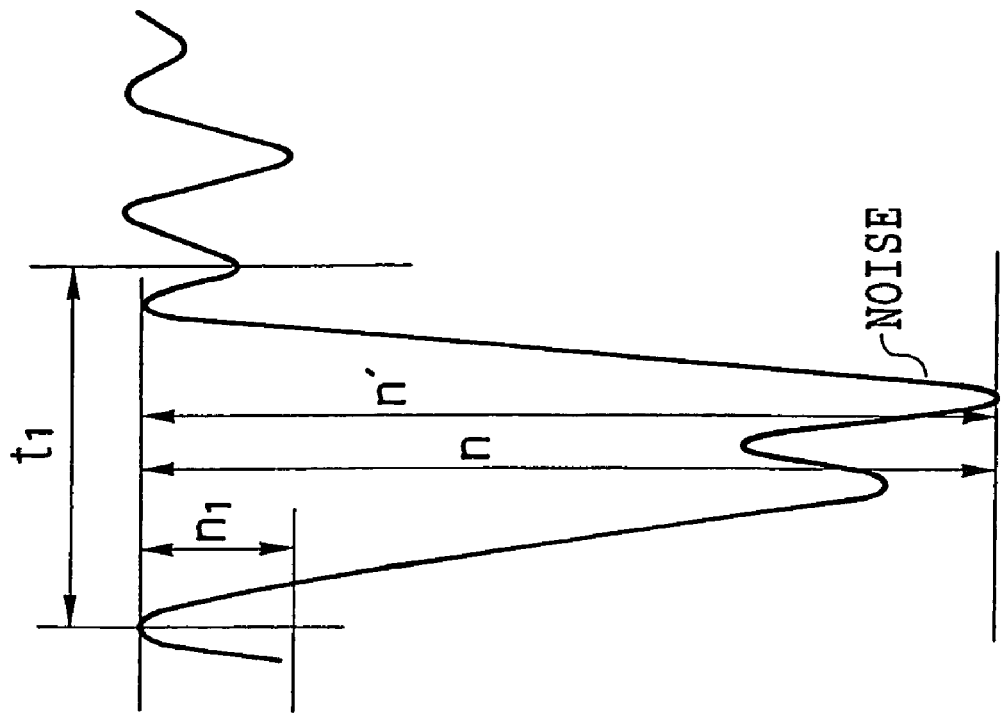
FIG.38A FIG.38B

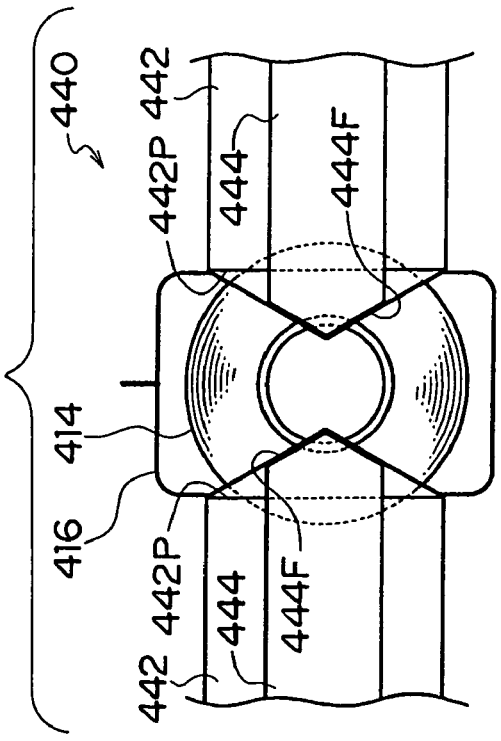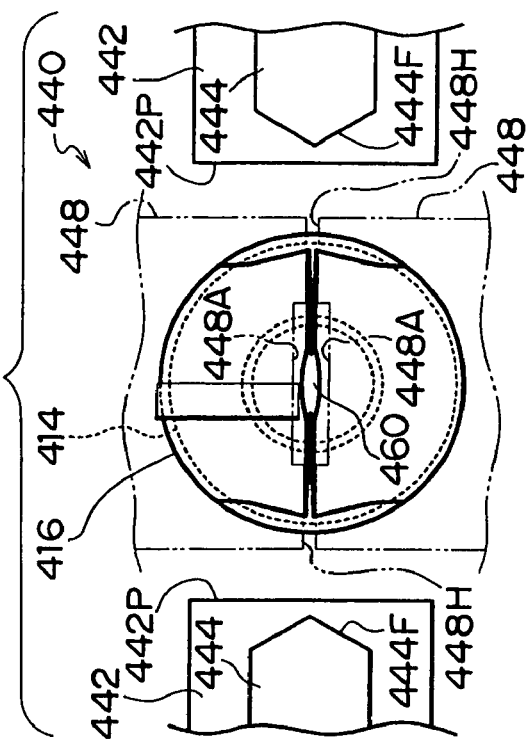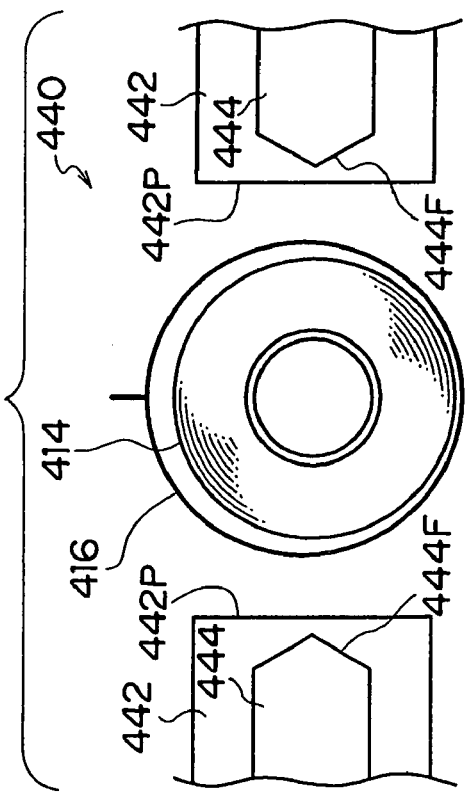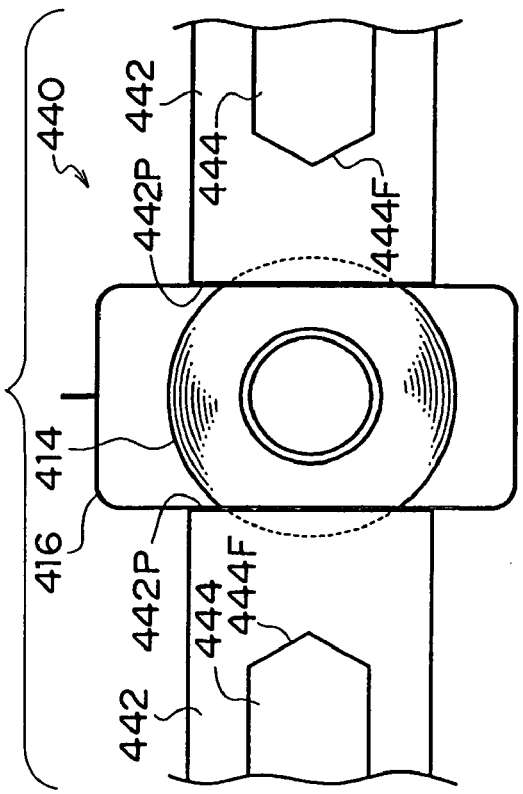

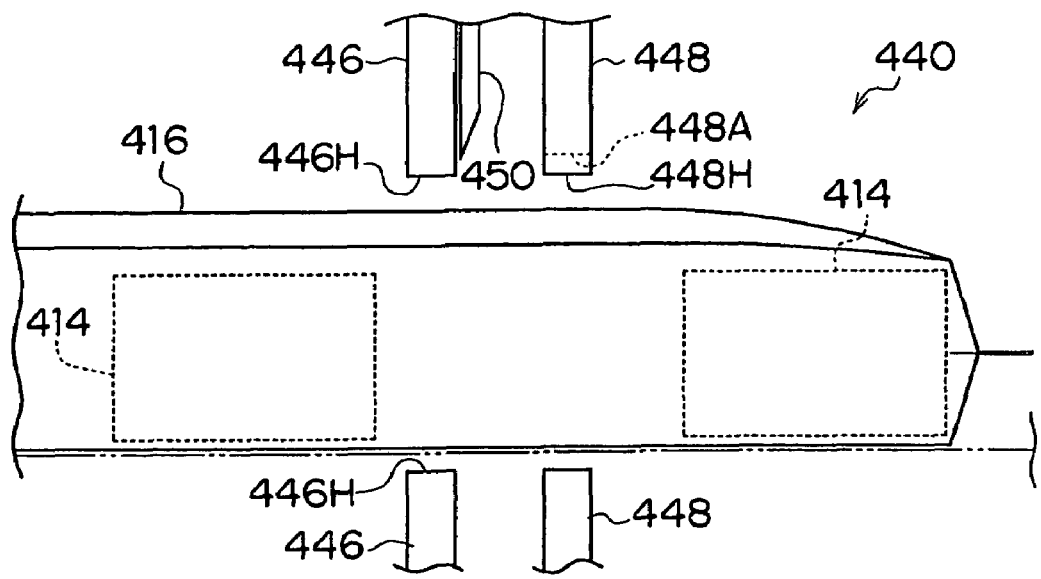
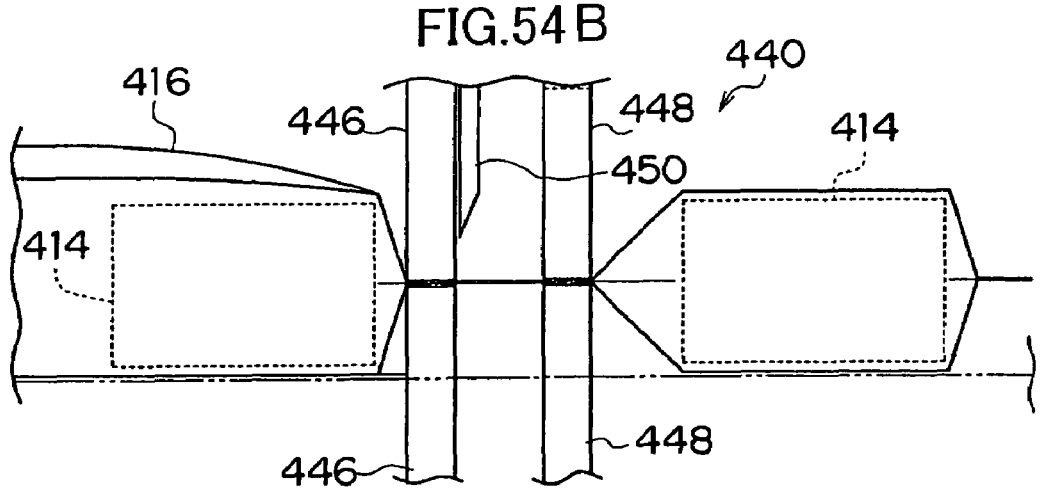
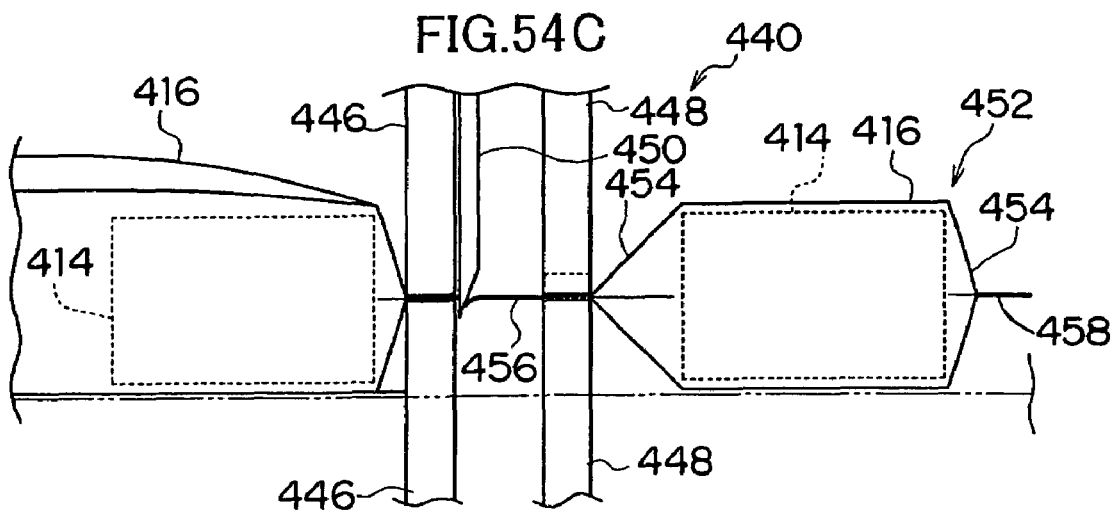

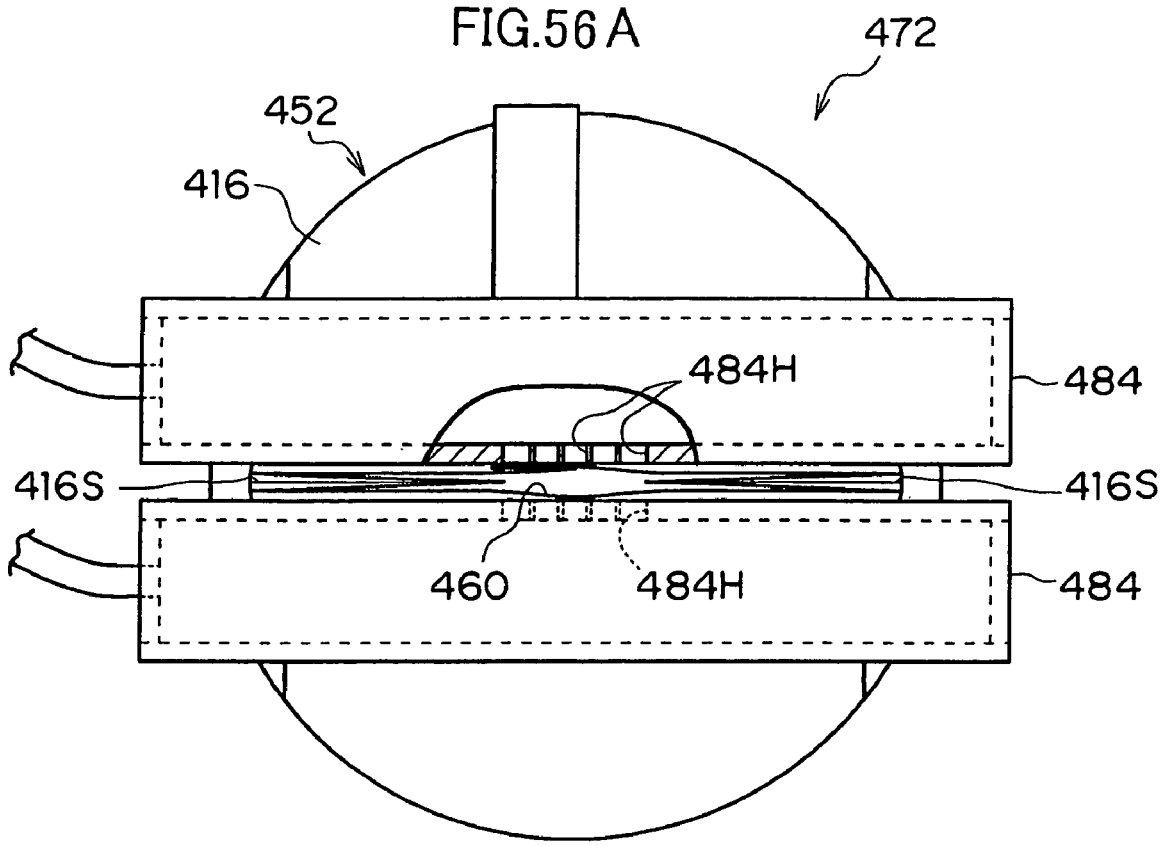
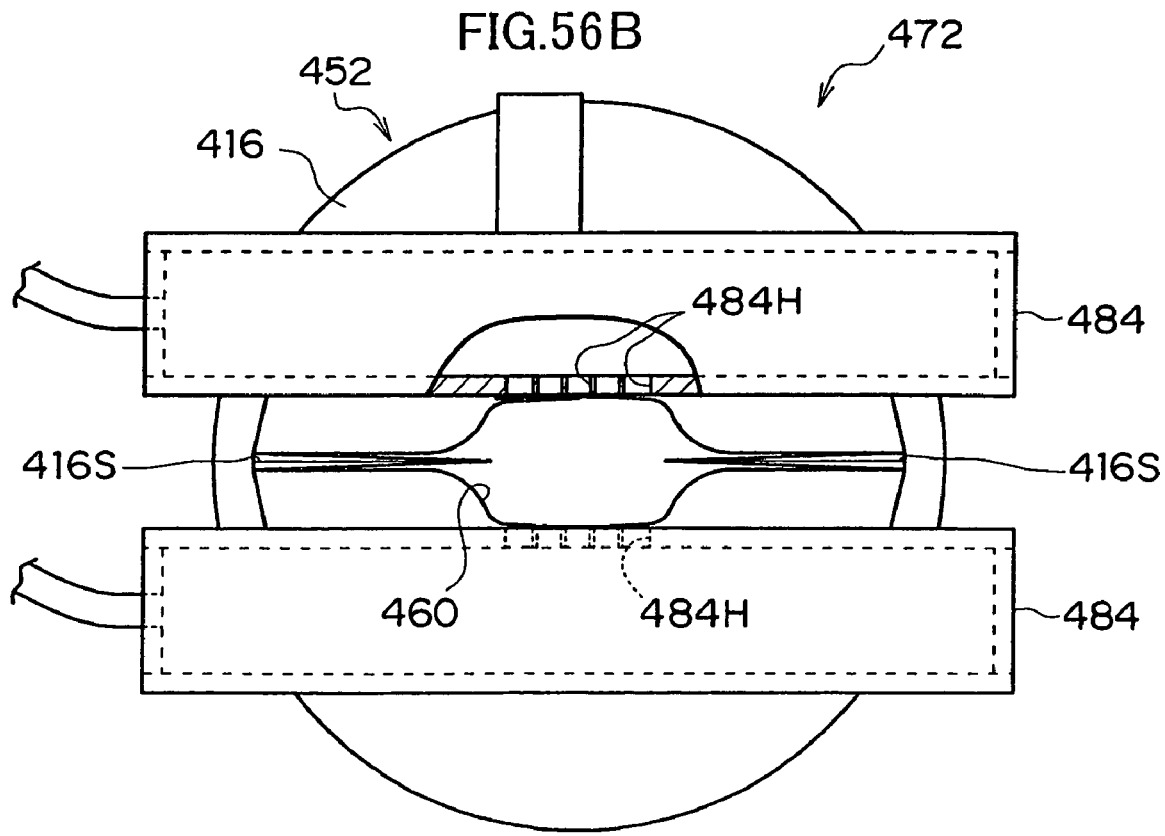

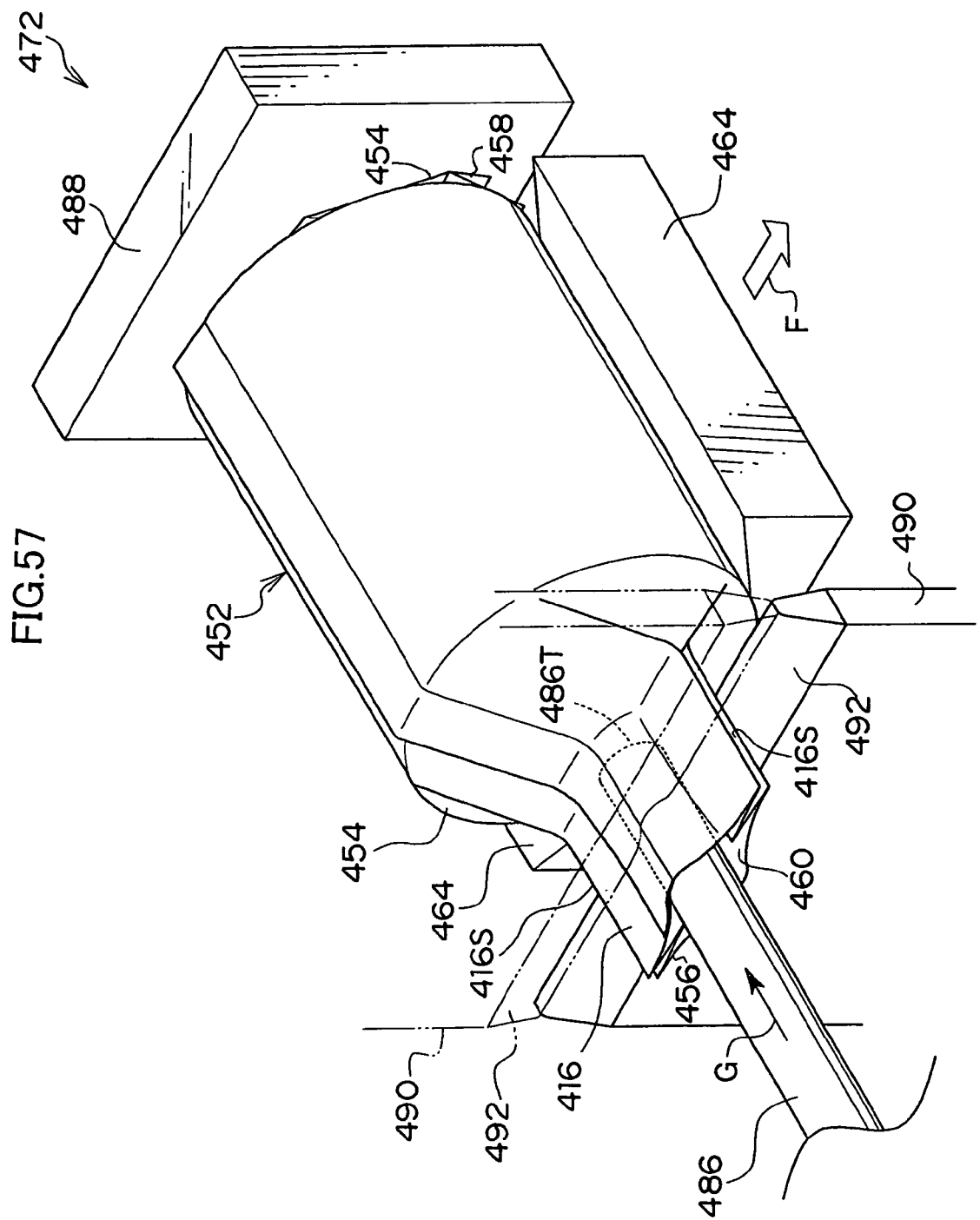

DEVICES RELATING TO ROLLED PRODUCT

This is a divisional of application Ser. No. 10/191,454 filed Jul. 10, 2002 now U.S. Pat. No. 6,857,359, the contents of which are incorporated herein by reference

BACKGROUND OF THE INVENTION

1. Field of the Invention

The present invention relates to a code applying device, and in particular, to a code applying device which automatically applies a code, which expresses information relating to an information recording paper, to an end surface of a paper tube around which any of various types of information recording papers is wound in roll form, and which completely and continuously examines whether the paper tube to which the code is applied is good or not, so as to automatically classify paper tubes into good articles and poor articles.

The present invention also relates to a dimension measuring device, and in particular, to a dimension measuring device which can completely and efficiently examine the dimension between both end surfaces of a tubular body such as an information recording paper roll or the like.

Moreover, the present invention relates to a roll winding offset measuring device, and in particular, to a device which can totally and completely automatically examine a winding offset amount of a roll which is formed by winding a strip-like sheet such as a heat-sensitive type color recording paper (TA paper) onto a winding core such as a paper tube or the like.

The present invention also relates to a deaerating/packaging method and a deaerating/packaging device.

2. Description of the Related Art

Prior Art 1

An information recording paper roll, in which any of various types of information recording paper is wound in a roll form on a winding core such as a paper tube, is used in an information device such as a printer or the like.

There are heat-sensitive type information recording papers, pressure-sensitive type information recording papers, electrostatic recording type information recording papers and the like, as well as various types of information recording papers which form color on the basis of the principles of color formation.

There are various types of heat-sensitive type information recording papers as well, such as those which only form a single color such that only a variable density image can be formed, as well as those which have heat-sensitive color forming layers corresponding to the three primary colors, and which, when heated, can form a color image, and those at which an adhesive layer is formed at the surface at the side opposite the heat-sensitive color forming layers so as to be able to be adhered to another object. Further, there are various color forming temperatures and thicknesses of the information recording papers as well.

In this way, because there is a large variety of information recording papers, there has been the demand to apply an identification code by some type of method onto the information recording paper roll, and to prevent errors in installing the information recording paper roll at a printer.

An example of an information recording paper roll which satisfies this demand is an information recording paper roll which has been proposed by the present applicant, and in which "a sheet-shaped information recording paper is wound on a base body having a tubular cross-section, and an identification mark, which expresses information relating to the information recording paper and which is formed by an infrared ray absorbent dye, is provided on at least one end surface of the base body" (Japanese Patent Application Laid-Open (JP-A) No. 2000-344424).

Prior Art 2

Heat-sensitive type color recording papers (hereinafter called "TA papers"), which, when heated, generate color so as to form a color image, have come to be widely used in recent years.

A TA paper is usually sold as a small roll wound on a paper tube, and is usually installed into an image recording device for TA papers. The small roll is usually manufactured in a roll wind-up device in accordance with the processes of winding a strip-shaped original web of TA paper onto a paper tube, and when a predetermined length of the original plate is wound onto the paper tube, cutting the original plate, and fastening the cut portion by a seal or a label or the like.

However, when winding offset arises at the TA paper wound on the paper tube, non-aligned portions are formed at the side surfaces of the obtained small roll. The dimension of the small roll along the axial direction, i.e., the width of the small roll, becomes greater than the width of the TA paper itself. When an attempt is made to install such a small roll into an image recording device for TA papers, it is easy for trouble to arise in the feeding of the TA paper.

Accordingly, there is the need for quality control to ensure that the width of the small roll is a given value or less.

In carrying out such quality control to ensure that the width of the small roll is a given value or less, it is desirable to completely examine the width of the small roll on which the TA paper is wound in the roll wind-up device.

A width measuring device, which has a contact element contacting the end surface of the article, and which determines the width of the article from an original standby position and a position at the time of contact with the article, is known as a device for completely examining the width of a rolled article such as a small roll:

However, usually, glue is applied to the reverse surface of the TA paper so that the TA paper can be adhered to another article after image formation. Thus, there are cases in which the glue protrudes out from the end surfaces of the small roll.

Therefore, when the width measuring device is used and the contact element is made to contact the end surface of a small roll to measure the width, the glue protruding out from the end surface of the small roll adheres to the contact element. Thus, there is the concern that a problem will arise in that, when the width of the next small roll is measured, the glue adhering to the contact element will be applied to the end surface of this next small roll such that this next small roll will be dirtied. Further, there is the concern that a problem will arise in that an error corresponding to the dimension of the glue will arise and it will not be possible to carry out accurate measurement. There is also the fear that, when the pressure by which the contact element is made to contact the small roll is excessively large, the article will be damaged or deformed.

Prior Art 3

When a TA paper is wound-up on a paper tube, offset may arise between one layer of the TA paper and another layer which is above and adjacent to this one layer, such that winding offset, in which the TA paper projects circumferentially from the paper tube end surfaces of the small roll, may arise. If winding offset arises, indentations and projections along the circumferential direction arise at the end surfaces of the small roll, and the apparent width of the small roll increases.

When marked winding offset arises at the small roll and the number of and projected height of the TA paper, which projects in the circumferential direction from the paper tube end surfaces of the small roll, increase, the apparent width of the small roll increases, and there is a high possibility that poor conveying of the TA paper, such as jamming or the like within an image recording device for TA papers, will occur.

Accordingly, there is the need for quality control to ensure that the magnitude of the winding offset of the small roll is a given value or less.

In carrying out such quality control of the small roll to ensure that the winding offset is a given value or less, it is desirable to completely examine the magnitude of the winding offset of the small roll in the roll wind-up device.

A displacement measuring device is known as a device for completely examining the presence/absence and the magnitude of a non-uniformity such as winding offset or the like at the end surface of a roll such as a small roll. The displacement measuring device has a contact element which contacts the end surface of an article, and measures the magnitude of displacement from a reference plane of the non-uniform portion at the article from the displacement between an original standby position and a position at the time the contact element contacts the roll.

However, usually, an adhesive is applied to the reverse surface of the TA paper so that the TA paper can be adhered to another article after image formation. Thus, there are cases in which the adhesive protrudes out from the end surfaces of the small roll.

Accordingly, when the contact element is made to contact the end surface of one small roll to measure the displacement of the non-uniform portion, the adhesive which protrudes out from the end surface of the one small roll adheres to the contact element. There is the concern that a problem will arise in that, when the displacement of the non-uniform portion of the next small roll is measured, the adhesive adhering to the contact element will be applied to the end surface of this next small roll such that this next small roll will be dirtied. Further, there is the concern that a problem will arise in that an error corresponding to the coated thickness of the adhesive will arise and it will not be possible to carry out accurate measurement. There is also the fear that, when the pressure by which the contact element is made to contact the small roll is excessively large, the roll will be damaged or deformed.

Prior Art 4

Deaerating/packaging methods and deaerating/packaging devices for deaerating and packaging an object-to-be-packaged have been conventionally proposed. FIG. 62 shows an example of such a deaerating/packaging device (see JP-A No. 6-191511).

In a deaerating/packaging device 602, a film 604 is made into a tube-shaped film 608 by a heating roll 606. While objects-to-be-packaged 610 are slid on the top surface of a pipe nozzle 612, air within the film is sucked by the pipe nozzle 612. Thereafter, the film is cross-sealed at uniform cycles by sealing bars 614.

However, in such a deaerating/packaging device 602, structurally, spaces arise between the respective objects-to-be-packaged 610, and between the pipe nozzle 612 and the object-to-be-packaged 610. Because the film size is large with respect to the object-to-be-packaged 610, and because it is difficult to reliably suction even the air in the spaces, it is difficult to form a so-called tight deaerated package (a package in which the film is fit tightly to the object-to-be-packaged).

In order to make the space between the pipe nozzle 612 and the object-to-be-packaged 610 smaller, for example, it has been thought to make the pipe nozzle 612 thinner. However, a fixed length of the pipe nozzle 612 is needed in the structure of the deaerating/packaging device shown in FIG. 62. Thus, if the pipe nozzle 612 is made thin, the rigidity decreases, and the pipe nozzle 612 becomes easy to deform. If the pipe nozzle 612 contacts the object-to-be-packaged 610 due to deformation, there are cases in which the pipe nozzle 612 may scratch the object-to-be-packaged 610. Thus, there are limits to making the pipe nozzle 612 thinner, and it is difficult to obtain a tight package.

SUMMARY OF THE INVENTION

An object of the present invention is to provide a code applying device which can efficiently manufacture an information recording paper roll to which a code is applied, by applying an identification mark (i.e., a code) to abase (i.e., a winding core) used in forming an information recording paper roll, and simultaneously, totally examining whether the roll is good or poor so as to automatically eliminate poor articles.

Another object of the present invention is to provide a dimension measuring device which can measure, without contact, the width of a tubular article, and accordingly, even if the article is an article in which glue protrudes out from end surfaces thereof such as in the case of a small roll, can measure the article automatically and with high precision, without dirtying, damaging, or deforming the article.

Yet another object of the present invention is to provide a roll winding offset measuring device which can measure, without contact, displacement at the end surface of a roll, and accordingly, even if the roll is a roll in which an adhesive protrudes out from end surfaces thereof such as in the case of a small roll, can measure the absence/presence and magnitude of the winding offset automatically and with high precision, without dirtying, damaging, or deforming the roll.

Still yet another object of the present invention is to provide a deaerating/packaging method and deaerating/packaging device which can package an object-to-be-packaged (e.g., a product in a roll-form) with a packaging material being tightly fit thereto, and which can prevent damage to the object-to-be-packaged.

A first aspect of the present invention is a code applying device comprising: a tubular body holding device which can hold a tubular body, and can drive and rotate the tubular body around an axis of the tubular body; a device applying a code, which expresses specific information, to an end surface of the tubular body; and a control device controlling rotation of the tubular body and application of the code.

A code can efficiently be applied to the end surface of a tubular body such as the winding core of an information recording paper roll or the like. Thus, the winding core of the information recording paper roll disclosed in JP-A No. 2000-344424 can be manufactured efficiently.

The tubular body to which the code can be applied may be a tubular body whose both ends are open, or a solid cylindrical body whose both ends are closed.

An example of the tubular body is the winding core of an information recording paper roll, or the like.

Examples of the solid cylindrical body are a metal plate roll such as a hot coil on which a rolled steel plate is wound in roll-form, various types of solid-cylindrical containers, and the like.

The code may be, as disclosed in publications, any of various types of graphics, characters, numbers, and symbols. However, it is particularly preferable that the code is a barcode type optically readable code in which light absorbent sections, which are substantially rectangular or fan-shaped and which absorb light of a specific wavelength, and light reflecting sections, which are substantially rectangular or fan-shaped and which reflect the light, are arranged in an annular form.

An example of the optically readable code is an infrared ray readable code which will be described later, or the like.

The optically readable code may be formed by printing or the like. Or, light absorbent sections or light reflecting sections may be formed by an adhesive tape having a surface which absorbs or reflects light.

In a case in which the tubular body is a winding core of an information recording paper roll, an example of the information which can be expressed by the code is information relating to the information recording paper wound on the winding core.

In a case in which the tubular body is a metal plate coil, examples of the information which can be expressed by the code are the material of the metal plate, the length of the metal plate, the manufacturer, the manufacturing factory, the distribution code, and the like.

In a case in which the tubular body is a tubular container, examples of the information which can be expressed by the code are the type of contents, the amount thereof, the manufacturing date, the manufacturer, the manufacturing factory, the distribution code, and the like.

A non-contact type printer such as a jet printer, a laser printer, a sublimation type heat transfer printer, or the like is preferably used as the code forming device. However, a contact type printer such as a heat transfer type printer or an impact type printer or the like may be used.

A desktop computer, a sequencer or the like can be used as the control device.

In a second aspect of the present invention, the device of the first aspect further comprises a code examining device which examines whether the code applied to the end surface of the tubular body correctly expresses the specific information.

Because the tubular body, to which the code is applied, can be totally examined automatically, the work of an operator carrying out examination can be eliminated.

An example of the code examining device is a code examining device which reads the code applied to the end surface of the tubular body, converts the read code into a digital code signal which will be described later, compares the digital code signal with the information which the code is to express, and only in cases in which both completely match, the code examining device judges the tubular body to be a good article, and when there are portions where the two differ even slightly, the code examining device judges the tubular body to be a poor article.

In a third aspect of the present invention, the device of the second aspect further comprises a tubular body classifying device which, on the basis of results of examination by the code examining device, classifies the tubular body as one of a good article and a poor article.

Not only is the tubular body, to which the code is applied, totally examined automatically, but also, poor articles can be excluded automatically. Thus, the code applying device of the third aspect is even more labor-saving than that of the second aspect.

A fourth aspect of the present invention is a code applying device comprising: a turret having a turret shaft, and a rotating surface which is rotatable around the turret shaft; a tubular body holding device mounted to the turret rotating surface, and able to hold a tubular body, and able to drive and rotate the tubular body around an axis of the tubular body; a tubular body installing device installing the tubular body in the tubular body holding device; a code forming device forming a code, which expresses specific information, on an end surface of the installed tubular body; a control device controlling rotation of the tubular body and application of the code; a code examining device examining whether the code, which is formed on the end surface of the tubular body, correctly expresses the specific information; a tubular body removing device for removing the tubular body from the tubular body holding device; and a tubular body classifying device which, on the basis of results of examination by the code examining device, classifies the removed tubular body as one of a good article and a poor article.

In addition to the advantages of the code applying device of the third aspect, the code applying device of the fourth aspect has the advantage that, because the overall length thereof can be made shorter, the code applying device can be extremely easily incorporated into a production line.

In a fifth aspect of the present invention, the tubular body is a winding core for winding of a strip-shaped information recording paper, and the code is an information code expressing information relating to the information recording paper.

Examples of the information recording paper are a color heat-sensitive recording paper which generates color upon application of heat so as to form a color image, a monochrome heat-sensitive recording paper which generates color upon application of heat so as to form a black-and-white image, pressure-sensitive recording paper, electrostatic recording paper, and the like.

Examples of information expressed by the information code are information relating to quality control such as the expiration date, the manufacturing date, the lot number, the manufacturing factory, and the like of the information recording paper; information relating to the prevention of installation errors such as whether or not a device such as a printer or the like into which the information paper is to be installed is compatible or the like, whether the recording surface is on the reverse side or the front side, the paper width, the wound length, whether tacking processing has been carried out or not, and the like; information for enabling information recording under optimal conditions such as the color forming sensitivity, the color forming characteristic, and the like; and the like.

In a sixth aspect of the present invention, the device of the fifth aspect further comprises an input device for inputting the information relating to the information recording paper.

In a case in which the code is applied to a winding core for example, when the lot or the type or the like of the information recording paper roll wound on the winding core changes, a new code can be applied to the winding core by inputting, from an input device, information relating to the new lot or type.

Accordingly, the code applying device can flexibly correspond to low volume production of various types of articles.

Examples of the input device are a touch panel input device by which information is inputted by an operator pressing a touch panel with his/her fingers, a ten-key, the keyboard of a desktop computer, and the like. However, the input device is not particularly limited to a touch panel, a ten-key, a keyboard, or the like, provided that characters, numbers and symbols can be inputted.

In a seventh aspect of the present invention, the code is an optically readable code formed from an arrangement of light absorbent sections, which absorb light of a specific wavelength, and light reflecting sections, which reflect the light.

Because the optically readable code can be read optically, reading can be carried out without contact, and further, the reading speed is fast. Accordingly, examination can be carried out efficiently.

Examples of the optically readable code are a visible light readable code formed from an arrangement of visible light absorbent sections which absorb visible light and visible light reflecting sections which reflect visible light; an infrared ray readable code formed from an arrangement of infrared ray absorbent sections which absorb infrared rays and infrared ray reflecting sections which reflect infrared rays; an ultraviolet light readable code formed from an arrangement of ultraviolet light absorbent sections which absorb ultraviolet light and ultraviolet light reflecting sections which reflect ultraviolet light; and the like.

Among the optically readable codes, infrared ray readable codes and ultraviolet light readable codes are preferable because it is possible to easily prevent unauthorized copies or alteration by ordinary copy machines due to the fact that all of the sections are a color of a single hue, e.g., black, violet, dark blue, or the like.

In an eighth aspect of the present invention, the device of the seventh aspect further comprises a digital signal converting device converting inputted information into a digital input signal, and outputting the digital input signal to a code forming device, wherein the code forming device converts the digital input signal to an arrangement of light reflecting sections and light absorbent sections to form the optically readable code.

The information inputted from the input device is, at a digital signal converting device, converted into a digital input signal formed from an arrangement of 1s and 0s, and the digital input signal is outputted to a code forming device. At the code forming device, the digital input signal is converted into an optically readable code. Then an arrangement of light reflecting sections and light absorbent sections of an optically readable code can be determined by making the light reflecting sections correspond to the 1s of the digital input signal and making the light absorbent sections correspond to the 0s of the digital input signal.

The optically readable code is formed as an aggregate of unit arrangements which are an arrangement of one light reflecting section and one light absorbent section. Among the unit arrangements, a first unit arrangement, which is formed by one light reflecting section and one light absorbent section which is after and adjacent to the one light reflecting section, may be made to correspond to the 1 of the digital input signal. A second unit arrangement, which is formed by one light absorbent section and one light reflecting section which is after and adjacent to the one light absorbent section, may be made to correspond to the 0 of the digital input signal. Here, "before" and "after" mean "before" and "after" with respect to the direction in which the code is read by the code examining device.

This system is called the Manchester encoding method. The Manchester encoding method is preferable because, even if 1s or 0s are continuous in a digital input signal, when the digital input signal is converted into an optically readable code, there is no instance in which there are three or more consecutive light reflecting sections or light absorbent sections, and errors in reading by a code reader, which will be described later, can be avoided.

In a ninth aspect of the present invention, the optically readable code is an infrared ray readable code formed by infrared ray absorbent sections, which absorbent infrared rays, and infrared ray reflecting sections, which reflect infrared rays.

An infrared ray readable code, which is one example of an optically readable code, is formed on the tubular body.

In a tenth aspect of the present invention, the infrared ray absorbent sections and the infrared ray reflecting sections of the infrared ray readable code have a same hue.

As described above, because the infrared ray readable code is apparently one color, it can be easily identified visually. Further, even if an infrared ray readable code is copied at an ordinary copy machine, only a gray or black ring or strip will show up. Therefore, it is almost impossible to make unauthorized copies by a copy machine.

Further, the external appearance of a tubular body, to whose end surface an infrared ray readable code is applied, is such that a single color is coated on the end surface. The external appearance of a tubular body, to whose side surface an infrared ray readable code is applied, is such that a strip of a single color is drawn on the side surface.

Accordingly, the external appearance of the tubular body at which an infrared ray readable code is formed is not strange.

The infrared ray absorbent sections and the infrared ray reflecting sections can be formed by printing by using an infrared ray absorbent ink and an infrared ray non-absorbent ink, respectively.

The infrared ray readable code can be formed by printing one of the infrared ray absorbent sections and the infrared ray reflecting sections on the tubular body, and then, printing the other of the infrared ray absorbent sections and the infrared ray reflecting sections at the sections where the one of the infrared ray absorbent sections and the infrared ray reflecting sections were not printed. The infrared ray absorbent sections and the infrared ray reflecting sections can be formed by being printed by an infrared ray absorbent ink and an infrared ray non-absorbent ink, respectively.

Further, an infrared ray non-absorbent ink may be coated along the entire periphery of the side surface or the end surface of the tubular body so as to form a base layer, and the infrared ray absorbent sections may be printed on this base layer by an infrared ray absorbent ink.

The infrared ray absorbent ink can be prepared by compounding any of various types of infrared ray absorbents with an ordinary oil-based printing ink formed from a vehicle, a pigment, and a solvent, or with an ordinary water-based printing ink formed from a pigment, a dye, a surfactant, a thickener, a water-based vehicle, and water. Further, an oil-based or water-based printing ink, which is the same color as the infrared ray absorbent ink but which does not contain an infrared ray absorbent, can be used as the infrared ray non-absorbent ink.

The color of the infrared ray readable code is preferably black for the reasons that many infrared ray absorbents which are compounded into infrared ray absorbent inks are black, and it is difficult to visually distinguish the infrared ray absorbent sections and infrared ray reflecting sections, and the like. However, a color other than black may be used.

Further, the infrared ray readable code may be formed by coating an ordinary oil-based paint or water-based paint to form the infrared ray reflecting sections, and coating an infrared ray absorbent paint, in which an infrared ray absorbent has been compounded into an oil-based paint or a water-based paint, so as to form the infrared ray absorbent sections.

As described above, the infrared ray readable code may be formed by adhering an adhesive tape, which absorbs infrared rays, to the end surface of the tubular body to form the infrared ray absorbent sections, instead of forming the infrared ray readable code by printing or applying paint.

In an eleventh aspect of the present invention, the code forming device has: a base layer forming device which forms, on the tubular body, an infrared ray non-absorbent base layer which forms the infrared ray reflecting sections; and an infrared ray absorbent code forming device which forms the infrared ray absorbent sections on the formed base layer.

Among the portions of the infrared ray non-absorbent base layer formed by the base layer forming device, the base layer is exposed at the portions at which the infrared absorbent sections are not formed by the infrared ray absorbent code forming device. The infrared ray reflecting sections are formed thereby.

An infrared ray readable code, in which infrared ray absorbent sections and infrared ray reflecting sections are arranged without spaces or offset, can easily be formed.

Examples of the base layer forming device are a base layer printer which prints a base layer by an infrared ray absorbent ink on the side surface or the end surface of a tubular body, a base layer painting device which coats an infrared ray non-absorbent paint onto the side surface or the end surface of the tubular body, and the like.

Examples of the infrared ray absorbent code forming device are an infrared ray absorbent code printing device which prints infrared ray absorbent ink on the base layer between the infrared ray reflecting sections, and an infrared ray absorbent code coating device which forms infrared ray reflecting sections by coating an infrared ray absorbent paint on the base layer, and the like.

In a twelfth aspect of the present invention, the code examining device has: a code reader which reads the code formed on the tubular body, and converts the read code to a digital code signal formed from an arrangement of 0s and 1s, and outputs the digital code signal; and a comparing/judging device which compares the outputted digital code signal with a digital input signal, which is obtained by converting, at a digital signal converting device, an input signal inputted from an input device, and if the digital code signal and the digital input signal match, the comparing/judging device judges that the tubular body is a good article, and if the digital code signal and the digital input signal are different, the comparing/judging device judges that the tubular body is a poor article.

The code applying device converts the code applied by the code forming device and the information which is to be expressed by that code into digital signals formed from arrangements of 1s and 0s, and compares the digital signals. Thus, the judgement on the goodness/poorness of the tubular body can be carried out efficiently and with high reliability.

At the code applying device, in a case in which the code applied by the code forming device is an infrared ray readable code, an example of the code reader is a code reader having a light emitting element, such as a light emitting diode or the like which irradiates infrared rays onto the infrared ray readable code, and a light receiving element such as a photodiode or a phototransistor or the like which receives the infrared rays reflected from the code and converts the received infrared rays into an analog signal, such as a voltage signal or an electric current signal or the like, which corresponds to the intensity of the received infrared rays.

The code reader is preferably a reflection-type photointerrupter in which the light emitting element and the light receiving element are formed integrally.

In a thirteenth aspect of the present invention, the code reader has: an optical code reader which optically reads the optically readable code, and outputs an analog signal; a section arrangement signal generating device which, on the basis of the outputted analog signal, generates a section arrangement signal which expresses an arrangement of the light absorbent sections and the light reflecting sections at the optically readable code; and a digital code signal generating device generating a digital code signal on the basis of the section arrangement signal.

For example, a sine wave shaped analog signal, which is outputted from the optical code reader, is converted into a rectangular waveform in which, when the intensity of the analog signal is greater than or equal to a predetermined value, the waveheight is 100, and when the intensity of the analog signal is less than a predetermined value, the waveheight is 0, and a section arrangement signal can be generated.

At the digital code signal generating device, for example, it is judged that, in a section arrangement signal (i.e., a rectangular wave) generated by the section arrangement signal generating device, the sections whose waveheight is 100 correspond to the sections whose infrared ray reflection intensity is high (i.e., infrared ray reflecting sections), and the sections in the rectangular signal whose waveheight is 0 correspond to sections whose infrared ray reflection intensity is weak (i.e., infrared ray absorbent sections).

As an example of the Manchester encoding method, "0" is applied to sections in which a section having a waveheight of 0 is adjacent to and after a section having a waveheight of 100, and "1" is applied to sections in which a section having a waveheight of 100 is adjacent to and after a section having a waveheight of 0. A rectangular wave can thereby be converted into a digital code signal.

A fourteenth aspect of the present invention is a dimension measuring device comprising: a tubular body holding device holding a tubular body; a light irradiating device irradiating lights, in strip form, to illumination regions which are regions including end portions of the tubular body, and scanning the lights along a direction orthogonal to an axis of the tubular body; a light receiving device receiving the lights emitted from the light irradiating device; and a dimension computing device computing a dimension, along an axial direction, of the tubular body from changes in amounts of the lights received by the light receiving device at both end portions of the tubular body.

The light irradiating device and the light receiving device are disposed so as to oppose one another with the tubular body holding device disposed therebetween.

Accordingly, in the state in which the tubular body whose axial direction dimension, i.e., width, is to be measured is held at the tubular body holding device, when lights are moved in a direction orthogonal to the axis of the tubular body while both end portions of the tubular body are being irradiated by the lights in strip forms from the light irradiating device, when the lights pass above the tubular body, the lights are blocked by the both end portions of the tubular body. Therefore, the amounts of the lights received by the light receiving device decrease. This decrease in the amount of received light is proportional to the amount by which the light from the light irradiating device is blocked by the tubular body. Thus, when the amount of projection at the end surface of the tubular body is large, the light is blocked more by the tubular body, and the received light amount of the light receiving device decreases.

Accordingly, at the dimension computing device, by calculating the amounts of projection at the end surfaces of the tubular body from the decrease in the received light amounts, the width of the tubular body can be measured.

The dimension measuring device can measure the width of the tubular body without contact. Thus, even in a case of measuring the width of an article in which glue is protruding out from the end surfaces thereof such as in the case of a small roll of TA paper, measurement can be carried out efficiently without damaging or deforming the article.

A rolled article is an example of the tubular body. An example of a rolled article is a roll in which a strip-shaped, sheet-shaped body is wound on a winding core such as a paper core, as in the case of a small roll of TA paper. Other than rolls, another example of a rolled article is a coil or the like in which a rolled steel plate or a stainless plate or the like is wound in a roll form.

Other examples of tubular bodies include hollow cylindrical articles such as winding cores or the like, and solid cylindrical articles such as various types of rollers or the like.

The light irradiating device may irradiate regular visible light, infrared rays, or ultraviolet light in a strip form, or may irradiate laser light in a strip form. Here, "irradiate in a strip form" means irradiating light so as to form an overall strip-shaped beam. Accordingly, the light irradiating device may irradiate ordinary visible light, infrared light, or ultraviolet light in a strip form, or may irradiate laser beams in a state of being arranged in a row. Moreover, laser light may be irradiated and diffused into a strip form by an appropriate means.

By moving only the light irradiating device, or the light irradiating device and the light receiving device integrally, along a direction orthogonal to the axial direction of the tubular body, the light irradiating device can scan light along the direction orthogonal to the axis of the tubular body.

Examples of the light irradiating device are laser light irradiating devices such as:

an optical fiber array type laser light irradiating device having semiconductor laser elements, and an optical fiber array which is formed from a group of optical fibers arranged on a plane and into which laser light from the semiconductor laser elements is introduced from one end;

a linear array type laser light irradiating device in which semiconductor laser elements are arranged linearly along a direction orthogonal to the direction in which laser light is scanned;

a planar array type laser light irradiating device in which semiconductor elements are arranged in a planar form;

a laser light scanning type irradiating device having semiconductor laser elements, and a polygon mirror which scans, onto a plane, the laser light from the semiconductor laser elements;

and the like.

Among the laser light irradiating devices, in an optical fiber array type laser light irradiating device, in the optical fiber array, a strip-shaped laser beam is generated by irradiating, from one end, laser light which was introduced from the other end.

In a linear array type laser light irradiating device, the semiconductor laser elements are laser oscillated all at once or successively from the semiconductor laser element positioned at one end. A strip-shaped laser beam is thereby generated.

In a planar array type laser light irradiating device, among the semiconductor laser elements on the planar array, the semiconductor laser elements which are in a row along a direction parallel to the axis of the tubular body are laser oscillated all at once or successively from either end portion. A strip-shaped laser beam is thereby generated.

In a laser light scanning type irradiating device, laser light from semiconductor laser elements is scanned along the axial direction of the tubular body by a polygon mirror. A strip-shaped laser beam is thereby generated.

In an optical fiber array type laser light irradiating device, a linear array type laser light irradiating device, and a laser light scanning type irradiating device, the tubular body holding device is fixed, and the laser light irradiating device is moved in a direction orthogonal to the direction of holding the tubular body at the tubular body holding device. In this way, the generated laser beam can be scanned in a direction orthogonal to the axis of the tubular body. Further, even if the laser light irradiating device is fixed and the tubular body holding device is moved, scanning of the laser beam can be carried out.

Further, the optical fiber type laser light irradiating device, the linear array type laser light irradiating device, and the laser light scanning type irradiating device may be formed from one laser light irradiating device which extends along the holding direction of the tubular body at the tubular body holding device, i.e., the direction parallel to the axial direction of the tubular body held at the tubular body holding device, or may be a pair of laser light irradiating device which irradiate the respective end portions of the tubular body at the time of dimension measurement.

In the planar array type laser light irradiating device, the semiconductor laser elements which are in a row along a direction parallel to the axis of the tubular body are laser oscillated all at once or successively from either end portion, and are successively laser oscillated in the direction orthogonal to the axis of the tubular body. In this way, the laser light beam can be scanned in the direction orthogonal to the direction of the axis.

Examples of the light receiving device are:

(1) an optical fiber array type laser light receiving device having a light receiving element, and an optical fiber array formed from a group of optical fibers which are arranged in an imaginary plane through which the laser beam from the laser light irradiating device passes and which introduces the laser beam from one end to the light receiving element;

(2) a linear array type laser light receiving device in which light receiving elements are arranged in a straight line in an imaginary plane;

(3) a planar array type laser light receiving device in which light receiving elements are arranged in a planar form; and the like.

The optical fiber array type laser light receiving device and the linear array type laser light receiving device may be formed from one laser light receiving device, or may be divided into two laser light receiving devices which receive laser beams at the end portions of the tubular body respectively.

The dimension computing device may be, for example, a desktop computer or the like.

In a fifteenth aspect of the present invention, the tubular body holding device is fixed, and the light irradiating device and the light receiving device are integral and movable along the direction orthogonal to the axis of the tubular body.

In the dimension measuring device, the tubular body holding device is fixed, and scanning of light is carried out by moving the light irradiating device and the light receiving device. Thus, control at the dimension measuring device can be simplified. Moreover, operation is reliable.

Examples of the device which moves the light irradiating device and the light receiving device are a ball screw, a linear motor, an air pressure cylinder, a hydraulic cylinder, and the like.

In a sixteenth aspect of the present invention, the light irradiating device has: a first irradiating portion irradiating light to one end portion of the tubular body; and a second irradiating portion irradiating light to another end portion of the tubular body.

In the dimension measuring device, it suffices for the first and second irradiating portions to be able to irradiate light to the end portions of the tubular body or vicinities thereof. Thus, the dimension of the dimension measuring device in a direction parallel to the axial direction of the tubular body can be made smaller. Accordingly, the dimension measuring device can be made compact on the whole.

In a seventeenth aspect of the present invention, the light irradiating device is a laser light irradiating device which irradiates laser light.

The laser light is single color light, and has good directivity, condensability, and a high energy concentration. Accordingly, by using laser light at the light irradiating device and the light receiving device, the variations in the received light amount, which correspond to indentations and projections at the end surface of the tubular body, can be measured with high accuracy. Thus, the dimension along the axial direction of the tubular body can be measured with high accuracy.

In an eighteenth aspect of the present invention, the tubular body has: a core which is one of hollow cylindrical and solid cylindrical; and a strip-shaped sheet wound in a roll form on the core.

In a nineteenth aspect of the present invention, the core is a paper tube, and the sheet is an information recording paper.

In a twentieth aspect of the present invention, the dimension computing device: (a) determines a valid range of received light amount data at the light receiving device, from an external diameter of the tubular body inputted in advance; (b) prepares, for each end portion of the tubular body, a received light amount curve expressing a relationship between received light amounts at the light receiving device and scanned distances which are distances over which the light has been scanned; (c) determines a distance, from a stipulated position, of a minimum light receipt portion in each received light amount curve, which minimum light receipt portion expresses a minimum received light amount; (d) determines an axial direction dimension of the tubular body, which is a dimension between ends projecting the most at both ends of the tubular body, by converting the determined distances.

In the dimension measuring device, the valid range of data at the light receiving device is determined in accordance with the outer diameter of the tubular body. Thus, even if the outer diameter of the tubular body is large, received light amount data of not only the central portion of the tubular body, but also the peripheral portion, is fetched by the dimension computing device. Therefore, the dimension of the tubular body can be determined accurately. Further, in cases in which the dimension of the tubular body is small, the majority of the data of the portion at which the light irradiated from the light irradiating device is not blocked by the end portion of the tubular body, is not fetched by the dimension computing device. Therefore, needless processing of received light amount data which is unrelated to the determination of the dimension of the tubular body, can be eliminated.

In a twenty-first aspect of the present invention, the dimension computing device carries out waveform processing for eliminating noise whose magnitude is a given value $n_1$ or more.

When the tubular body is an information recording paper roll in which an information recording paper is wound on a paper tube, there are many cases in which the fibers of paper forming the paper tube fuzz or fray at the end surface of the paper tube so as to form a so-called "beard".

When the light from the light irradiating device hits this "beard", the light is blocked irregularly, and spiky peak-shaped noise arises.

In the dimension measuring device, noise of a magnitude of a given value or more is eliminated from the obtained received light amount data. Thus, it is possible to prevent the dimension of the tubular body from being calculated as greater than it actually is due to the noise.

A twenty-second aspect of the present invention is a roll winding offset measuring device comprising: a displacement measuring device disposed so as to oppose one end surface of a roll formed by winding a strip-shaped sheet onto a winding core, the displacement measuring device linearly scanning the one end surface of the roll substantially parallel to the one end surface of the roll from a center to an outer side or from an outer side to the center, and measuring, without contact, a distance from a predetermined reference plane, which is substantially parallel to the one end surface of the roll, to each sheet end surface portion projecting outwardly in a roll axial direction; and a computing device which, on the basis of measured data of each distance, determines a magnitude of winding offset of the sheet at the one end surface of the roll.

The magnitude of the winding offset at the roll can be measured without contact. Accordingly, even for rolls at which an adhesive is protruding out from the end surfaces thereof as in the case of a small roll of TA paper, it is possible to determine the presence/absence of winding offset and the magnitude of the winding offset, without the end surfaces of the roll being dirtied, damaged, or deformed.

Here, the winding offset can also be called a projecting portion in which one or plural layers of the sheet-shaped article project out from the end surface of the roll along the circumferential direction. The magnitude of the winding offset can also be called the height of the projecting portion.

An example of the sheet is an information recording paper or the like in which an image is formed on the surface due to heating or light irradiation or the like, such as TA paper. However, the sheet is not limited to information recording paper, and also encompasses regular paper, plastic film, plastic sheets, and the like.

It suffices for the winding core to be a tubular or solid cylindrical core around which a sheet can be wound. A specific example is the paper tube of a small roll, or the like.

An example of the displacement measuring device is an optical displacement measuring means which will be described later. In addition, a radio wave irradiating type displacement measuring means which can determine the distance to the end surface by irradiating radio waves toward the end surface of the roll, and an ultrasonic wave irradiating type displacement measuring means which irradiates ultrasonic waves toward the end surface and determines the distance to the end surface from the echo which returns from the end surface, and the like can be used.

The scanning direction may be direction toward the peripheral portion from the central portion of the roll, or may be the direction opposite thereto.

For scanning, the displacement measuring means may be moved parallel to the end surface of the roll, or the displacement measuring means may be fixed and the roll moved.

A feeding device utilizing the rotation of a motor, such as a ball screw or the like, is an example of the scanning means which moves the displacement measuring device parallel to the end surface of the roll. In addition, an air pressure cylinder or a hydraulic cylinder or the like can be used.

For example, a desktop computer or a microcomputer or the like can be used as the computing device.

In a twenty-third aspect of the present invention, the device of the twenty-second aspect further comprises: a goodness/poorness judging device which judges whether the roll is good or poor on the basis of the magnitude of the winding offset.

The judgement as to whether the roll is good or poor, which judgement is based on the winding offset amount, can be carried out automatically. Thus, the present invention can be optimally used as a roll winding offset examining device in a roll wind-up device which will be described later.

In a twenty-fourth aspect of the present invention, the displacement measuring device has a first scanning speed $v_1$, at which the displacement measuring device scans a winding core portion and a portion where sheet winding starts, and a second scanning speed $v_2$, at which the displacement measuring device scans a portion at an outer side of the portion where sheet winding starts, and the first scanning speed $v_1$ is lower than the second scanning speed $v_2$.

There are many cases in which winding offset arises only at the portion where winding of the sheet starts in the vicinity of the winding core. Thus, in sensing the winding offset, it is necessary to measure the absence/presence and the magnitude of the winding offset with particularly high accuracy at the portion where winding of the sheet starts.

In the roll winding offset measuring device, as described above, the displacement measuring device moves at a low speed during the scanning of the winding core and the winding start portion. When scanning portions further toward the outer side, the displacement measuring device moves at a high speed.

Accordingly, at the sheet winding start portion, the magnitude of the winding offset can be measured with high accuracy, and it is possible to prevent overlooking of the winding offset. Moreover, the portion which is at the outer side of the winding start portion usually accounts for the largest portion in the roll. At this portion, the magnitude of the winding offset can be measured efficiently.

The scanning speed $v_1$ is generally ⅕ or less of the scanning speed $v_2$, and is preferably 1/10 or less of the scanning speed $v_2$. The scanning speed $v_1$ preferably falls within a range of 10 mm/sec or less.

In a twenty-fifth aspect of the present invention, the displacement measuring device is an optical displacement measuring means for measuring distance by illuminating light to the end surface of the roll.

Because the ability of light to travel in a straight line is good, in accordance with the roll winding offset measuring device, the distance to the roll end surface can be measured with high accuracy.

An example of the optical displacement measuring means is a laser irradiating type displacement measuring device which irradiates laser light onto the end surface of the roll and measures the distance to the end surface of the roll.

In a twenty-sixth aspect of the present invention, the winding core is a paper tube.

In a twenty-seventh aspect of the present invention, the sheet is an information recording paper.

In a twenty-eighth aspect of the present invention, the first scanning speed $v_1$ is ⅕ or less of the second scanning speed $v_2$.

Measurement of the winding offset at the winding core and the portion where winding of the sheet-shaped article starts can be carried out with high accuracy.

In a twenty-ninth aspect of the present invention, the first scanning speed $v_1$ is 10 mm/sec or less.

In a thirtieth aspect of the present invention, the computing device: (a) divides obtained distance data into distance data of a winding core portion and distance data of a sheet wound portion, on the basis of thickness data of the winding core which is inputted in advance; (b) determines a maximum distance $d_1$, which is a distance of a portion which projects the most outwardly in an axial direction of the roll, among the distance data of the winding core portion; (c) determines a maximum distance $d_2$, which is a distance of a portion which projects the most outwardly in the axial direction of the roll, among the distance data of the sheet wound portion; and (d) determines a difference $\Delta d$ between the maximum distances $d_2$ and $d_1$, and uses the difference $\Delta d$ as the magnitude of the winding offset.

An imaginary plane which is parallel to the end surface of the winding core is a reference plane. The magnitude of the winding offset is determined by measuring the height of the winding offset from the reference plane.

Here, at the roll, the sheet is usually cut to a width which is equal to the axial direction length of the winding core. Accordingly, if winding offset does not arise at the time of winding the sheet up onto the winding core, the end surfaces of the sheet wound portion at the roll should be positioned in the same planes as the end surfaces of the winding core.

Accordingly, if the height of the projecting portion at the sheet wound portion is determined by using the end surface of the winding core at the roll as a reference plane, the height (i.e., the magnitude) of the winding offset can be determined.

Further, winding offset, which becomes problematic, is often winding offset which projects further than the portion of the winding core which projects the most.

Accordingly, as described above, rolls which will create problems can be excluded by evaluating the magnitude of the winding offset by the height from a reference plane based on the portion of the winding core which projects the furthest.

Further, the computing of the magnitude of the winding offset by processes can be carried out easily by a computer program.

Accordingly, in the roll winding offset measuring device, a desktop computer, in which a computer program is installed, can be used as the computing means.

The thickness data of the winding core is, in a case in which the winding core is a tubular body, ½ of the difference between the outer diameter and the inner diameter of the winding core, i.e., data of the thickness of the winding core. In the case in which the winding core is a solid cylinder, the thickness data of the winding core is the radius of the winding core.

In a thirty-first aspect of the present invention, a goodness/poorness judging device judges that the roll is a good article when the difference Δd is a predetermined stipulated value or less, and judges that the roll is a poor article when the difference Δd is greater than the stipulated value.

The judging of the goodness/poorness of the roll by processes can easily be carried out by a computer program.

Accordingly, a desktop computer, in which a computer program is installed, can be used as the goodness/poorness judging means in the roll winding offset measuring device. Further, the same desktop computer can be used as the computing means and the goodness/poorness judging means. Thus, the structure can be simplified.

A value determined experientially or experimentally can be used as the stipulated value.

In a thirty-second aspect of the present invention, the computing device determines a valid distance data range from an outer diameter of the roll and an inner diameter of the winding core which are inputted in advance, and determines the maximum distances $d_1$ and $d_2$ from distance data which falls within the valid distance data range.

In the computing device, only the data which can be used validly in measuring the winding offset is processed. Therefore, the magnitude of the winding offset can be determined in an even shorter time.

A thirty-third aspect of the present invention is a deaerating/packaging method comprising the steps of: temporarily packaging an object-to-be-packaged by a packaging material, such that there is one opening portion for a deaerating nozzle which communicates an interior and an exterior; inserting a deaerating nozzle into the opening portion for a deaerating nozzle, and deaerating an interior of the packaging material which has been temporarily packaged; and removing the deaerating nozzle, and sealing the opening portion for a deaerating nozzle.

In this method, first, the object-to-be-packaged is packaged by the temporarily packaging step. At this time, only the opening portion for a deaerating nozzle is open.

Next, in the deaerating step, the deaerating nozzle is inserted from the opening portion for a deaerating nozzle, and the interior of the packaging material is deaerated. Here, because the packaging material is temporarily packaged in the temporarily packaging step, at the time of deaeration, the packaging material can be made to fit tightly to the object-to-be-packaged, without a space arising between respective objects-to-be-packaged, or without a space arising between the object-to-be-packaged and the packaging material. Further, it suffices for the deaerating nozzle to be placed in the opening portion for a deaerating nozzle, and for the interior of the packaging material, which is temporarily packaged, to be deaerated. Thus, there is no need to insert the deaerating nozzle itself deep into the interior of the packaging material. Accordingly, the tight fit between the packaging material and the object-to-be-packaged is not deteriorated by the deaerating nozzle. In this way, a so-called tight package can be obtained.

There is no need to insert the deaerating nozzle deep into the packaging material. Therefore, the deaerating nozzle does not contact the object-to-be-packaged, and it is possible to prevent the object-to-be-packaged from being damaged by the deaerating nozzle.

After deaeration, in the sealing step, the deaerating nozzle is withdrawn from the opening portion for a deaerating nozzle of the packaging material, and the opening portion for a deaerating nozzle is sealed. In this way, the object-to-be-packaged can be completely packaged by the packaging material, and a packaged structure can be formed.

In a thirty-fourth aspect of the present invention, in the step of temporarily packaging, a pillow-type package is formed by forming gusset portions at the packaging material, and packaging material fin portions at both ends of the pillow-type package, which arise at a time of forming the gusset portions, are partially sealed.

An example of partial sealing is, for example, the portion at the outer surface side of the fin portion being sealed. In this way, inadvertent deformation and offset of the packaging material (and of the fin portion and the gusset portion in particular) can be prevented even more reliably.

Of course, the portion at the inner surface side of the fin portion of the packaging material may be sealed in addition thereto or in place thereof.

A thirty-fifth aspect of the present invention is a deaerating/packaging device comprising: a temporarily packaging device which can temporarily package an object-to-be-packaged by a packaging material, such that there is one opening portion for a deaerating nozzle which communicates an interior and an exterior; and a deaerating/sealing device having a deaerating nozzle which can enter into and withdraw from the opening portion for a deaerating nozzle, the deaerating/sealing device deaerating, by the deaerating nozzle, an interior of the packaging material which has been temporarily packaged, and sealing the opening portion for a deaerating nozzle.

In a case in which the object-to-be-packaged is deaerated/packaged by using the deaerating/packaging device, first, the object-to-be-packaged is temporarily packaged by the temporarily packaging device. At this time, the temporarily packaging device leaves open, at the packaging material, only the opening portion for a deaerating nozzle.

Next, the deaerating nozzle of the deaerating/sealing device is placed in the opening portion for a deaerating nozzle, and the interior of the packaging material is deaerated by the deaerating nozzle. Here, because the packaging material has already been temporarily packaged by the temporarily packaging device, at the time of deaeration, the packaging material can be made to fit tightly to the object-to-be-packaged, without a space arising between objects-to-be-packaged, and without a space arising between the object-to-be-packaged and the packaging material. Further, it suffices for the deaerating nozzle to be placed in the opening portion for a deaerating nozzle and to be able to deaerate the interior of the packing material which is temporarily packaged. Thus, there is no need to insert the deaerating nozzle itself deep into the packaging material. Accordingly, the tight fit between the packaging material and the object-to-be-packaged is not deteriorated by the deaerating nozzle. In this way, a so-called tight package can be obtained.

Further, there is no need to insert the deaerating nozzle deep into the packaging material. Therefore, the deaerating nozzle does not contact the object-to-be-packaged, and it is possible to prevent the object-to-be-packaged from being damaged by the deaerating nozzle.

After deaeration, the deaerating nozzle is withdrawn from the opening portion for a deaerating nozzle of the packing material, and the opening portion for a deaerating nozzle is sealed. In this way, the object-to-be-packaged can be completely packaged by the packaging material, and a packaged structure can be formed.

In a thirty-sixth aspect of the present invention, the temporarily packaging device forms gusset portions at the packaging material so as to form a pillow-type package.

Namely, although the packaged state which is formed by the present invention is not particularly limited, by using a pillow-type packaged state, the packaging material can be packaged tightly in accordance with objects-to-be-packaged of different sizes and configurations.

Further, at the time of forming the gusset portion, the opening portion for a deaerating nozzle can easily be provided by not sealing a portion of or all of the gusset portion (e.g., by not causing a tight fit or carrying out adhesion at a portion of or all of the gusset portion).

In a thirty-seventh aspect of the present invention, the temporarily packaging device partially seals fin portions of the packaging material at both sides of the pillow-type package, which fin portions arise at a time of forming the gusset portions.

Namely, at least the inner surface side of a portion of the fin portion is sealed by the sealing device. Thereafter, the interior of the packaging material is deaerated by the deaerating device. Accordingly, inadvertent deformation and offset of the packaging material which has already been set in the pillow-type packaged state (and in particular, inadvertent deformation and offset at the fin portion), can be prevented, and the pillow-type packaged state can be maintained in a desired form.

BRIEF DESCRIPTION OF THE DRAWINGS

FIGS. 25A and 25B are schematic diagrams showing the relationship between the rectangular wave shown in FIG. 24, and information code print data obtained by converting the rectangular wave at a computer main body.

FIGS. 29A and 29B are enlarged detailed diagrams showing the structure of a first example of the laser light irradiating device and the laser light receiving device.

FIGS. 31A and 31B are enlarged detailed diagrams showing the structure of a third example of the laser light irradiating device and the laser light receiving device.

FIGS. 38A and 38B are enlarged diagrams showing noise and a vicinity thereof in the time curve of amounts of received light, and are enlarged diagrams showing curves before and after noise elimination.

FIGS. 53A, 53B, 53C, and 53D are diagrams showing, in order, steps for temporarily heat sealing a film for packaging by the temporary heat sealing portion shown in FIG. 52.

FIGS. 54A, 54B, and 54C are diagrams showing, in order, steps for cutting after temporarily heat sealing the film for packaging by the temporary heat sealing portion shown in FIG. 52.

FIGS. 56A and 56B are diagrams showing, in order, steps for opening an opening portion for a deaerating nozzle by the deaerating/opening portion shown in FIG. 55.

FIG. 57 is a perspective view showing the schematic structure of a device which deaerates the interior of the film for packaging at the opening/deaerating portion of the deaerating/sealing device of the fourth embodiment.

DESCRIPTION OF THE PREFERRED EMBODIMENTS

First Embodiment

A first embodiment of the present invention will be described with reference to FIGS. 1 through 26.

Figure 1:
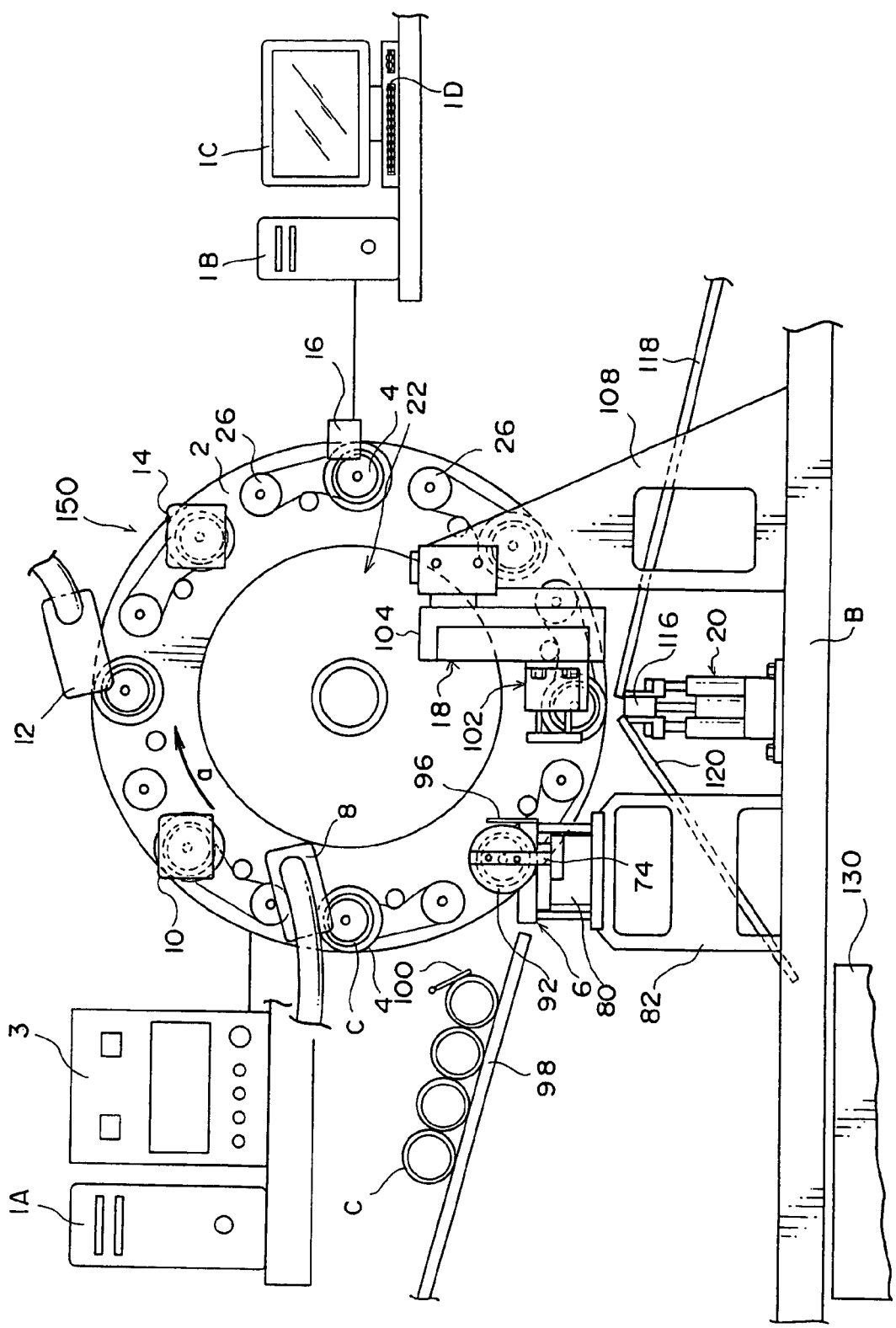
FIG. 1 is an overall structural view of a code printing device which is one example of a code applying device relating to the present invention.

FIG. 1 shows the overall structure of a code printing device which is an example of the code applying device relating to the present invention.

A code printing device 150 is a device which prints a code, which expresses information relating to an information recording paper wound on a paper tube C, on an end surface of the paper tube C which is a tubular winding core around which the information recording paper, such as a color heat-sensitive recording paper or the like, is wound. The paper tube C is an example of the tubular body in the present invention.

As shown in FIG. 1, the code printing device 150 is disposed on a base B. The code printing device 150 has a turret 2 and paper tube holding devices 4. The turret 2 is formed as a donut-shaped disc provided along a vertical plane, and rotates clockwise around an axis as shown by arrow a in FIG. 1. There are eight paper tube holding devices 4 provided at constant intervals at the outer peripheral portion of the turret 2. The paper tube holding device 4 is substantially cylindrical, and, while holding the paper tube C, rotates continuously or intermittently around its axis. The code printing device 150 also has a paper tube installing device 6 which is disposed on the base B, and which installs the paper tube C into the paper tube holding device 4 which is positioned ⅛ of a rotation ahead, in the rotating direction a around the axis, of the lowermost position of the turret 2. The code printing device 150 also has a base layer printer 8, a heating plate 10, an information code printer 12, a heating plate 14, and a code reader 16. The base layer printer 8 is disposed adjacent to the paper tube installing device 6 along the rotating direction a, and prints a base layer by a black-color, infrared ray non-absorbent ink on the end surface of the paper tube C installed in the paper tube holding device 4 by the paper tube installing device 6. The heating plate 10 is disposed adjacent to the base layer printer 8 along the rotating direction a, and dries the base layer which has been printed onto the paper tube C at the base layer printer 8. The information code printer 12 is disposed adjacent to the heating plate 10 along the rotating direction a, and prints an information code, which is one example of the code in the present invention, onto the base layer which has been dried by the heating plate 10, by a black-color, infrared ray absorbent ink. The heating plate 14 is disposed adjacent to the information code printer 12 along the rotating direction a, and dries the code which was printed by the information code printer 12. The code reader 16 is disposed adjacent to the heating plate 14 along the rotating direction a, and reads the information code printed on the paper tube C. The code printing device 150 is also equipped with a paper tube detaching device 18 and a paper tube classifying device 20. The paper tube detaching device 18 is disposed adjacent to the code reader 16 along the rotating direction a. When the turret 2 rotates a further ¼ rotation and the paper tube C, whose information code was read at the code reader 16, is positioned at the lowermost position of the turret 2, the paper tube detaching device 18 removes the paper tube C from the paper tube holding device 4 so as to detach the paper tube C from the turret 2. On the basis of the results of reading at the code reader 16, the paper tube classifying device 20 classifies the paper tube C, which has been detached from the turret 2 by the paper tube detaching device 18, into either a good article or a poor article.

The paper tube holding device 4 corresponds to the tubular body holding device in the code applying device of the present invention. The paper tube installing device 6 corresponds to the tubular body installing device in the code applying device. The base layer printer 8, the heating plate 10, the information code printer 12, and the heating plate 14 correspond to the code forming device in the code applying device. The code reader 16 corresponds to the code examining device in the code applying device. Further, the paper tube detaching device 18 and the paper tube classifying device 20 correspond respectively to the tubular body detaching device and the tubular body classifying device in the code applying device.

Figure 2:
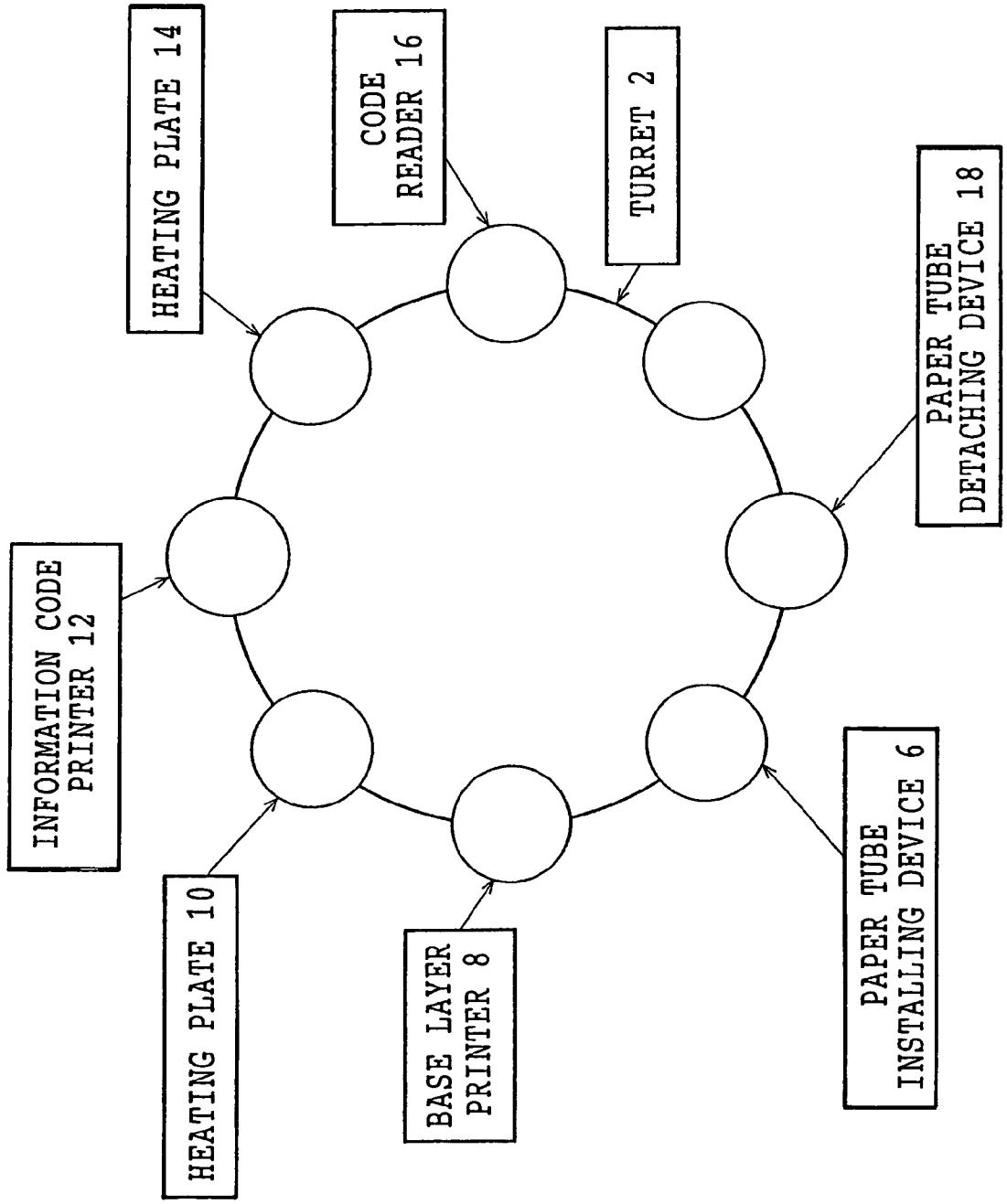
FIG. 2 is a diagram roughly showing the arrangement, with respect to a turret, of a paper tube installing device, a base layer printer, a heating plate, an information code printer, a heating plate, a code reader, and a paper tube detaching device, which are provided at the code printing device of FIG. 1.

An overview of the positions of the paper tube installing device 6, the base layer printer 8, the heating plate 10, the information code printer 12, the heating plate 14, the code reader 16, and the paper tube detaching device 18, with respect to the turret 2, are shown in FIG. 2. As shown in FIG. 2, the paper tube installing device 6, the base layer printer 8, the heating plate 10, the information code printer 12, the heating plate 14, the code reader 16, and the paper tube detaching device 18 are all disposed in a vicinity of the outer peripheral portion of the turret 2. Note that the paper tube classifying device 20 is disposed beneath the paper tube detaching device 18. The paper tube installing device 6, the paper tube detaching device 18 and the paper tube classifying device 20 stand erect directly on the base B.

A poor article recovery box 130, which recovers the articles which have been classified as poor by the paper tube classifying device 20, is provided beneath the base B.

Hereinafter, the respective sections of the code printing device 150 will be described in detail.

Figure 3:
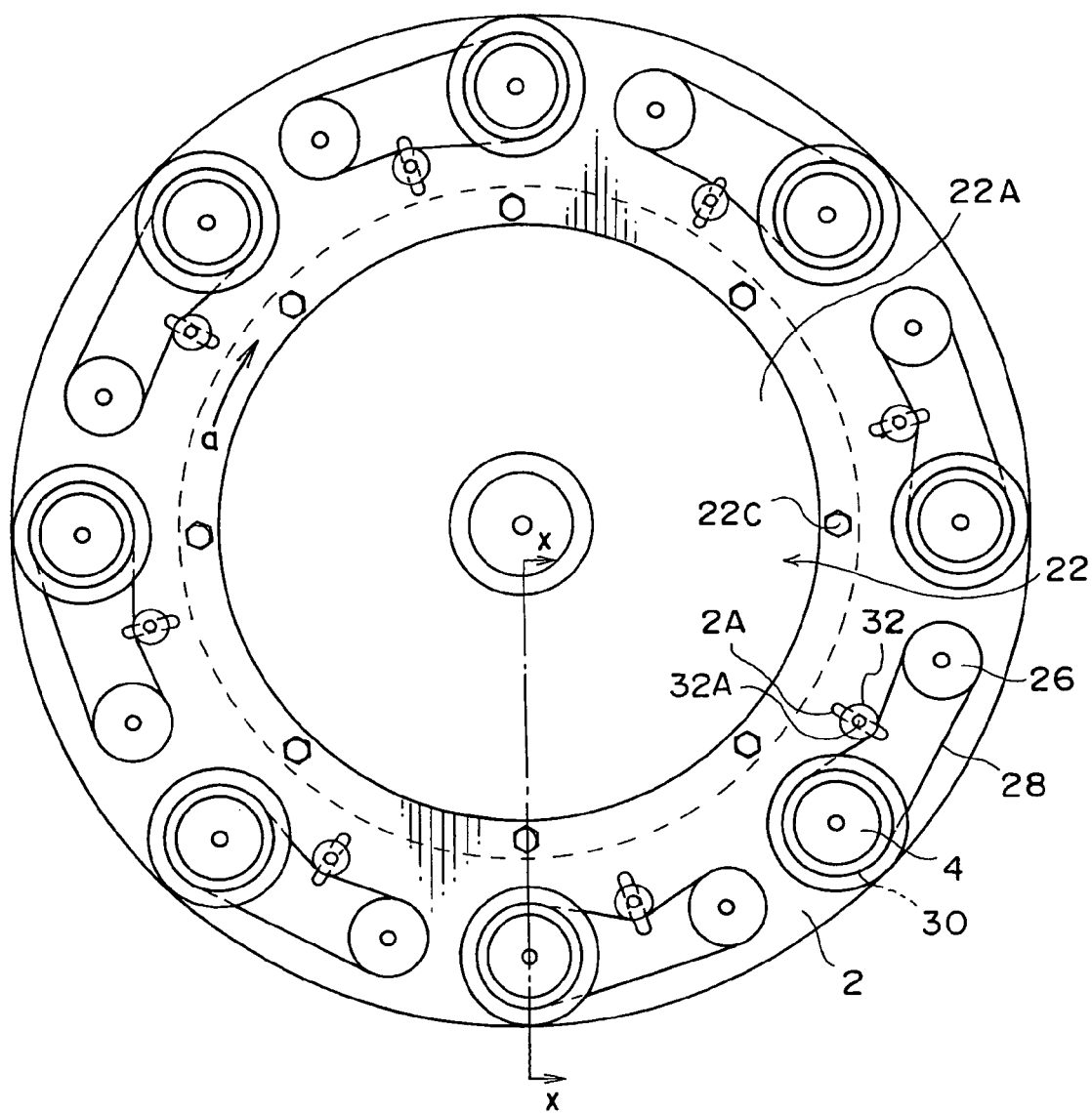
FIG. 3 is an enlarged view showing the structure of the turret provided at the code printing device of FIG. 1.
Figure 4:
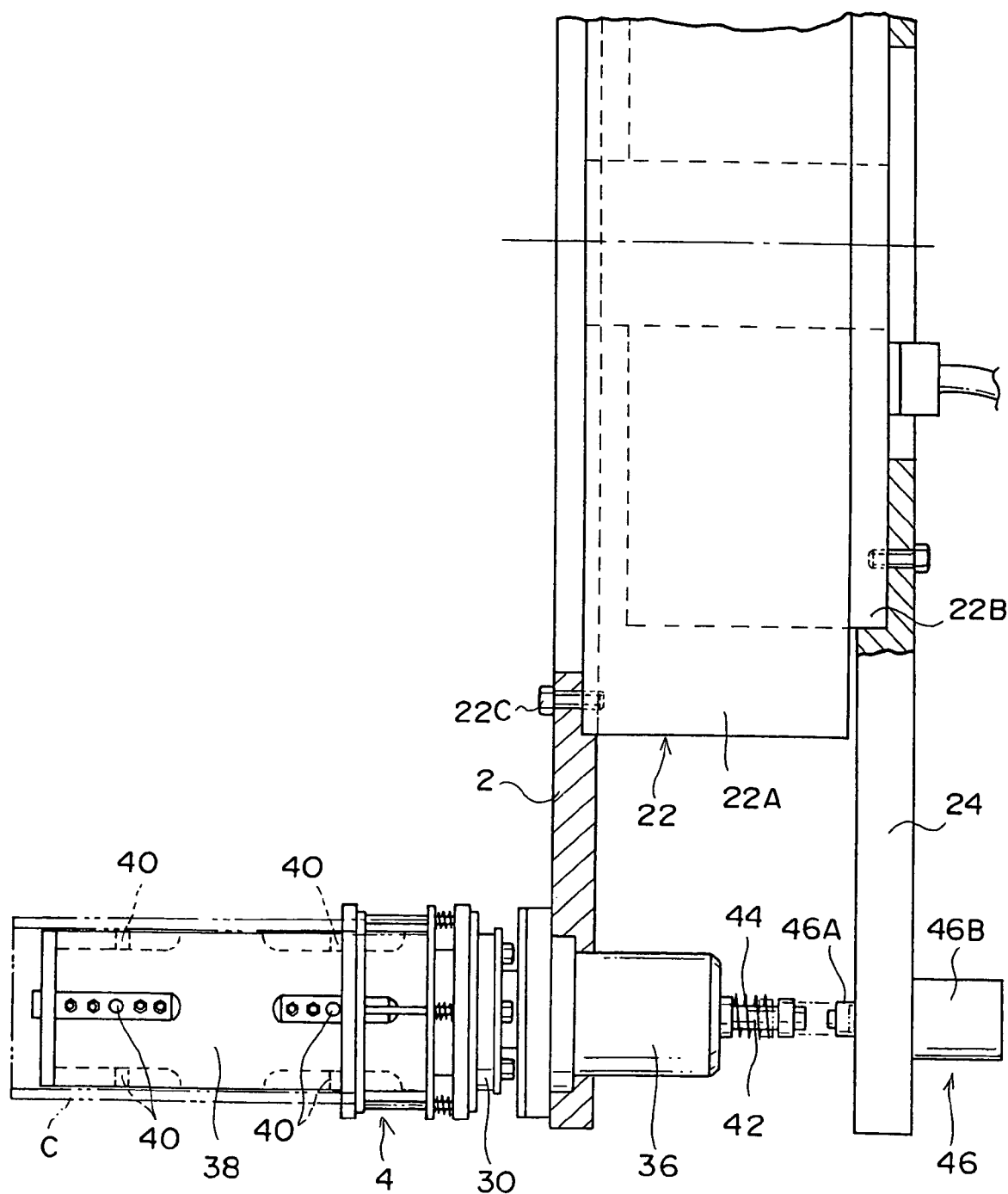
FIG. 4 is a cross-sectional view, as seen from the direction of the arrow along line x—x, of the turret of FIG. 3.
Figure 5:
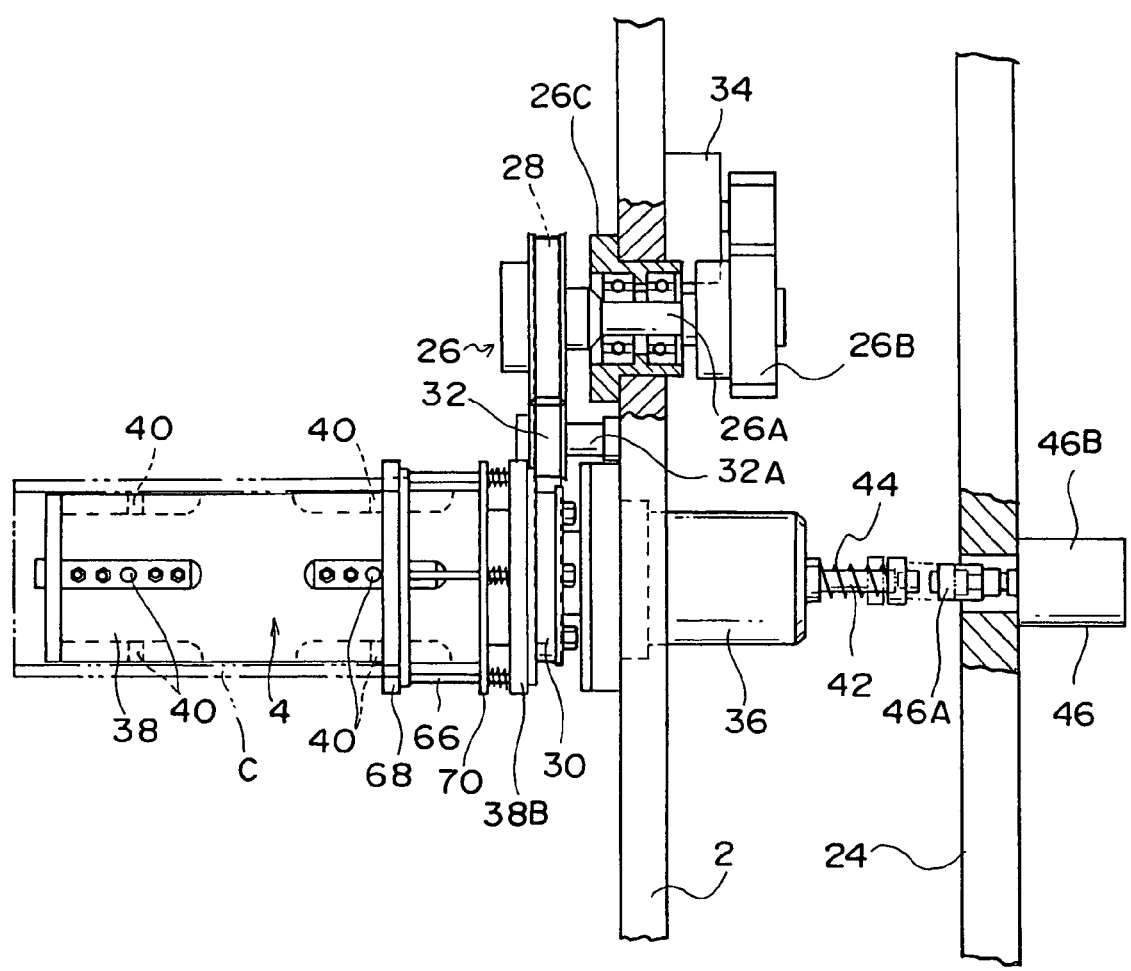
FIG. 5 is a cross-sectional view, cut at the cut cross-section x—x in FIG. 3, showing in detail the structure of a portion where a paper tube holding device stands erect at the turret of FIG. 3.
Figure 6:
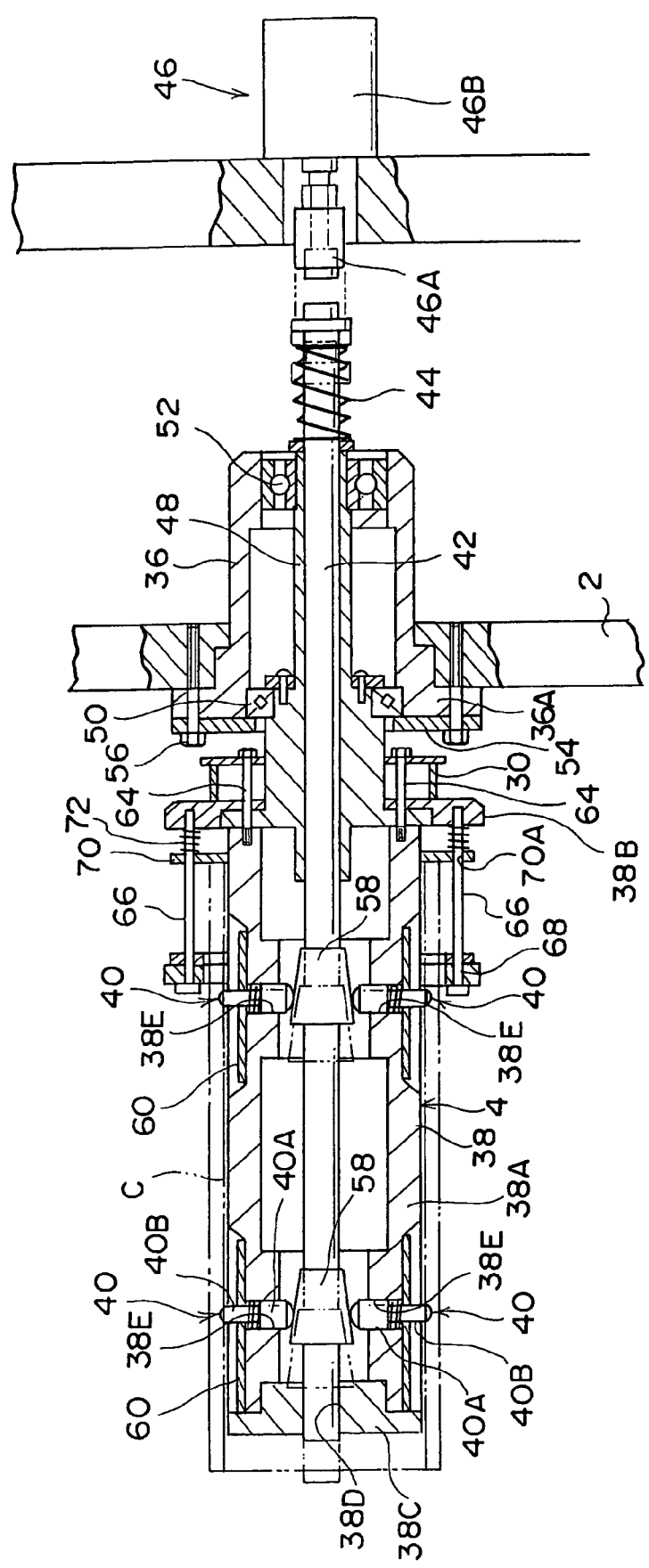
FIG. 6 is a cross-sectional view, cut at the cut cross-section x—x in FIG. 3, showing an internal structure of the paper tube holding device shown in FIG. 5.

FIG. 3 illustrates the turret 2 as seen from the front, and FIG. 4 shows a cross-section of the turret 2 taken along the cut cross-section x—x in FIG. 3. The details of the structure of the portion where the paper tube holding device 4 stands erect at the turret 2 are shown in FIG. 5, and the internal structure of the paper tube holding device 4 is shown in FIG. 6. Note that a driving belt 28, which will be discussed later, is omitted from FIG. 4.

As shown in FIG. 3 and FIG. 4, a short, tubular servo motor 22, which rotates the turret 2 around the axis intermittently by ⅛ of a rotation at a time, is mounted in the central opening portion of the turret 2 concentrically with the turret 2.

As shown in FIG. 4, the servo motor 22 has a fixed portion 22B and a rotating portion 22A. The fixed portion 22B is fixed to the base B. The rotating portion 22A is formed as a short, hollow cylinder whose one end is open, and is provided so as to cover one end surface side of the fixed portion 22B. Due to the rotating portion 22A rotating with respect to the fixed portion 22B, the rotating portion 22A rotates the turret 2.

The inner edge portion of the turret 2 is fixed by bolts 22C to the end surface of the rotating portion 22A of the servo motor 22.

On the other hand, a fixed side disc 24, which is formed as a donut-shaped disc of substantially the same size as the turret 2, is provided at the end surface of the fixed portion 22B which end surface is at the side opposite the rotating portion 22A. The fixed side disc 24 is fixed to the base B.

As shown in FIG. 3, driving pulleys 26, which rotate the paper tube holding devices 4 around the axes thereof, are provided between adjacent two paper tube holding devices 4. Accordingly, there are a total of eight driving pulleys 26 at the turret 2. As shown in FIGS. 4 through 6, a driven pulley 30 is fixed concentrically to each paper tube holding device 4. The driving belt 28 is trained between the driving pulley 26 and the driven pulley 30 of the paper tube holding device 4 which is rotated by the driving pulley 26.

A tension pulley 32 is provided at the inner side of the driving pulley 26 and the paper tube holding device 4 of the turret 2, and applies tension to the driving belt 28 such that no slack arises in the driving belt 28 trained between the driving pulley 26 and the driven pulley 30. Note that the tension pulley 32 may be provided at the outer side of the driving pulley 26 and the paper tube holding device 4.

As shown in FIG. 5, at a rotating shaft 26A, the driving pulley 26 is rotatably mounted to the turret 2 via a ball bearing 26C. The driving pulley 26 is fixed to one end of the rotating shaft 26A. A gear 26B is provided at the other end of the rotating shaft 26A. The gear 26B transmits, to the rotating shaft 26A and the driving pulley 26, driving force from a driving motor 34 which rotates the driving pulley 26.

As shown in FIG. 1 and FIG. 5, the tension pulley 32 is provided rotatably at one end portion of a shaft 32A whose other end portion is mounted to the turret 2.

As shown in FIG. 3, slit-shaped tension pulley mounting holes 2A are formed along the radial direction of the turret 2 in a vicinity of the inner peripheral portion of the turret 2. One end portion of the shaft 32A of the tension pulley 32 is mounted in the tension pulley mounting hole 2A such that the position thereof along the radial direction can be adjusted. By adjusting the position of the shaft 32A along the tension pulley mounting hole 2A, the position of the tension pulley 32 can be changed, and the tension of the driving belt 28 can be increased or reduced.

As shown in FIGS. 4 through 6, the paper tube holding device 4 is equipped with a fixed portion 36 and a paper tube installing tube 38. The fixed portion 36 is substantially tubular, and is fixed to the turret 2. The paper tube installing tube 38 is cylindrical, is adjacent to the fixed portion 36, is coaxial with respect the fixed portion 36, and is rotatable. At the time of code printing, the paper tube C is attached and fixed to the paper tube installing tube 38. The driven pulley 30 is fixed to the proximal portion of the paper tube installing tube 38.

Four cylindrical chuck pins 40 are formed at uniform intervals and so as to be able to project and withdraw, at each of a vicinity of the distal end portion and a vicinity of the proximal end portion at the side surface of the paper tube installing tube 38. The chuck pins 40 function to fix the paper tube C from the inner side thereof at the time the chuck pins 40 project.

A chuck pin pressing rod 42 projects from the end surface of the fixed portion 36, which end surface is at the side opposite the side at which the paper tube installing tube 38 is provided. A pushing rod urging spring 44, which is a coil spring which urges the chuck pin pushing rod 42 in a direction of projecting from the end surface of the fixed portion 36, is provided at the chuck pin pushing rod 42. Due to the pushing rod urging spring 44 urging the chuck pin pushing rod 42 in the aforementioned direction, the chuck pin pushing rod 42 pushes the chuck pins 40 outwardly to project from the surface of the paper tube installing tube 38.

As shown in FIG. 4, a pushing rod pushing device 46 is provided at the surface of the fixed side disc 24 at the side facing the turret 2. The pushing rod pushing device 46 pushes the chuck pin pushing rod 42 toward the end surface of the fixed portion 36 at the time when the paper tube holding device 4 reaches a position at which the paper tube C is installed by the paper tube installing device 6, and at a position at which the paper tube C is detached by the paper tube detaching device 18. There are two pushing rod pushing devices 46: one which pushes the chuck pin pushing rod 42 at the time when the paper tube holding device 4 reaches the position at which the paper tube C is installed by the paper tube installing device 6, and one which pushes the chuck pin pushing rod 42 at the time when the paper tube holding device 4 reaches the position at which the paper tube C is detached by the paper tube detaching device 18.

As shown in FIGS. 4 through 6, the pushing rod pushing device 46 has a pull-in rod pushing member 46A and a pushing member actuator 46B. The pull-in rod pushing member 46A is rod-shaped, and is pushed so as to approach the chuck pin pushing rod 42 along the axis of the chuck pin pushing rod 42. The pushing member actuator 46B moves the pull-in rod pushing member 46A in a direction toward the chuck pin pushing rod 42 and in a direction of moving away from the chuck pin pushing rod 42. In FIGS. 4 through 6, the two-dot chain line shows the state in which the pull-in rod pushing member 46A pushes the chuck pin pushing rod 42 and the chuck pins 40 are pulled-in into the paper tube installing tube 38. The pushing member actuator 46B may be an electric actuator having a motor and a ball screw, or may be a pneumatic or a hydraulic actuator.

As shown in FIG. 6, the fixed portion 36 at the paper tube holding device 4 has, at one end thereof, a flange 36A which extends outwardly along the radial direction. The fixed portion 36 is fixed to the turret 2 at the flange 36A.

A paper tube installing tube supporting shaft 48, which is hollow and supports the paper tube installing tube 38 rotatably with respect to the fixed portion 36, passes through the fixed portion 36 along the axis of the fixed portion 36. The paper tube installing tube supporting shaft 48 is held by a roller bearing 50 at the end portion of the fixed portion 36 at the side where the paper tube installing tube 38 is provided, and is held by a ball bearing 52 at the end portion at the side opposite this side at the fixed portion 36. The chuck pin pushing rod 42 is slidably inserted through the hollow portion of the paper tube installing tube supporting shaft 48. A flange-shaped portion, which is provided so as to be directed outwardly along the radial direction and which, together with a proximal side flange plate 38B which will be described later, forms a portion of the base portion of the paper tube installing tube 38, is formed at the central portion of the paper tube installing tube supporting shaft 48.

A bearing holding plate 54, which is formed in a donut-shaped disc shape and which holds the roller bearing 50 in cooperation with the paper tube installing tube supporting shaft 48, is provided concentrically at the side of flange 36A of the fixed portion 36 opposite the side which abuts the turret 2. The flange 36A and the bearing holding plate 54 are, at the peripheral portions thereof, fixed to the turret 2 by fixing portion fixing bolts 56.

As shown in FIG. 6, the paper tube installing tube 38 has a paper tube installing tube main body 38A which is tubular and is provided concentrically with respect to the paper tube installing tube supporting shaft 48; the proximal side flange plate 38B which is flange-shaped, is concentric with respect to the paper tube installing tube main body 38A, and is provided so as to be directed outwardly along the radial direction; and an end plate 38C which is disc-shaped and covers the opening portion at the distal end of the paper tube installing tube main body 38A. A pushing rod insert-through hole 38D, through which the chuck pin pushing rod 42 is inserted, passes through the central portion of the end plate 38C.

Four chuck pin sliding holes 38E, in which the chuck pins 40 slide, are provided along the radial direction in each of a vicinity of the distal end portion and a vicinity of the proximal end portion of the paper tube installing tube main body 38A.

A pair of truncated cone shaped chuck pin pushing cams 58, which function to abut the bottom surfaces of the chuck pins 40 and push the chuck pins 40 outwardly and which are enlarged toward the distal end of the paper tube installing tube 38, are fixed to the chuck pin pushing rod 42.

Figure 7A:
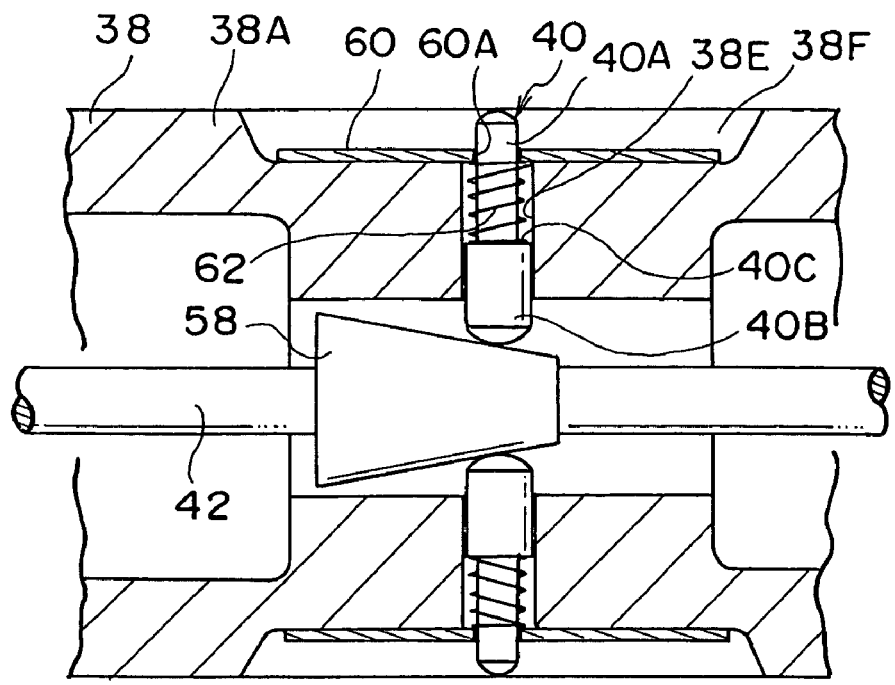
FIGS. 7A and 7B are enlarged cross-sectional views showing in detail a vicinity of chuck pins at a paper tube installing tube provided at the paper tube holding device of FIG. 5.
Figure 7B:
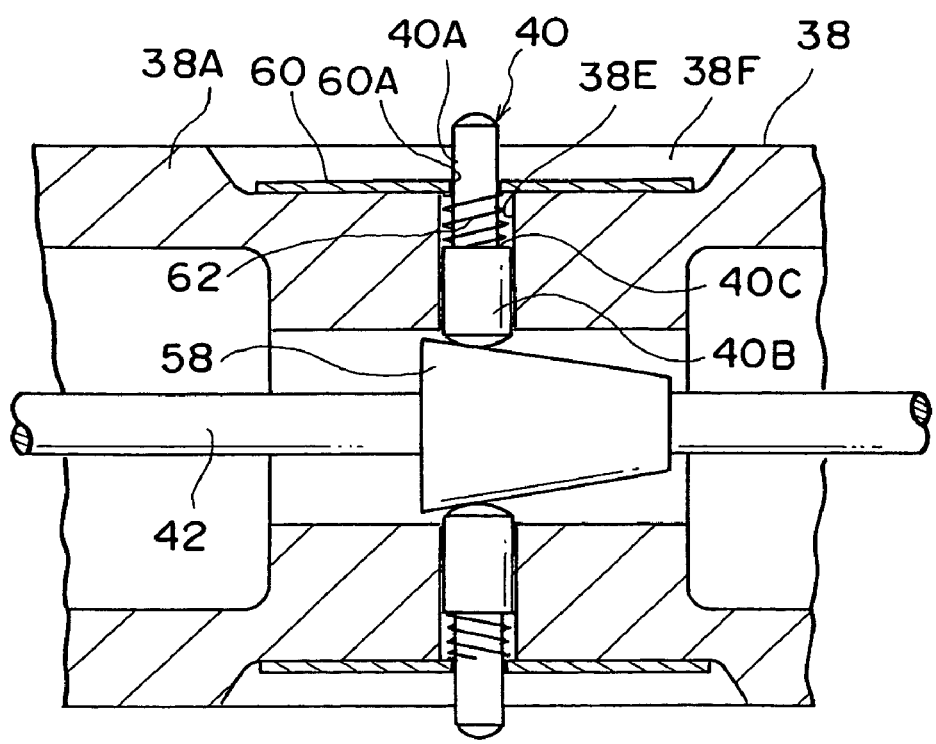

The details of the portion of the paper tube installing tube 38 in a vicinity of the chuck pins 40 are shown in FIGS. 7A and 7B. FIG. 7A shows a state in which the chuck pins 40 are pulled-in, and FIG. 7B shows a state in which the chuck pins 40 are projected.

As shown in FIGS. 6, 7A and 7B, a large diameter portion 40B is formed at the proximal portion of the chuck pin 40. The large diameter portion 40B has an outer diameter which is substantially equal to the inner diameter of the chuck pin sliding hole 38E, and slides without clattering in the chuck pin sliding hole 38E. Further, the chuck pin 40 has a projecting portion 40A whose outer diameter is smaller than that of the large diameter portion 40B, and which, at the time the paper tube C is held, projects from the side surface of the paper tube holding tube 38 such that the distal end portion of the projecting portion 40A abuts the inner peripheral surface of the paper tube C. A step 40C is formed between the large diameter portion 40B and the projecting portion 40A. The bottom surface of the large diameter portion 40B is spherical and abuts the side surface of the chuck pin pushing cam 58.

A total of four chuck pin accommodating grooves 38F are formed along the axis of the paper tube installing tube 38 at the peripheries of the opening portions of the chuck pin sliding holes 38E at the side surface of the paper tube installing tube 38. The chuck pin accommodating groove 38F has a rectangular cross-section, and accommodates the chuck pin 40 in the interior thereof at the time the chuck pin 40 is pulled-in.

A chuck pin presser plate 60, which prevents the chuck pin 40 from coming out to the exterior of the paper tube installing tube 38, is fixed to the bottom surface of the chuck pin accommodating groove 38F. A chuck pin project-out hole 60A is formed in the chuck pin presser plate 60. The chuck pin project-out hole 60 has an inner diameter which is substantially the same as the outer diameter of the projecting portion 40A of the chuck pin 40, but is smaller than the outer diameter of the large diameter portion 40B and the chuck pin sliding hole 38E of the paper tube installing tube 38. Although the projecting portion 40A slides in the chuck pin project-out hole 60A, the chuck pin 40 engages with the chuck pin presser plate 60 at the step 40C. In this way, the chuck pin 40 can be prevented from coming out to the exterior of the paper tube installing tube 38.

A coil spring 62, which urges the chuck pin 40 toward the central portion of the paper tube installing tube 38, is fit on the projecting portion 40A. One end of the coil spring 62 is anchored at the step 40C of the chuck pin 40, whereas the other end is anchored to the chuck pin presser plate 60.

In the state in which the chuck pin pushing rod 42 is not pushed by the pushing rod pushing device 46, the chuck pin pushing rod 42 is urged, by the pushing rod urging spring 44, in a direction of projecting out from the end surface of the fixed portion 36. Thus, as shown by the solid line in FIG. 6 and in FIG. 7B, the chuck pin pushing cams 58 as well move in a direction of approaching the fixed portion 36. Accordingly, the bottom surfaces of the large diameter portions 40B of the chuck pins 40 abut the side surfaces of the chuck pin pushing cams 58, i.e., the large diameter sides of the cam surfaces. Therefore, the projecting portions 40A are pushed outwardly and project out from the side surfaces of the paper tube installing tube 38.

On the other hand, when the chuck pin pushing rod 42 is pushed toward the paper tube installing tube 38 by the pushing rod pushing device 46, as shown by the two-dot chain line in FIG. 6 and in FIG. 7A, the chuck pin pushing cams 58 move in a direction of moving away from the fixed portion 36. Accordingly, the bottom surfaces of the large diameter portions 40B of the chuck pins 40 abut the small diameter sides at the cam surfaces of the chuck pin pushing cams 58. Therefore, due to the urging forces of the coil springs 62, the chuck pins 40 move toward the central portion of the paper tube installing tube 38, and the projecting portions 40A are pulled-in into the paper tube installing tube 38.

The driven pulley 30 is fixed concentrically by fixing bolts 64 to the side of the proximal side flange plate 38 opposite the side at which the paper tube installing tube main body 38A is provided. The fixing bolts 64 are also fixing bolts which fix the proximal side flange plate 38B and the paper tube installing tube supporting shaft 48 to the paper tube installing tube main body 38A.

As shown in FIG. 6, six rod-shaped guide members 66 stand erect at the proximal side flange plate 38B at uniform intervals and along the direction in which the paper tube installing tube main body 38A extends, so as to surround the paper tube C at the time when the paper tube C is installed at the paper tube installing tube 38.

The distal end portions of the guide members 66 are screwed to a guide member holding ring 68 which is in the form of a donut-shaped disc. The guide member holding ring 68 is provided concentrically with respect to the paper tube installing tube 38. A gap through which the paper tube C can pass is formed between the inner peripheral surface of the guide member holding ring 68 and the side surface of the paper tube installing tube 38.

A paper tube receiving plate 70, which is in the form of a donut-shaped disc and which is guided along the axial direction of the paper tube installing tube main body 38A by the guide members 66, is fit between the guide member holding ring 68 and the proximal side flange plate 38B. Six guide member through holes 70A, through which the guide members 66 pass, are formed at uniform intervals in the paper tube receiving plate 70. A buffer spring 72, which is a coil spring for buffering, is provided on the guide member 66 between the paper tube receiving plate 70 and the proximal side flange plate 38B.

When the paper tube C is installed onto the paper tube installing tube 38, due to the chuck pin pushing rod 42 being pushed by the pushing rod pushing device 46 and the chuck pins 40 being pulled-in into the paper tube installing tube 38, the paper tube C can be smoothly installed on the paper tube installing tube 38. In this state, the paper tube C passes through the gap between the guide member holding ring 68 and the paper tube installing tube 38, and, at one end surface, abuts the paper tube receiving plate 70. At this time, the paper tube receiving plate 70 moves toward the proximal side flange plate 38B and the buffer springs 72 contract. Thus, the impact at the time when the paper tube C abuts the paper tube receiving plate 70 can be buffered. Accordingly, the end surface of the paper tube C is not damaged by an impact at the time when the paper tube C is installed on the paper tube installing tube 38.

When the paper tube C is installed on the paper tube installing tube 38, the pushing by the pushing rod pushing device 46 is cancelled. When the pushing by the pushing rod pushing device 46 is cancelled, as described above, the chuck pin pushing rod 42 projects from the end surface of the fixed portion 36 due to the urging force of the pushing rod urging spring 44. Thus, the eight chuck pins 40 project out at uniform intervals from the side surface of the paper tube installing tube 38. Then, the paper tube C is held, at the inner wall surface thereof, by these chuck pins 40. Accordingly, even in cases in which the inner diameter of the paper tube C is greater than the outer diameter of the paper tube installing tube 38, the paper tube C can be held concentrically with respect to the paper tube installing tube 38. Thus, paper tubes C of various internal diameters can be installed on the paper tube installing tube 38.

Next, the paper tube installing device 6 and the peripheral portions thereof will be described in detail.

Figure 8:
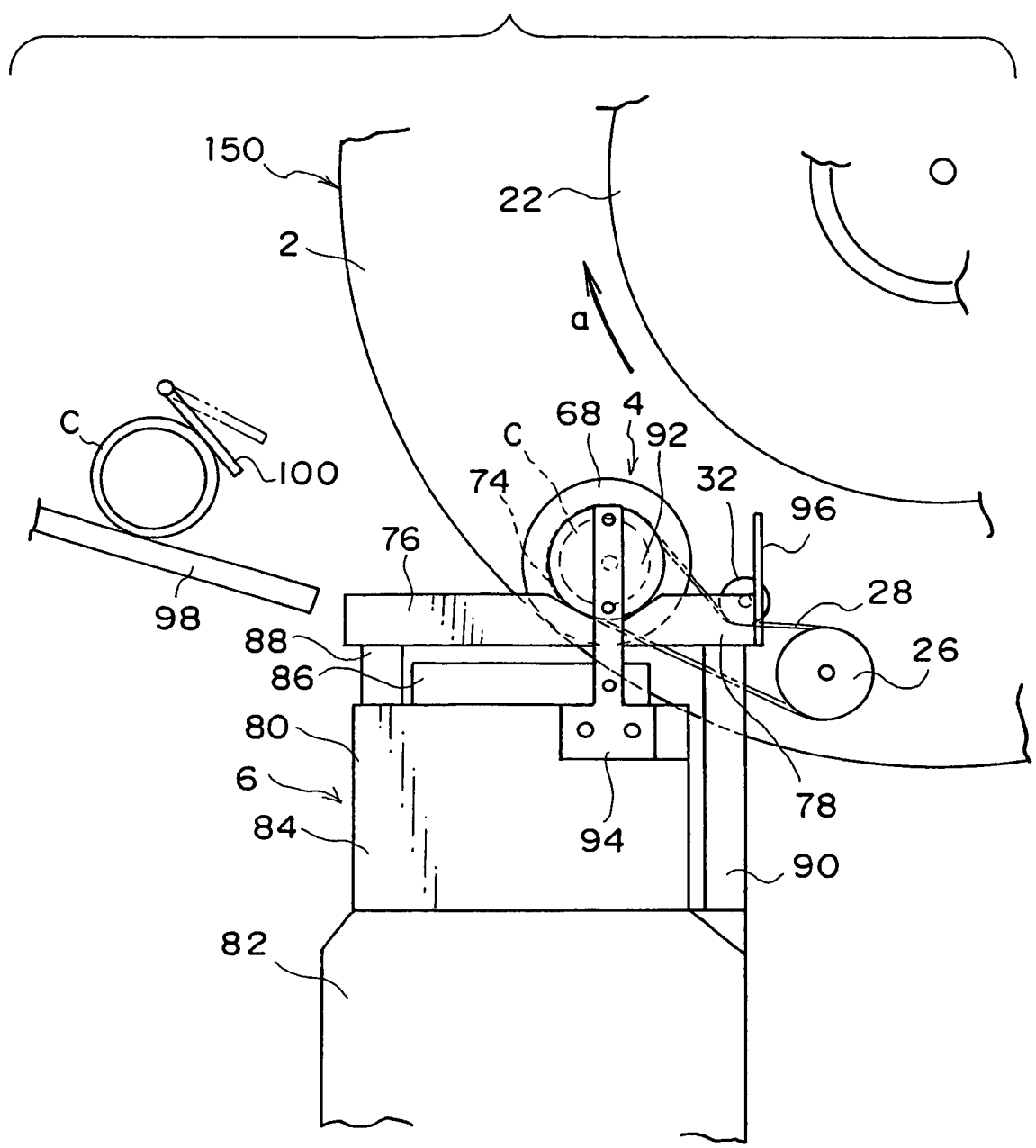
FIG. 8 is a detailed enlarged view of the paper tube installing device provided at the code printing device of FIG. 1, and the peripheral portions of the paper tube installing device.
Figure 9:
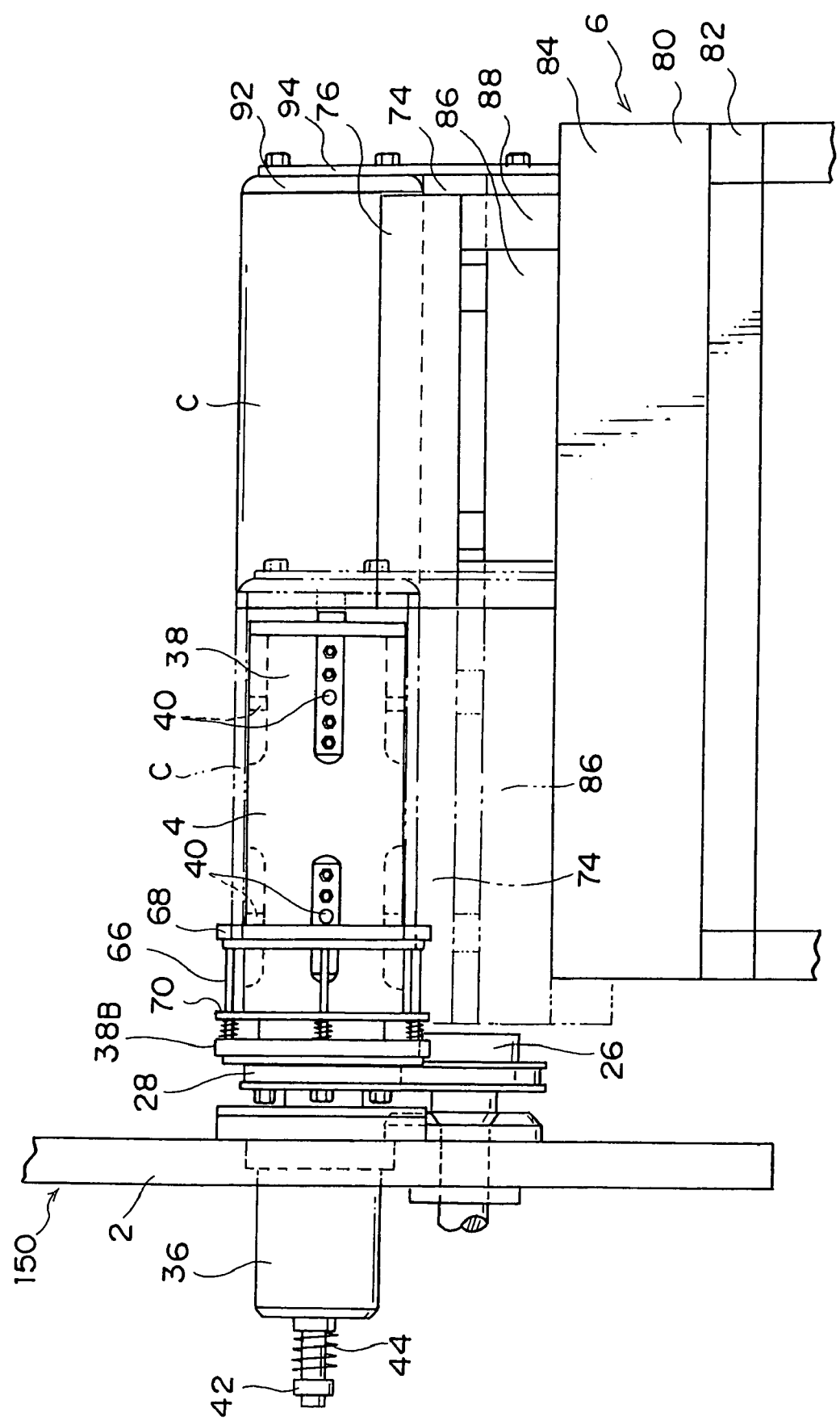
FIG. 9 is an enlarged side view, as seen from the left in FIG. 8, showing the positional relationship between the paper tube installing device shown in FIG. 8 and the paper tube holding device shown in FIG. 5.

Details of the paper tube installing device 6 and the peripheral portions thereof are shown in FIGS. 8 and 9.

FIG. 8 shows the paper tube installing device 6 as seen from the front, and FIG. 9 shows the paper tube installing device 6 as seen from the left in FIG. 8. In FIGS. 8 and 9, reference numerals which are the same as those of FIGS. 1 through 7A and 7B denote the same structural elements.

As shown in FIGS. 8 and 9, the paper tube installing device 6 has a paper tube installing stand 74 which is an elongated, plate-shaped member provided along a direction orthogonal to the surface of the turret 2, and which is formed so as to be movable so as to approach or move away from the turret 2; a pair of paper tube supporting blocks 76 and 78 which are provided along the direction of movement of the paper tube installing stand 74, are positioned so as to sandwich the paper tube installing stand 74 from the both sides thereof, and which, at the time when a paper tube C is installed, together with the paper tube supporting stand 74 form a shallow, V-shaped, trough-shaped recess surface which holds the paper tube C such that the paper tube C does not roll; a driving device 80 which is positioned beneath the paper tube installing stand 74 and moves the paper tube installing stand 74 in the aforementioned directions; and a base 82 on which the driving device 80 is set. The paper tube installing device 6 is mounted to the base B via the base 82. The paper tube installing stand 74, the paper tube supporting block 76, and the paper tube supporting block 78 are provided at positions at which the paper tube C can be installed at the paper tube holding device 4, when the paper tube holding device 4 has reached a position which is ⅛ of a rotation, in the clockwise direction in FIG. 8, from the bottommost position of the turret 2. Further, a bounce-out preventing plate 96 is provided so as to be directed upwardly at the edge of the paper tube supporting block 78 at the upstream side with respect to the rotating direction a. The bounce-out preventing plate 96 prevents the paper tube C, which is supplied from a paper tube supplying chute 98 which will be described later, from bouncing out from the paper tube supporting block 78.

The driving device 80 is equipped with a moving portion 86 which moves the paper tube installing stand 74 along the aforementioned directions, and a fixed portion 84 which is fixed to the base 82 and at which a moving means, which moves the moving portion 86, is provided. Examples of the moving means are a ball screw type feeding device having a ball screw which screws together with the moving portion 86 and a motor which rotates the ball screw, or a linear motor, or the like. The paper tube supporting block 76 is fixed to the fixed portion 84 via a support 88, and the paper tube supporting block 78 is fixed to the base 82 by a support 90.

The paper tube installing stand 74 is joined to the moving portion 86 by an appropriate means. A paper tube pushing plate 92, which is disc-shaped and has a diameter which is substantially the same as that of the paper tube C, is fixed, via a plate-shaped supporting member 94, to the end surface of the paper tube installing stand 74 which end surface is at the side opposite the side facing the turret 2. Note that, as shown in FIGS. 8 and 9, the bottom end portion of the supporting member 94 is fixed to the moving portion 86 at the driving device 80.

The paper tube supplying chute 98, which supplies the paper tube C to the paper tube installing device 6, is provided at the left of the paper tube installing device 6 in FIG. 1 and FIG. 8. A paper tube presser 100, which is a plate-shaped member which is rotatable and which supplies the paper tubes C to the paper tube installing device 6 one at a time, is provided above a portion of the paper tube supplying chute 98 in a vicinity of the paper tube installing device 6.

When no paper tube C is being supplied to the paper tube installing device 6, the paper tube presser 100 rotates downward as shown by the solid lines in FIGS. 1 and 8, and holds the paper tube C such that the paper tube C does not roll downward on the paper tube supplying chute 98 toward the paper tube installing device 6.

On the other hand, when a paper tube C is to be installed at the paper tube installing device 6, as shown by the two-dot chain lines in FIGS. 1 and 8, the paper tube presser 100 rotates upward, such that, among the paper tubes C loaded on the paper tube supplying chute 98, the lowermost paper tube C rolls down toward the paper tube installing device 6. When this lowermost paper tube C is supplied to the paper tube installing device 6, the paper tube presser 100 is returned to the position shown by the solid lines in FIGS. 1 and 8, and holds the paper tube C on the paper tube supplying chute 98.

The paper tube C, which has rolled down the paper tube supplying chute 98, is held, by the trough-shaped recess surface formed by the paper tube installing stand 74, the paper tube supporting block 76, and the paper tube supporting block 78 at the paper tube installing device 6, at a position opposing the paper tube holding device 4 which has reached a position rotated by ⅛ of a rotation in the clockwise direction in FIG. 8 from the lowermost position of the turret 2, as shown in FIGS. 1 and 8.

Next, as shown by the two-dot chain line in FIG. 9, when the paper tube installing stand 74 moves toward the turret 2, the paper tube C is moved toward the paper tube installing tube 38 at the paper tube holding device 4, and is installed at the paper tube installing tube 38. At this time, when the chuck pin pushing rod 42 is pushed in a direction of being pushed into the fixed portion 36 of the paper tube holding device 4, as described above, the chuck pins 40 are pulled-in into the paper tube installing tube 38, and the paper tube C is smoothly installed on the paper tube installing tube 38.

When the paper tube C has been installed on the paper tube installing tube 38, the paper tube installing stand 74 is returned to its original position as shown by the solid line in FIG. 9. When the pressing of the chuck pin pushing rod 42 is released, the chuck pins 40 again project out from the side surface of the paper tube installing tube 38, and the paper tube C is held at the paper tube installing tube 38.

Next, the base layer printer 8, the heating plate 10, the information code printer 12, and the heating plate 14 will be described.

Figure 10:
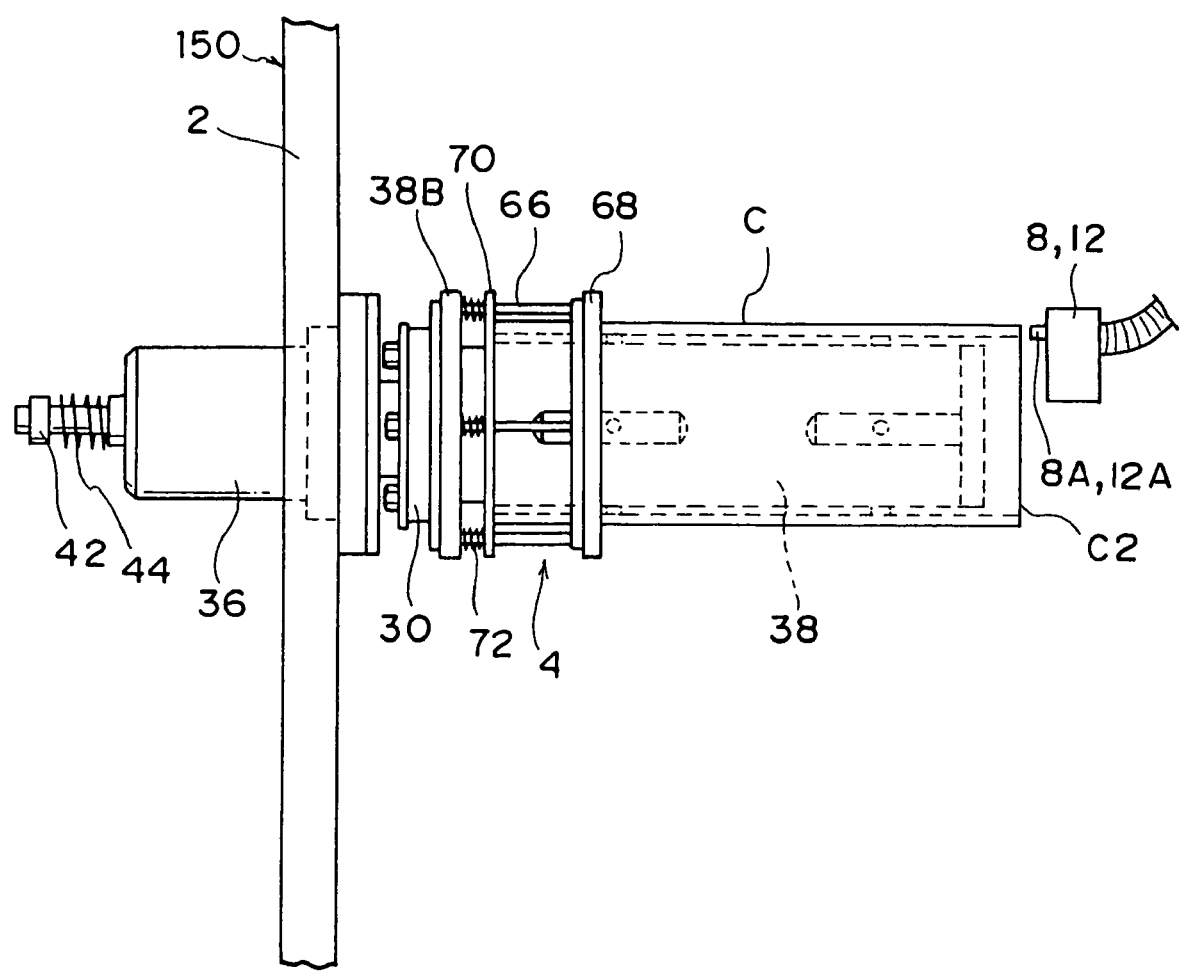
FIG. 10 is a side view showing the positional relationship, as seen from the left in FIG. 1, of the base layer printer and the information code printer, and the paper tube holding device and the turret, which are provided at the code printing device shown in FIG. 1.
Figure 11:
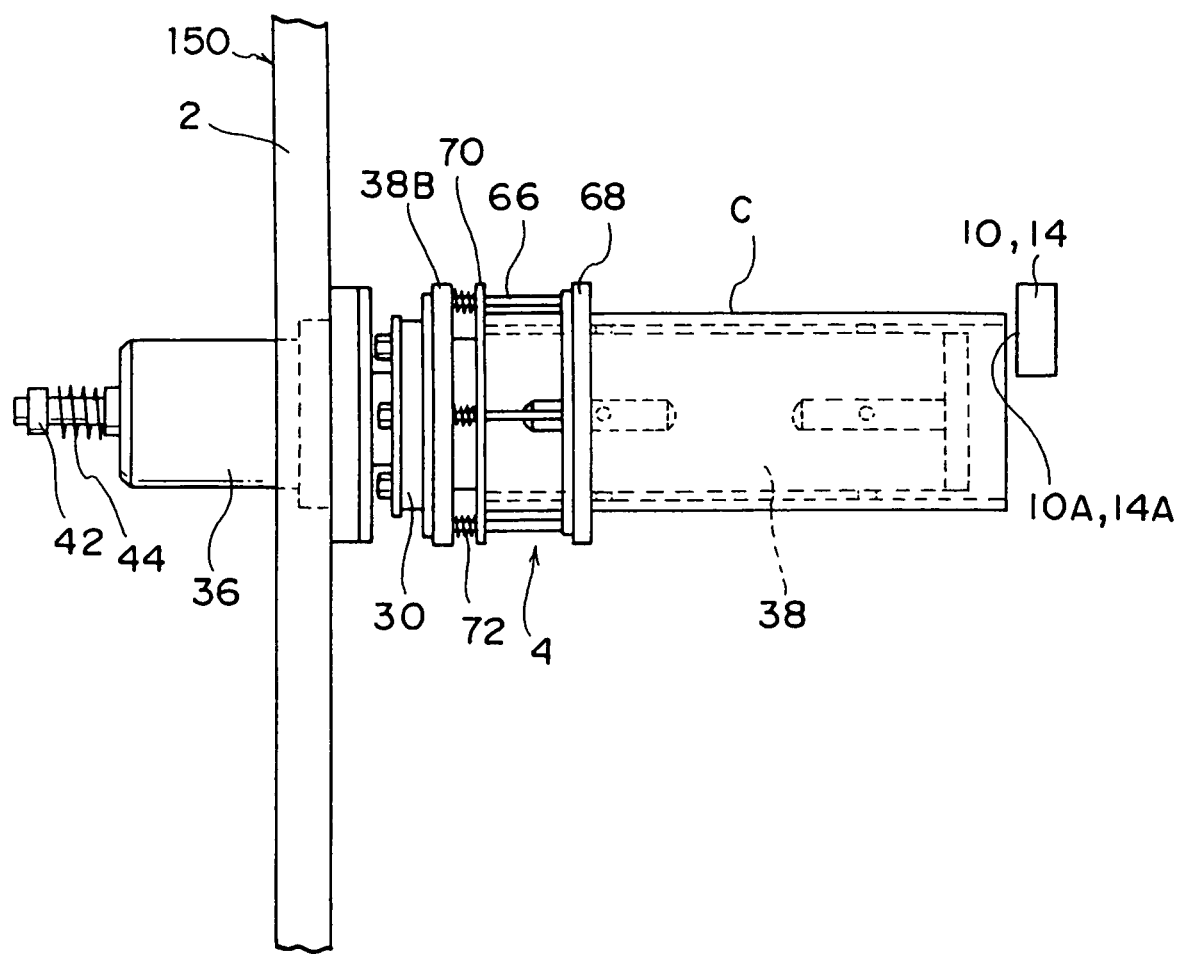
FIG. 11 is a side view showing the positional relationship, as seen from the left in FIG. 1, of the two heating plates, and the paper tube holding device and the turret, which are provided at the code printing device shown in FIG. 1.

FIG. 10 shows the positional relationship between the base layer printer 8 and the information code printer 12, and the paper tube holding device 4 and the turret 2, as seen from the left in FIG. 1. FIG. 11 shows the positional relationship between the heating plates 10, 14, and the paper tube holding device 4 and the turret 2, as seen from the left in FIG. 1. In FIGS. 10 and 11, the same reference numerals as in FIGS. 1 through 9 denote the same elements as the elements denoted by those numerals in FIGS. 1 through 9.

The base layer printer 8 is an ink jet printer which prints an infrared ray reflecting base layer onto an end surface C2 of the paper tube C installed at the paper tube holding device 4, which end surface C2 is at the side opposite the side facing the turret 2. The base layer printer 8 has an ink jetting nozzle 8A which jets ink drops toward the end surface C2. As shown in FIGS. 1 and 10, the ink jet printer 8 is disposed such that, after the paper tube C is installed at the paper tube holding device 4 by the paper tube installing device 6, when the turret 2 is rotated by ⅛ of a rotation clockwise in FIG. 1, the ink jetting nozzle 8A opposes the end surface C2 of the paper tube C.

Black ink which is used in regular ink jet printers is an example of the black ink used in the base layer printer 8.

At the base layer printer 8, a lot number and a tracking number may be printed on the side surface of the paper tube C. An impact printer can be used in printing onto the side surface of the paper tube C.

When the turret 2 is rotated and the paper tube C installed at the paper tube holding device 4 by the paper tube installing device 6 reaches the position opposing the ink jetting nozzle 8A, due to a command from a central controlling computer 1A which will be described later, the driving motor 34, which rotates the paper tube holding device 4 at which the paper tube C is installed, is rotated continuously. The paper tube installing tube 38 at the paper tube holding device 4 and the paper tube C installed at the paper tube installing tube 38 also rotate continuously around the axis. Simultaneously, drops of infrared ray reflecting black ink are jetted from the ink jetting nozzle 8A toward the end surface C2. Accordingly, the black ink drops continuously adhere to the end surface C2 of the paper tube C, and an infrared ray reflective base layer is formed over the entire periphery of the end surface C2.

The heating plate 10 is a heating plate which heats and dries the base layer which has been printed at the base layer printer 8. The heating plate 10 has a heating surface 10A which radiates radiant heat toward the end surface C2 of the paper tube C. As shown in FIGS. 1 and 11, the heating plate 10 is disposed such that, after the base layer has been printed onto the end surface C2 of the paper tube C at the base layer printer 8, when the turret 2 is rotated by ⅛ of a rotation clockwise in FIG. 1, the end surface C2 of the paper tube C on which the base layer has been printed opposes the heating surface 10A.

The heating plate 10 has a heating means which heats the heating surface 10A. Examples of the heating means are a Joule heating means which utilizes electrical resistance heating such as a heating wire or a conductive ceramic, and an electromagnetic induction heating means such as a high frequency coil.

When an information code is to be printed onto the paper tube C, at the heating plate 10, the heating means is operated, and the heating surface 10A is maintained in a state of heating at a high temperature. The heating plate 10 is controlled, by a temperature adjusting device (not shown) provided separately, such that the heating surface 10A becomes a predetermined temperature. After the base layer has been printed on the end surface C2 of the paper tube C at the base layer printer 8, when the turret 2 is rotated ⅛ of a rotation and the paper tube C on which the base layer has been printed reaches the position opposing the heating plate 10, the base layer printed on the paper tube C is heated and dried by the radiant heat from the heating surface 10A. During this time of heating and drying the base layer, the paper tube installing tube 38 which holds the paper tube C is rotated around the axis by the driving motor 34. The rotational speed can be determined appropriately in accordance with the relationship with the temperature of the heating surface 10A. From the standpoint of production efficiency, it is preferable that the temperature of the heating surface 10A is selected such that the base layer can be dried during the time the paper tube C rotates once.

The information code printer 12 is an ink jet printer which prints an information code, which is in bar code form, by an infrared ray absorbent ink onto the end surface C2 of the paper tube C on which the base layer has been printed by the base layer printer 8. The information code printer 12 has an ink jetting nozzle 12A which jets drops of infrared ray absorbent ink toward the end surface C2. As shown in FIGS. 1 and 10, the information code printer 12 is disposed such that, after the base layer printed on the end surface C2 of the paper tube C has been heated and dried by the heating plate 10, when the turret 2 rotates by ⅛ of a rotation clockwise in FIG. 1, the ink jetting nozzle 12A opposes the end surface C2 of the paper tube C at which the base layer has been dried.

When the turret 2 rotates and the paper tube C, on whose end surface C2 the base layer has been printed and then heated and dried by the heating plate 10, reaches the position opposing the ink jetting nozzle 12A, the driving motor 34, which rotates the paper tube holding device 4 at which the paper tube C is installed, rotates at a constant speed, and the paper tube C as well rotates at a constant speed around the axis. Simultaneously, drops of infrared ray absorbent black ink are intermittently jetted from the ink jetting nozzle 12A, and an information code, which is in bar code form, is printed on the end surface C2.

The heating plate 14 is a heating plate which heats and dries the information code printed by the information code printer 12. In the same way as the heating plate 10, the heating plate 14 has a heating surface 14A which radiates radiant heat toward the end surface C2 of the paper tube C on which the information code has been printed. The other structures of the heating plate 14 are the same as those of the heating plate 10.

The code reader 16 will be described next.

Figure 12:
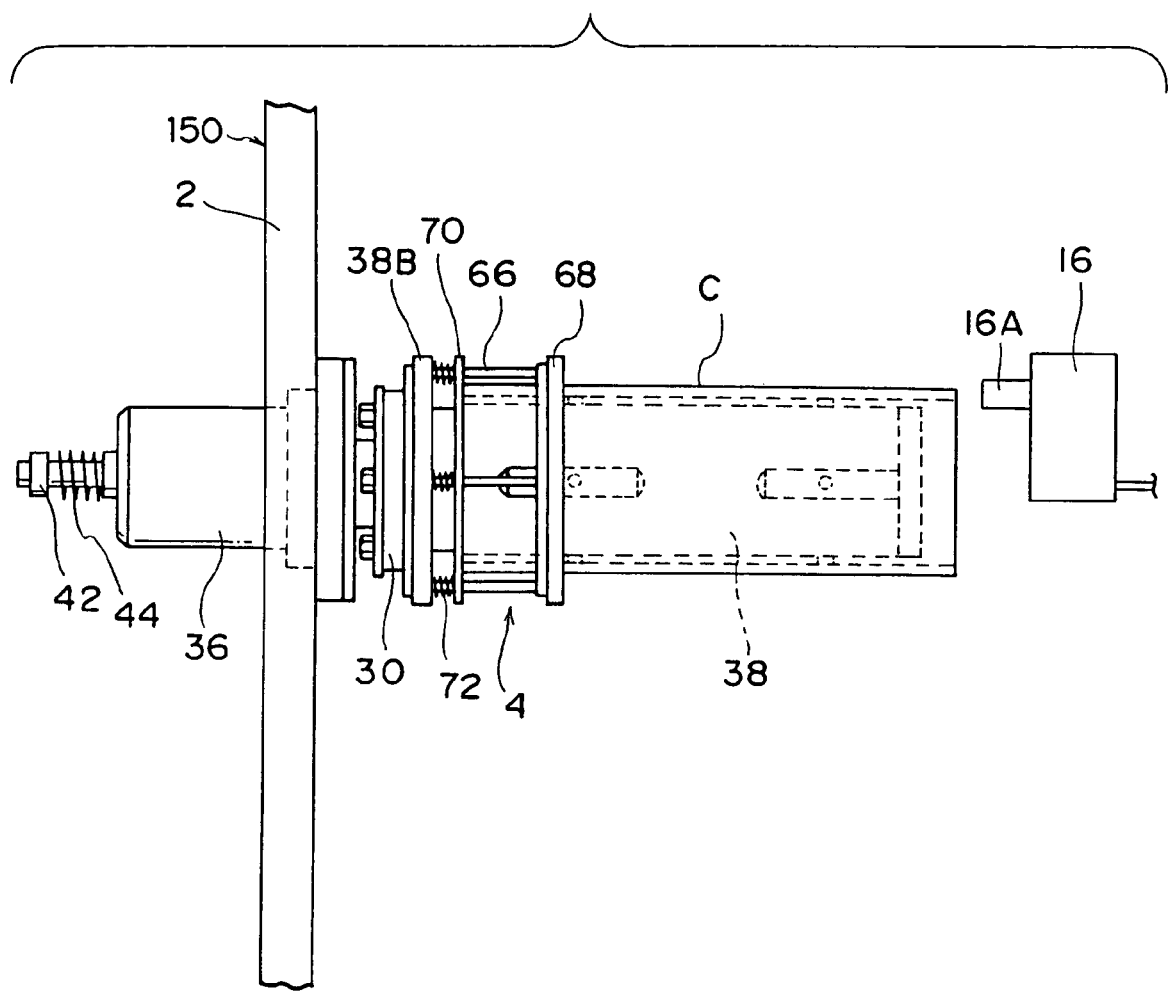
FIG. 12 is a side view showing the positional relationship, as seen from the left in FIG. 1, between the code reader and the paper tube holding device mounted to the turret.

FIG. 12 illustrates the positional relationship between the code reader 16 and the paper tube holding device 4 mounted to the turret 2, as seen from the left in FIG. 1. The schematic structure of the code reader 16 is shown in FIG. 13.

Figure 13:
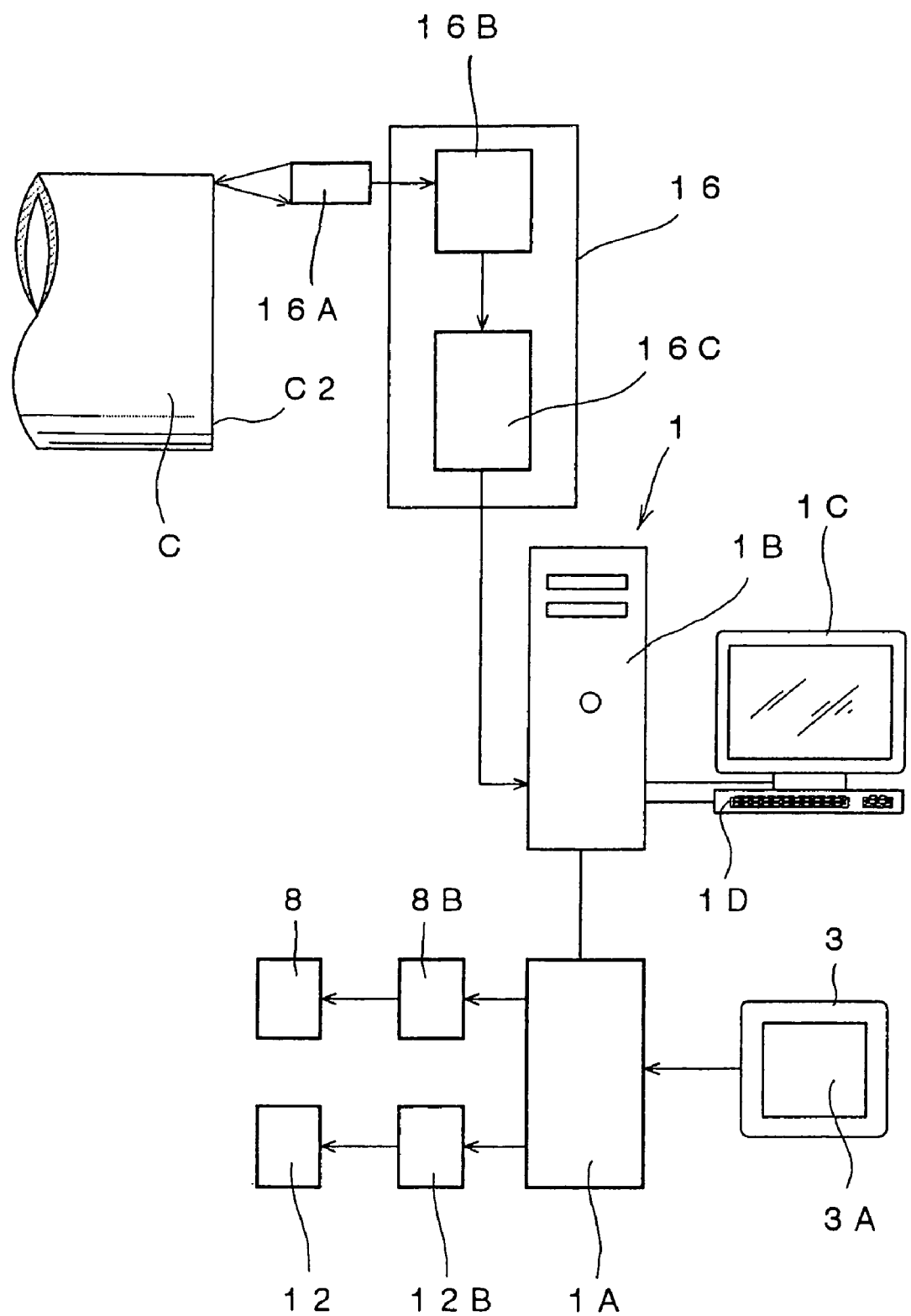
FIG. 13 is an enlarged view showing the structure of the code reader shown in FIG. 12.

As shown in FIGS. 12 and 13, the code reader 16 is provided with a photointerrupter 16A which irradiates infrared rays onto the information code printed on the end surface C2 of the paper tube C, and receives, among these infrared rays, the infrared rays which are reflected by the end surface, and outputs electric current corresponding to the intensity of the received infrared rays; an analog signal processing circuit 16B which converts the electric current output outputted from the photointerrupter 16A into voltage output; and an A/D converting circuit 16C which converts the analog voltage output outputted from the analog signal processing circuit 16B into digital output of a finite number of stages. For example, a 16-bit A/D converting circuit can be used as the A/D converting circuit 16C. The digital output outputted from the A/D converting circuit 16C is, as will be described later, inputted to an examination computer 1B and converted into a rectangular wave signal, and it can be judged whether or not the information code expresses correct recording paper information.

As shown in FIG. 12, the code reader 16 is disposed such that, after the information code printed on the end surface C2 of the paper tube C is heated and dried by the heating plate 14, when the turret 2 rotates by ⅛ of a rotation clockwise in FIG. 1, an infrared ray entry/exit opening of the photointerrupter 16A opposes the end surface C2 of the paper tube C on which the information code has been printed and dried.

Figure 14:
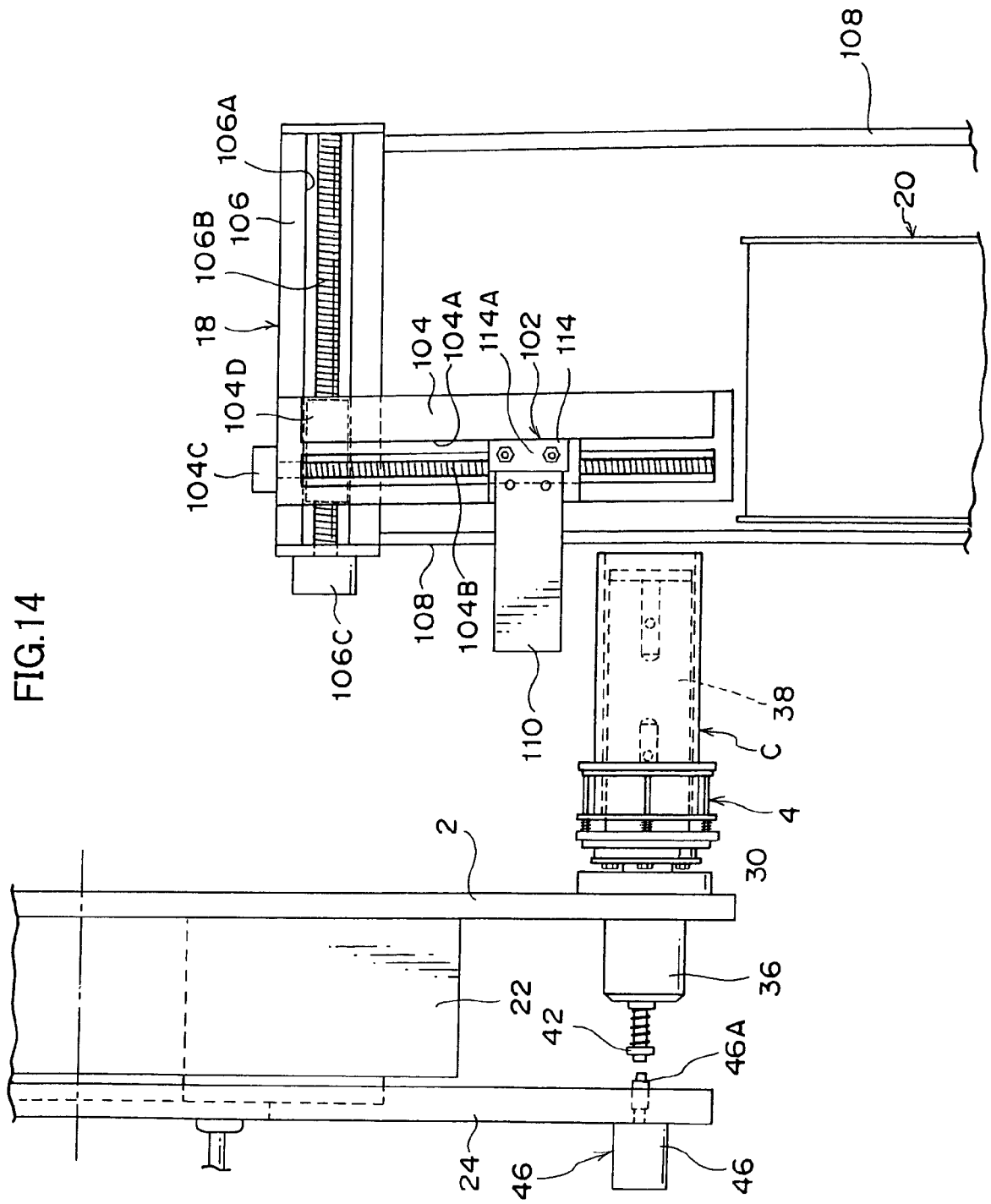
FIG. 14 is a side view, as seen from the left in FIG. 1, showing the detailed structure of the paper tube detaching device.
Figure 15:
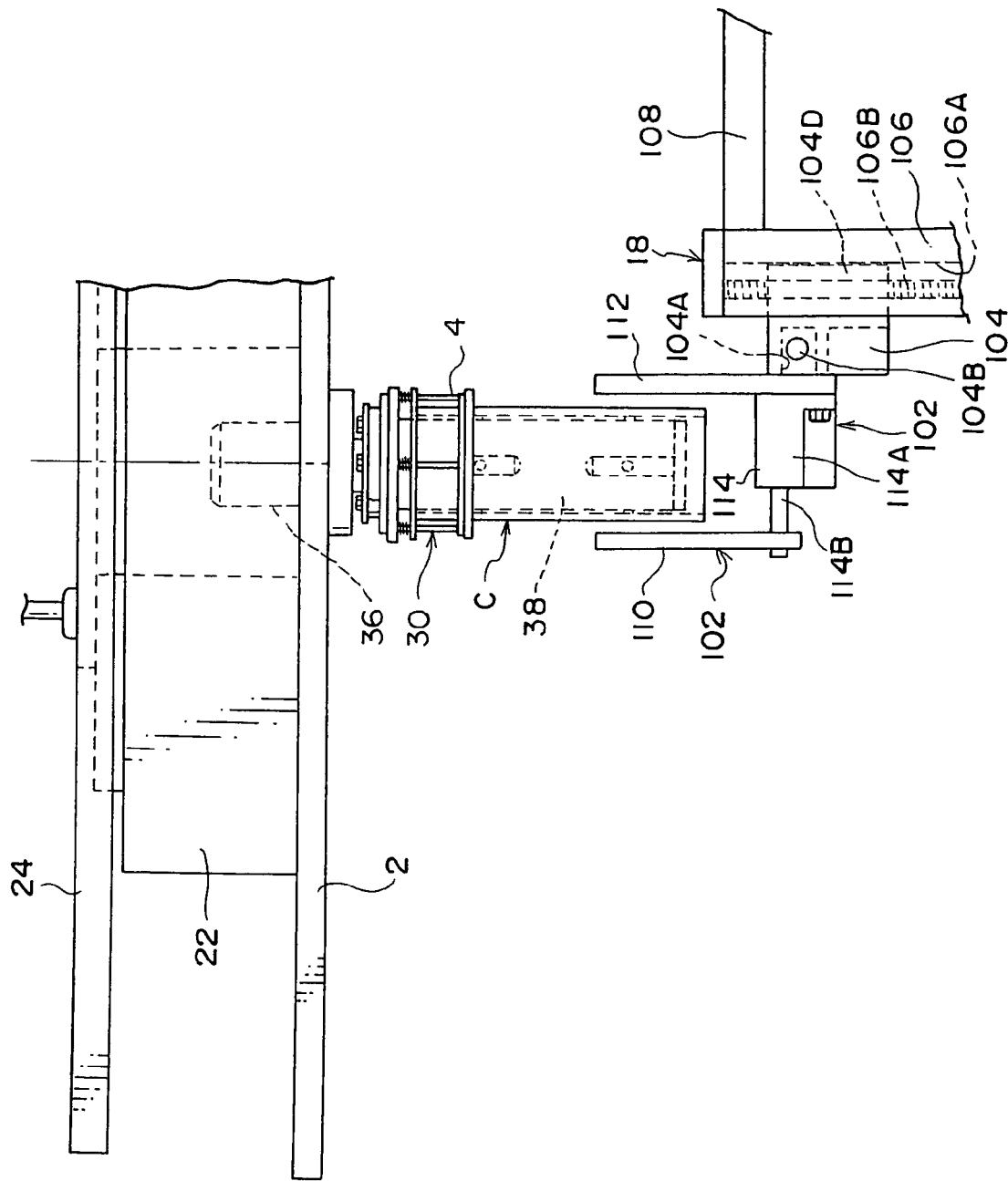
FIG. 15 is a top view as seen from above the paper tube detaching device shown in FIG. 14.
Figure 16:
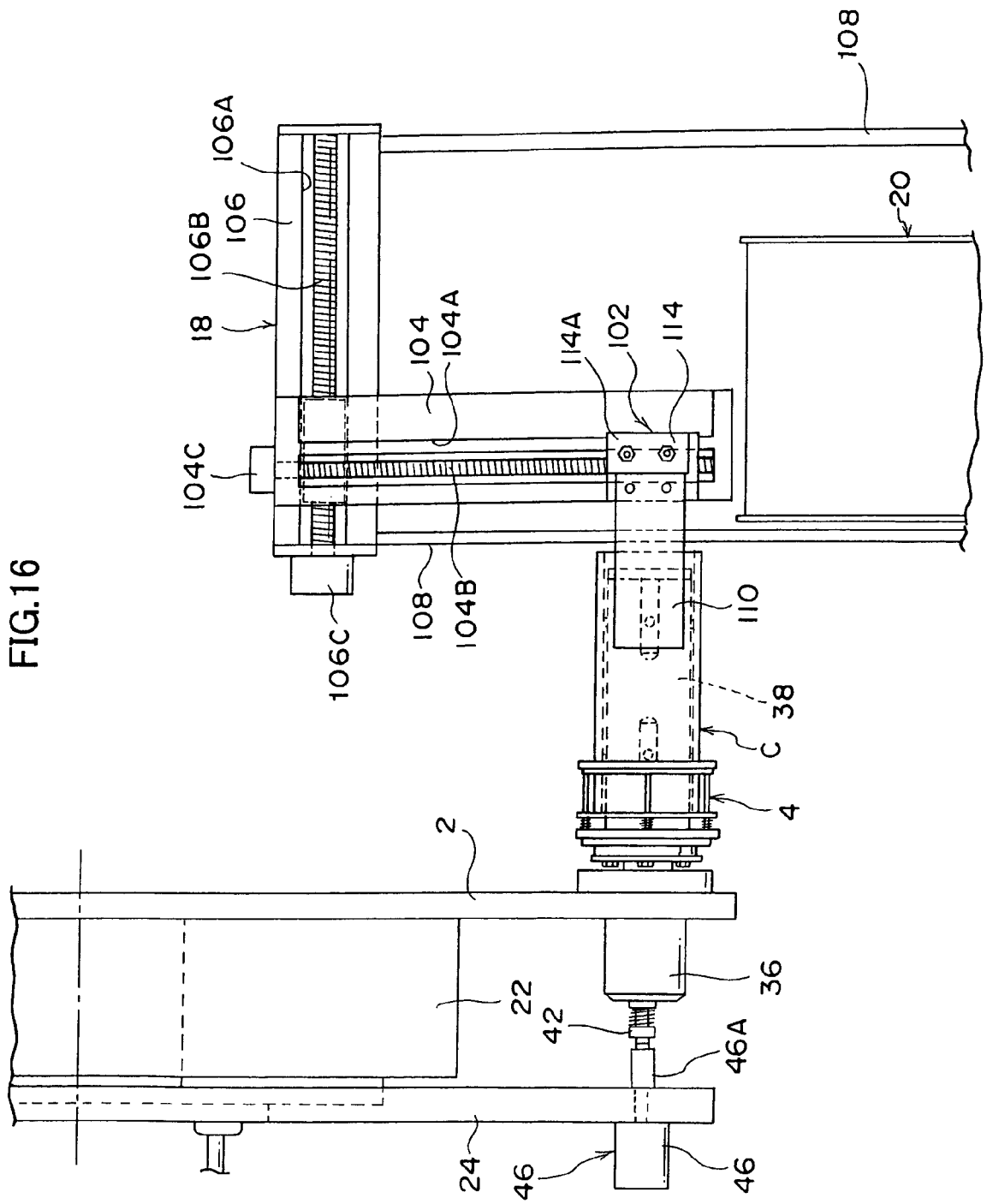
FIG. 16 is a schematic view showing an operation of detaching a paper tube C of the paper tube detaching device shown in FIG. 14.
Figure 17:
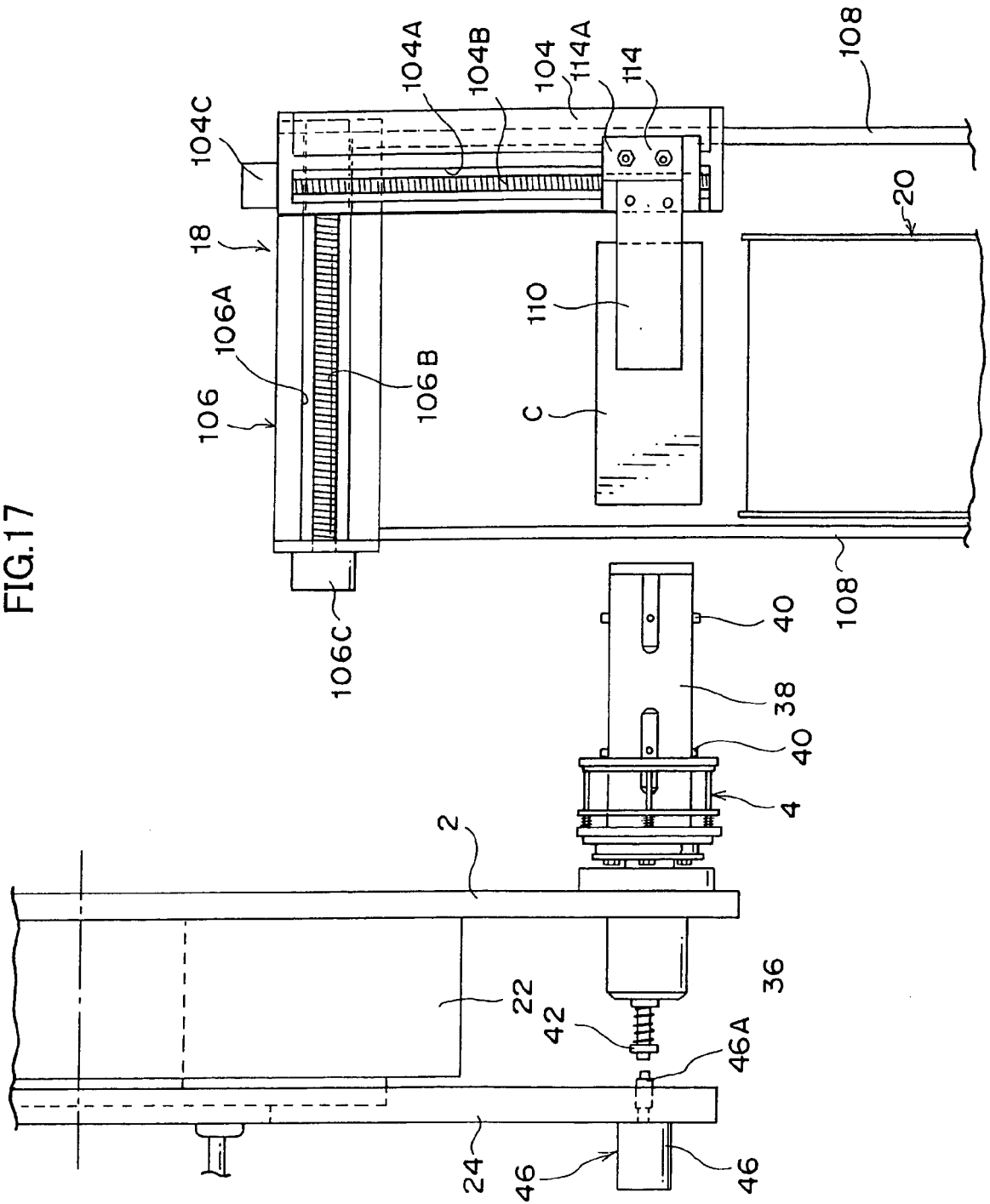
FIG. 17 is a schematic view showing, together with FIG. 16, the operation of detaching the paper tube of the paper tube detaching device shown in FIG. 14.

The detailed structure of the paper tube detaching device 18 is shown in FIGS. 14 through 17. FIG. 14 shows the paper tube detaching device 18 as seen from the left in FIG. 1, and FIG. 15 shows the paper tube detaching device 18 as seen from above. Further, the operations of the paper tube detaching device 18 detaching the paper tube C from the paper tube holding device 4 are shown in FIGS. 16 and 17. In FIGS. 14 through 17, reference numerals which are the same as those in FIGS. 1 through 7A and 7B denote the same elements as the elements denoted by those numerals in FIGS. 1 through 9. Further, the driving pulley 26 which rotates the paper tube installing tube 38, the driving belt 28, the tension pulley 32, and the seven paper tube holding devices 4 other than the paper tube holding device 4 at the position opposing the paper tube detaching device 18, are omitted from FIGS. 14 through 17.

As shown in FIGS. 14 and 15, the paper tube detaching device 18 has a paper tube grasping device 102 which grasps the paper tube C from the left-right direction in FIGS. 1 and 15 at the time when the paper tube C is to be removed from the paper tube installing tube 38; a vertical guide 104 which supports the paper tube grasping device 102 at the proximal portion thereof, and simultaneously guides the paper tube grasping device 102 in vertical directions; a horizontal guide 106 which supports the vertical guide 104 at the upper end portion thereof, and simultaneously guides the vertical guide 104 in the direction of approaching and the direction of moving away from the paper tube holding device 4; and a pedestal 108 which is fixed on the base B and which holds the horizontal guide 106 horizontally at the top end portion.

The paper tube grasping device 102 extends parallel to the paper tube installing tube 38 at the paper tube holding device 4, and has paper tube grasping members 110 and 112, which are a pair of plate-shaped members which grasp the paper tube C from the left-right direction in FIG. 15, and a paper tube grasping portion opening/closing device 114 which makes the paper tube grasping members 110 and 112 approach or move away from each other.

The paper tube grasping portion opening/closing device 114 has an opening/closing device main body 114A, which is supported at the vertical guide 104 and moves in vertical directions, and a piston-shaped member 114B, which is rod-shaped and projects or is pulled-in along the horizontal direction from the opening/closing device main body 114A. The paper tube grasping member 112 is formed to be slightly longer than the paper tube grasping member 110, and is fixed, at the proximal portion thereof, to the opening/closing device main body 114A. On the other hand, the paper tube grasping member 110 is fixed, at the proximal portion thereof, to the distal end portion of the piston-shaped member 114B. An air pressure cylinder, a hydraulic cylinder, a ball screw, or the like may be used as the paper tube grasping portion opening/closing device 114.

An opening portion 104A is provided in the vertical guide 104 along the longitudinal direction. A ball screw 104B is provided at the vertical guide 104 at the inner side of the opening portion 104A along the longitudinal direction. A motor 104C which rotates the ball screw 104B is provided at the upper end of the vertical guide 104. Similarly, at the horizontal guide 106 as well, an opening portion 106A is provided along the longitudinal direction. A ball screw 106B is provided at the horizontal guide 106 at the inner side of the opening portion 106A along the longitudinal direction. Further, a motor 106C, which rotates the ball screw 106B, is mounted to the end surface of the horizontal guide 106 at the side facing the turret 2.

The ball screw 104B screws together with one portion, and specifically, the proximal portion, of the opening/closing device main body 114A at the paper tube grasping device 102. The opening/closing device main body 114A slides vertically within the opening portion 104A of the vertical guide 104.

A vertical guide supporting member 104D is fixed to the upper end portion of the vertical guide 104. The vertical guide supporting member 104D is provided slidably within the opening portion 106A of the horizontal guide 106, and screws together with the ball screw 106B. When the ball screw 106B rotates, the vertical guide supporting member 104D slides within the opening portion 106A along the direction of approaching the turret 2 or the direction of moving away from the turret 2.

When the motor 104C at the vertical guide 104 is rotated, the ball screw 104A rotates. Thus, the opening/closing device main body 114A moves upward or downward. Accompanying this movement, the paper tube grasping portion opening/closing device 114 also moves up or down. Then, when the ball screw 104A stops, because the opening/closing device main body 114A is held at a constant height, the paper tube grasping portion opening/closing device 114 also is held at a constant height.

While the paper tube detaching device 18 is at rest, as shown in FIG. 14, the paper tube grasping device 102 is stopped on the vertical guide 104 at a position higher than the paper tube holding device 4, so as to not hinder rotation of the turret 2.

When the paper tube C is to be removed from the paper tube holding device 4 positioned at the lowermost position of the turret 2, as shown in FIG. 16, the ball screw 104B rotates, and the paper tube grasping device 102 moves downward along the vertical guide 104 to the height of the paper tube holding device 4. Next, the ball screw 106B rotates, and the vertical guide 104 is guided by the horizontal guide 106 and moves in the direction toward the turret 2. In other words, the vertical guide 104 moves in the direction of approaching the paper tube holding device 4. In this way, the paper tube grasping device 102 approaches the paper tube holding device 4.

When the paper tube grasping device 102 approaches the paper tube holding device 4, and the paper tube grasping members 110 and 112 are positioned substantially directly at the sides of the paper tube C installed at the paper tube holding device 4, the opening/closing device main body 114A makes the paper tube grasping member 110 approach the paper tube grasping member 112, and the paper tube C is grasped by the paper tube grasping members 110 and 112.

Simultaneously, the pull-in rod pushing member 46A is projected toward the fixed portion 36 at the paper tube holding device 4 from the pushing rod pushing device 46, and the chuck pin pushing rod 42 is pushed so as to be pushed into the fixed portion 36. Due to the chuck pin pushing rod 42 being pushed, the chuck pins 40, which were projected out from the side surface of the paper tube installing tube 38 at the paper tube holding device 4, are pulled-in into the paper tube installing tube 38.

When the chuck pins 40 are pulled-in into the paper tube installing tube 38, in the state in which the paper tube grasping members 110 and 112 are grasping the paper tube C, when the vertical guide 104 is moved in the direction of moving away from the paper tube holding device 4, as shown in FIG. 17, the paper tube C is pulled off of the paper tube installing tube 38. When the paper tube C has been pulled off of the paper tube installing tube 38, the pull-in rod pushing member 46A is pulled-in into the pushing rod pushing device 46, and the pushing of the chuck pin pushing rod 42 is cancelled.

When the paper tube C is pulled off of the paper tube installing tube 38, the paper tube grasping device 102 is lowered further along the vertical guide 104, and the pulled-off paper tube C is placed at the paper tube classifying device 20.

The paper tube classifying device 20 has the function of classifying the paper tube C, which has been detached from the paper tube holding device 4 by the paper tube detaching device 18, into a good article or a poor article on the basis of a judgment on the goodness/poorness of the paper tube C which is carried out by the examination computer 1B on the basis of digital output from the code reader 16.

Figure 18:
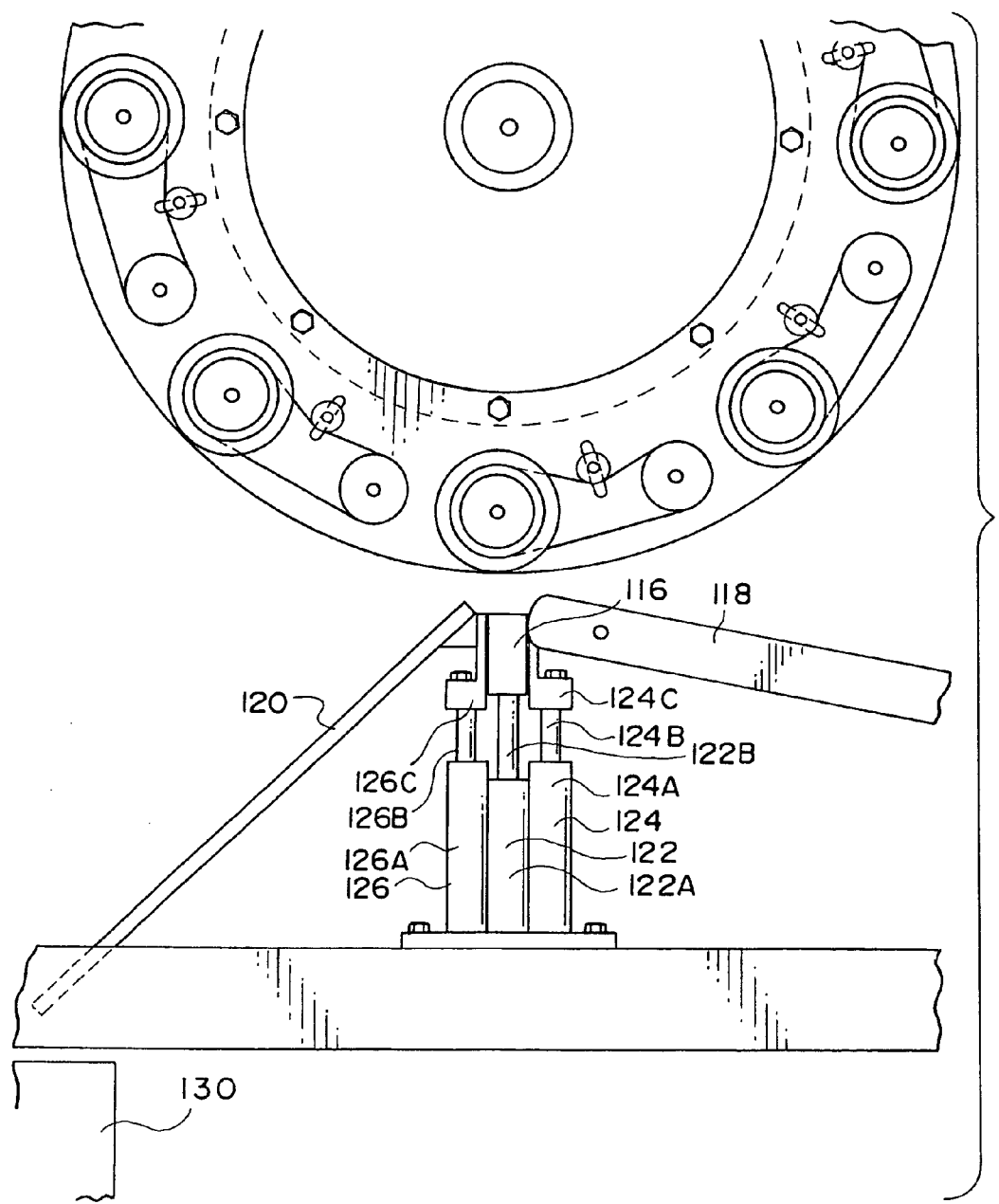
FIG. 18 is an enlarged view showing in detail the structure of a paper tube classifying device.
Figure 19A:
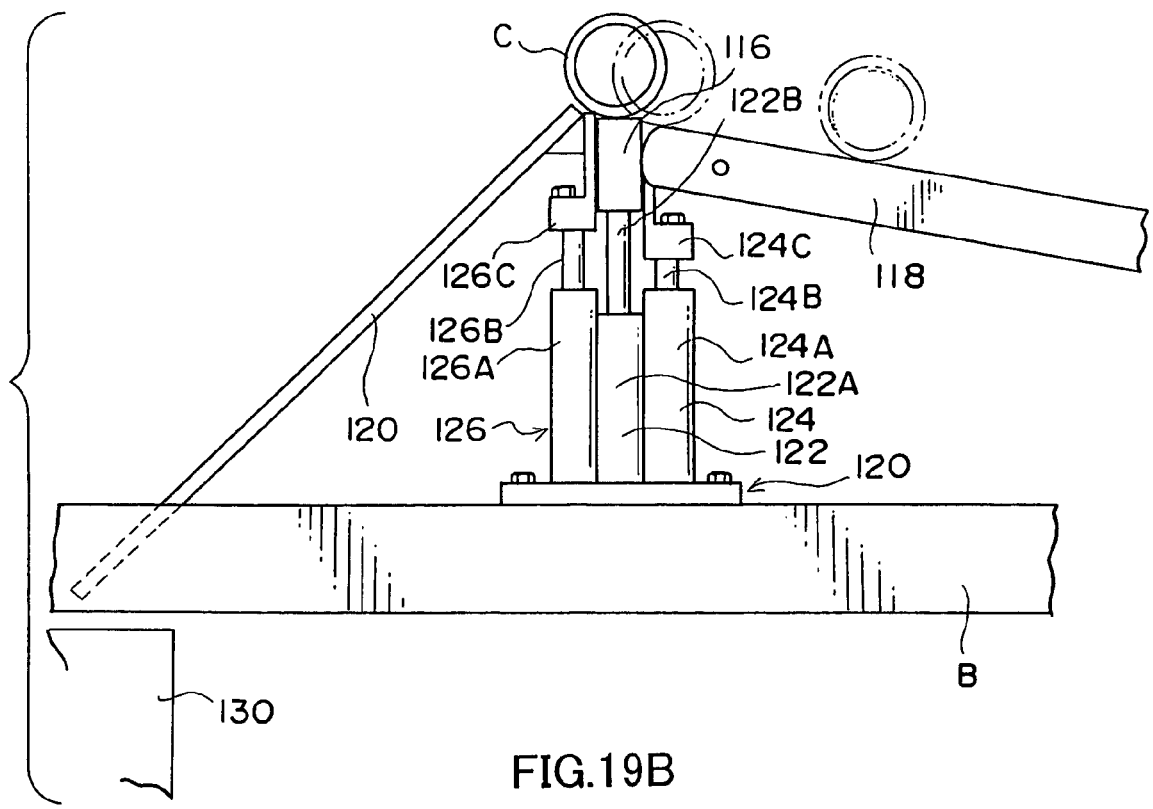
FIGS. 19A and 19B are operational views showing operations of the paper tube classifying device shown in FIG. 18.
Figure 19B:
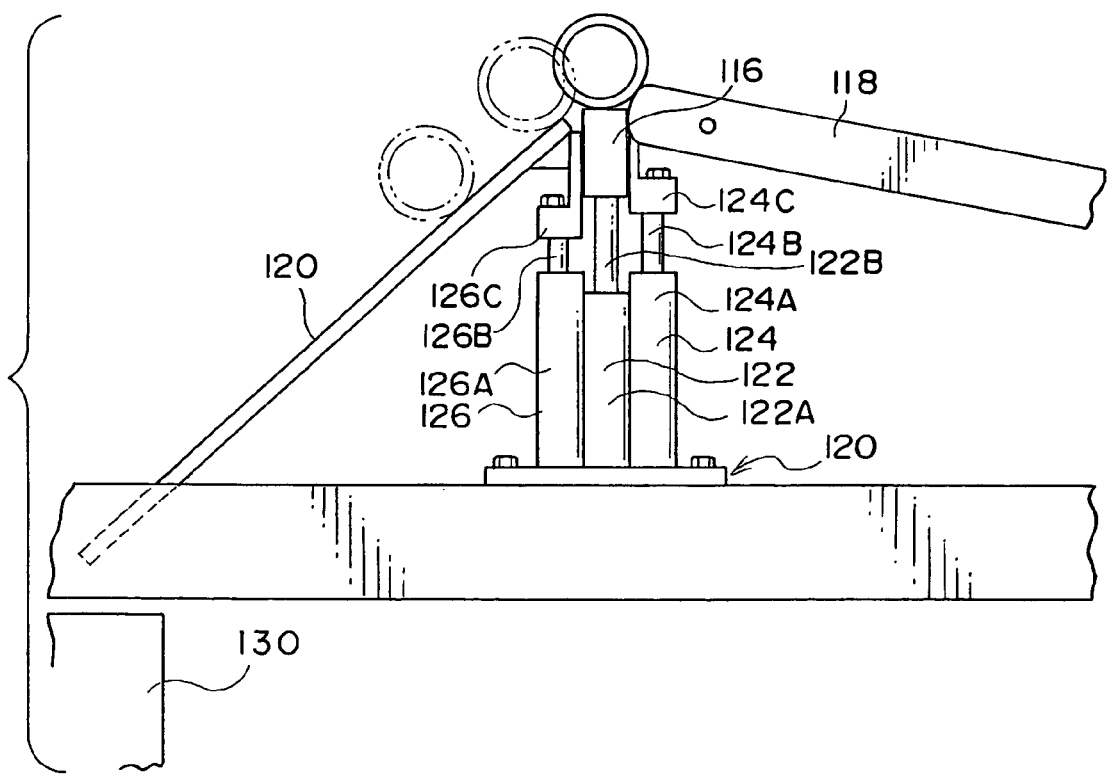

FIG. 18 shows the paper tube classifying device 20 and the vicinity thereof as seen from the front. FIGS. 19A and 19B show the operations for classifying into good articles and poor articles at the paper tube classifying device 20. In FIGS. 18, 19A and 19B, the same reference numerals as in FIG. 1 through FIGS. 7A, 7B denote the same structural elements. Note that the paper tube installing device 6 and the paper tube detaching device 18 are omitted from FIG. 18.

The paper tube classifying device 20 has a paper tube loading stand 116 on which the paper tube C, which has been detached by the paper tube detaching device 18, is initially loaded; a good article chute 118 which extends toward the right in FIG. 18 from the paper tube loading stand 116, and which discharges the good articles among the paper tubes C; and a poor article chute 120 which extends from the paper tube loading stand 116 at the side opposite the good article chute 118, and which discharges to the poor article recovery box 130 the poor articles among the paper tubes C.

The paper tube loading stand 116 is supported from beneath by a loading stand height adjusting device 112. The good article chute 118 and the poor article chute 120 are supported from beneath by a good article chute supporting device 124 and a poor article chute supporting device 126, respectively, at the end portions at the respective sides adjacent to the paper tube supporting stand 116.

The loading stand height adjusting device 122, the good article chute supporting device 124, and the poor article chute supporting device 126 respectively have base portions 122A, 124A, 126A in whose interiors are provided cylinders which extend in the vertical direction, and plungers 122B, 124B, 126B which slide in the interiors of the cylinders in the base portions 122A, 124A, 126A. As shown in FIGS. 18, 19A, and 19B, the base portions 122A, 124A, 126A are preferably fixed to the base B in a state of being fixed together integrally. For example, air pressure cylinders, hydraulic cylinders, ball screws, or the like can be used as the loading stand height adjusting device 122, the good article chute supporting device 124, and the poor article chute supporting device 126. Note that the upper ends of the plunger 124B and the plunger 126B are joined to the good article chute 118 and the poor article chute 120 by plunger joining members 124C and 126C, respectively. The plunger joining members 124C and 126C are preferably formed such that the angles thereof with the good article chute 118 and the poor article chute 120 are variable to a certain extent.

When the examination computer 1B is not outputting a signal judging the goodness/poorness of the paper tube C, as shown in FIG. 18, the heights of the plungers 122B, 124B and 126B at the loading stand height adjusting device 122, the good article chute supporting device 124 and the poor article chute supporting device 126 are adjusted such that the end portions of the good article chute 118 and the poor article chute 120 at the sides adjacent to the paper tube loading stand 116 are slightly higher than the paper tube loading stand 116.

When the examination computer 1B judges that the paper tube C is a good article on the basis of the digital output from the code reader 16, as shown in FIG. 19A, the height of the plunger 124B of the good article chute supporting device 124 decreases, and the end portion of the good article chute 118 at the side adjacent to the paper tube loading stand 116 becomes slightly lower than the paper tube loading stand 116. Accordingly, as shown by the two-dot chain line in FIG. 19A, the paper tube C loaded on the paper tube loading stand 116 falls from the paper tube loading stand 116 toward the good article chute 118, rolls down the good article chute 118, and is discharged to the exterior of the code printing device 150.

On the other hand, when the examination computer 1B judges that the paper tube C is a poor article on the basis of the digital output from the code reader 16, as shown in FIG. 19B, the height of the plunger 126B of the poor article chute supporting device 126 decreases, and the end portion of the poor article chute 120 at the side adjacent to the paper tube loading stand 116 becomes slightly lower than the paper tube loading stand 116. Accordingly, as shown by the two-dot chain line in FIG. 19B, the paper tube C loaded on the paper tube loading stand 116 falls from the paper tube loading stand 116 toward the poor article chute 120, and rolls down the poor article chute 120 toward the poor article recovery box 130.

As shown in FIG. 1, the central controlling computer 1A, which controls the entire code printing device 150, is connected to the code printing device 150. A touch-panel-type input device 3, which is for input of various types of commands and the like, is connected to the central controlling computer 1A.

A touch panel 3A, which is for input of necessary control information, is provided at the touch-panel-type input device 3.

A base layer printer control device 8B, which controls the base layer printer 8, and an information code printer control device 12B, which controls the information code printer 12, are connected to the central controlling computer 1A.

The examination computer 1B, which, as described above, judges whether the paper tube is a good article or a bad article from the results of reading of the code reader 16, is connected to the A/D converting circuit 16C at the code reader 16 of the code printing device 150.

The examination computer 1B is connected to the central controlling computer 1A. Further, a keyboard 1D, which is for calling up data relating to the results of judgement from the examination computer 1B and for carrying out analysis, and a display 1C, which displays the results of analysis of data, are connected to the examination computer 1B.

The processes for printing the information code on the paper tube C and classifying paper tubes C into good articles and poor articles at the code printing device 150, will be described hereinafter.

Figure 20:
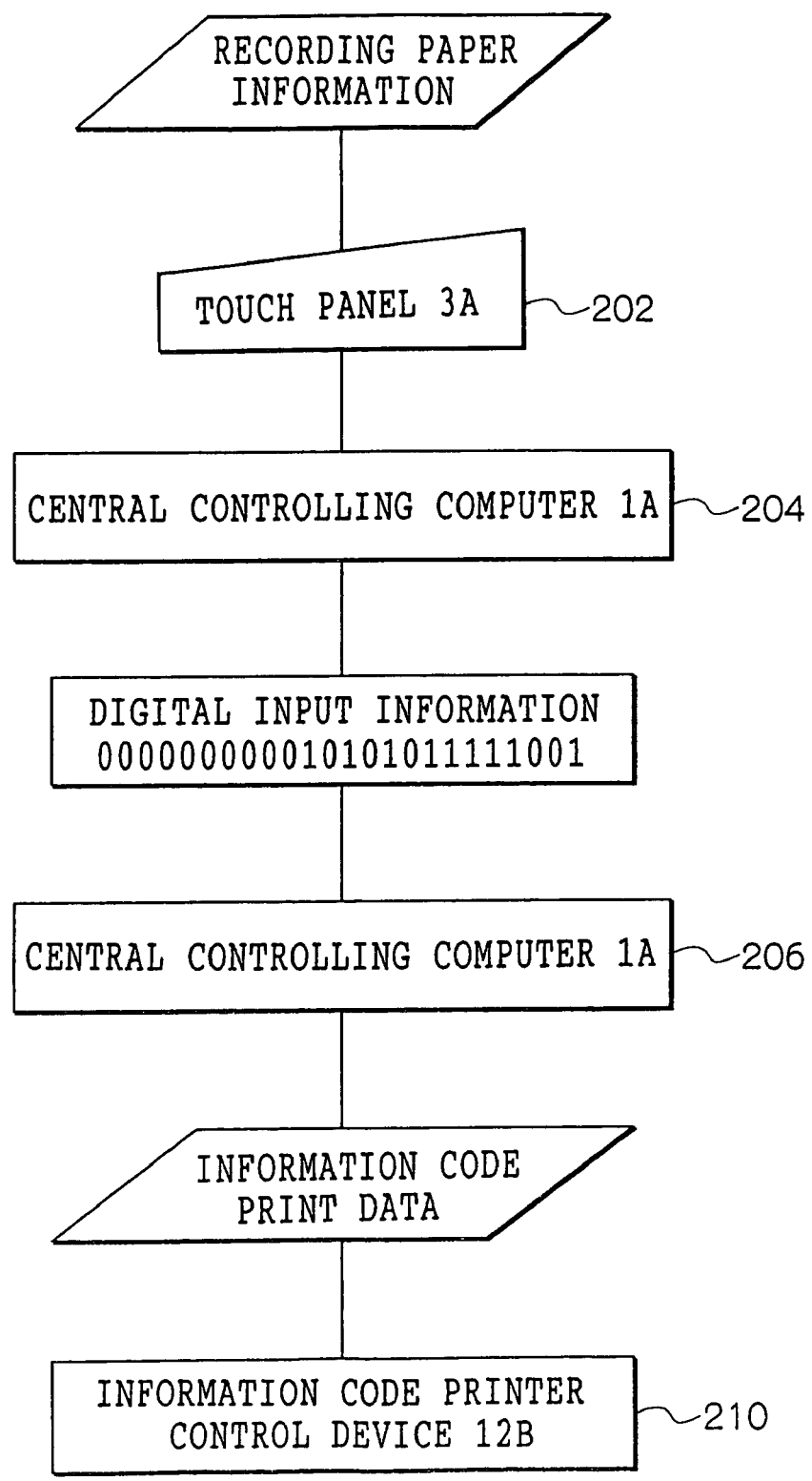
FIG. 20 is a flowchart showing processes of printing an information code on a paper tube, on the basis of recording paper information inputted from a keyboard provided at the code printing device of FIG. 1.

The process of printing the information code on the paper tube C on the basis of information inputted from the touch panel 3A is shown in FIG. 20.

As shown in FIG. 20, in step 202, in accordance with a command displayed on the touch panel 3A, recording paper information relating to the information recording paper wound on the paper tube C is inputted from the touch panel 3A by using numbers, letters of the alphabet, or the like.

The recording paper information inputted from the touch panel 3A is, in step 204, transferred to the central controlling computer 1A. In step 206, at the central controlling computer 1A, the information is converted into, for example, the 24-bit digital input signal:

"000000000010101011111001",

Next, in step 206, at the central controlling computer 1A, the digital input signal is converted into information code print data which expresses the arrangement between infrared ray reflecting sections and infrared ray absorbent sections in accordance with a predetermined rule. The central controlling computer 1A outputs a command, which states that the infrared ray absorbent sections are to be printed in accordance with the information code print data, to the base layer printer control device 8B and the information code printer control device 12B.

Figure 21A:
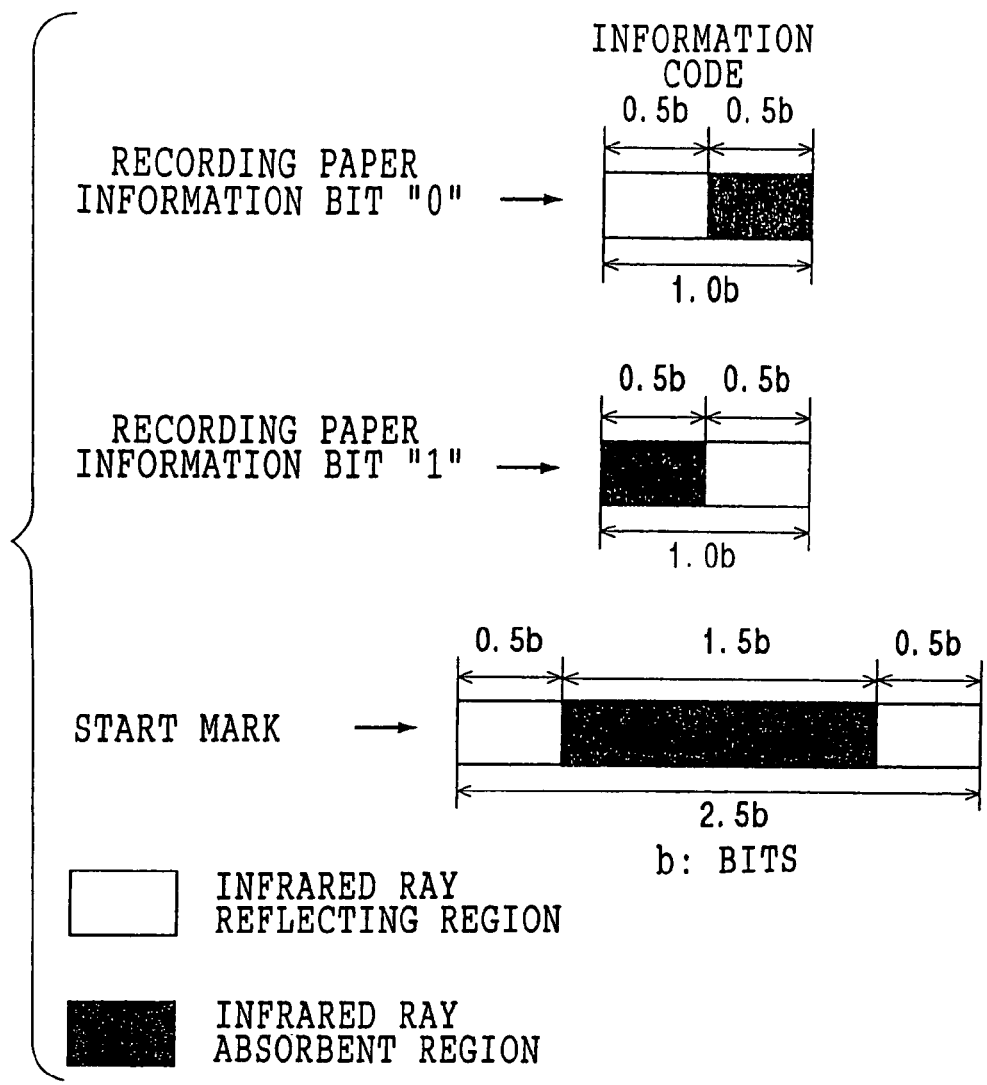
FIGS. 21A and 21B are schematic diagrams showing processes of converting, into information code print data, a digital input signal obtained by converting recording paper information inputted from the keyboard, and an example of the information code print data obtained by converting the digital input signal.
Figure 21B:
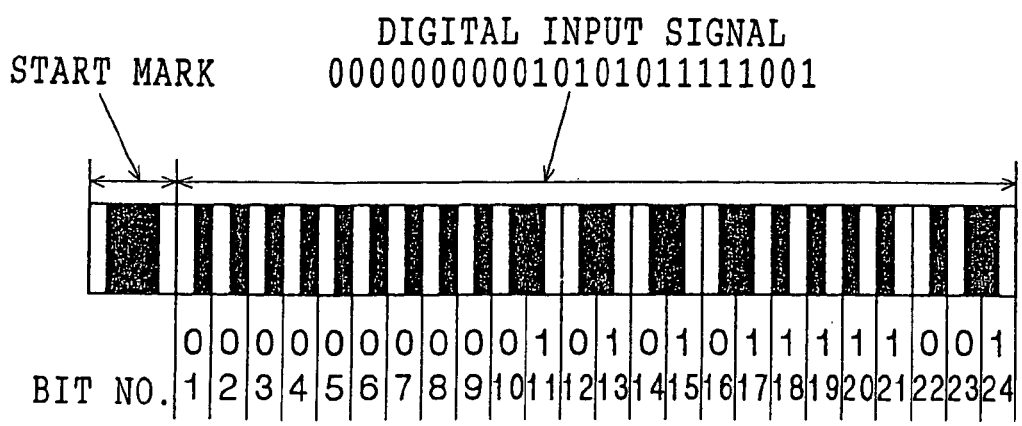

Examples of the rule for converting the digital input signal into information code print data, and the information code print data obtained by converting the digital input signal are shown in FIGS. 21A and 21B.

In the central controlling computer 1A, in accordance with, for example, the Manchester encoding method, i.e., as shown in FIG. 21A, a code conversion method in which:

a. the "0" of the digital input signal is converted into a first unit arrangement in which an infrared ray absorbent section is positioned after an infrared ray reflecting section, and b. the "1" of the digital input signal is converted into a second unit arrangement in which an infrared ray reflecting section is positioned after an infrared ray absorbent section, the first unit arrangement and the second unit arrangement are allocated to the "0"s and "1"s of the digital input signal "000000000010101011111001". Then, a start mark, in which three infrared ray absorbent sections are continuous, is provided at the leading end portion of the arrangement of the first unit arrangements and the second unit arrangements. The start mark is formed from a total of five sections, which are three infrared ray absorbent sections and two infrared ray reflecting sections which are adjacent before and after the three infrared ray absorbent sections, and shows the starting point of the information code. In this way, the digital input signal is converted into the information code print data shown in FIG. 21B. Note that, in FIGS. 21A and 21B, the white rectangles represent sections at which infrared ray reflecting sections are to be provided, and the black rectangles represent sections at which infrared ray absorbent sections are to be provided.

The central controlling computer 1A outputs, to the turret 2, the paper tube installing device 6, the base layer printer control device 8B, and the information code printer control device 12B at the code printing device 150, a command which expresses that the information code is to be printed in the counterclockwise direction on the end surface of the paper tube C in accordance with the information code print data.

The paper tube installing device 6 receives the command from the central controlling computer 1A, and installs the paper tube C at the paper tube installing tube 38 of the paper tube holding device 4.

When the paper tube C has been installed at the paper tube holding device 4, due to a command from the central controlling computer 1A, the servo motor 22 rotates the turret 2 by ⅛ of a rotation clockwise in FIGS. 1 and 2.

When the turret 2 rotates ⅛ of a rotation clockwise, the turret 2 stops. At this time, the paper tube holding device 4, at which the paper tube C has been installed by the paper tube installing device 6, is moved to a position opposing the base layer printer 8. The base layer printer control device 8B receives a command from the central controlling computer 1A, and outputs a control command to the base layer printer 8. The base layer printer 8 receives the control command from the base layer printer control device 8B, and prints a base layer on the end surface of the paper tube C.

After the base layer has been printed on the end surface of the paper tube C, the servo motor 22 again rotates the turret 2 by ⅛ of a rotation clockwise. Due to the turret 2 being rotated by ⅛ of a rotation after the base layer has been printed, the paper tube C, on which the base layer was printed at the base layer printer 8, moves to a position opposing the heating plate 10. The end surface of the paper tube C on which the base layer is formed is heated by the heat from the heating plate 10, and the infrared ray non-absorbent ink coated by the base layer printer 8 is dried. Note that temperature data of the heating plate 10 is inputted to the central controlling computer 1A from a temperature adjusting device which controls the heating plate 10.

After drying of the base layer, the turret 2 is rotated by ⅛ of a rotation. The paper tube C, on which the base layer was printed at the base layer printer 8, is moved to a position opposing the information code printer 12.

Here, in the information code print data, as described above, two rectangles which are white and black correspond to one bit of digital information. Because the digital input signal is 24-bit information as described above, the number of rectangles corresponding to the digital input signal at the information code print data is 2 (rectangles)×24 (bits)=48 (rectangles). Further, as described above, the start mark formed from five rectangles is provided at the leading portion of the information code print data. Thus, the number of rectangles in the entire information code print data is 48+5=53 (rectangles).

Accordingly, the rectangle in the information code print data corresponds to one fan-shaped section which is obtained by dividing the end surface of the paper tube C at which the base layer is formed into 53 uniform sections in the circumferential direction.

Here, the central controlling computer 1A rotates the paper tube installing tube 38 at the paper tube holding device 4 which is at the position opposing the information code printer 12, and outputs, to the information code printer control device 12B, a command expressing that infrared ray reading sections are to be printed by infrared ray absorbent ink at the sections corresponding to the black rectangles of the information code print data shown in FIG. 21B. The information code printer control device 12B controls the information code printer 12 in accordance with the command.

Figure 22:
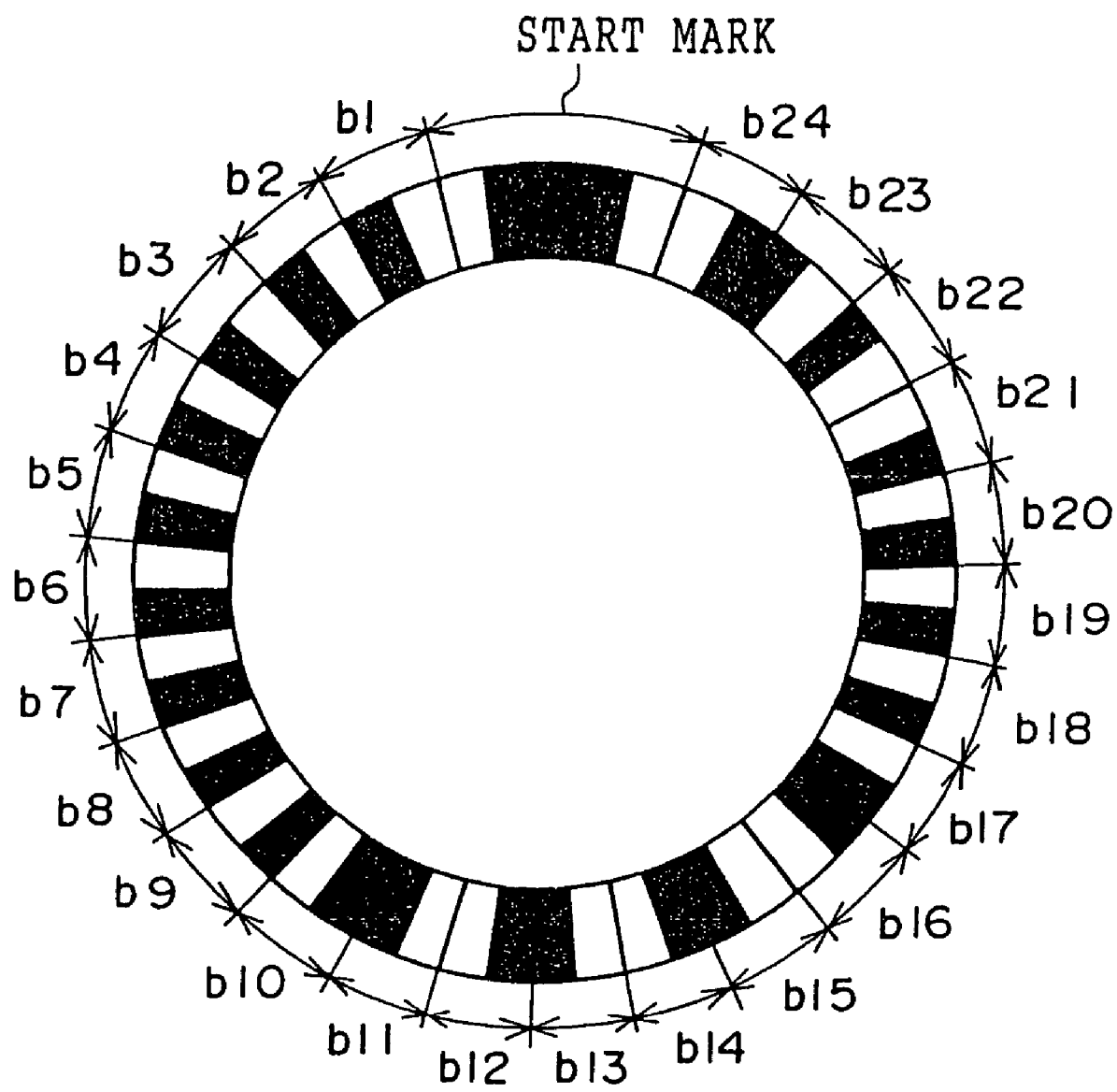
FIG. 22 is an end surface view showing an information code printed on the paper tube C on the basis of the information code print data shown in FIGS. 21A and 21B.

The information code printer 12 is controlled from the information code printer control device 12B so as to coat infrared ray absorbent ink onto the end surface of the paper tube C so as to form the information code in bar code form. The information code which is printed on the paper tube C in this way is shown in FIG. 22.

When the information code is formed at the information code printer 12, the turret 2 is further rotated by ⅛ of a rotation. The paper tube C, on which the information code has been printed by the information code printer 12, moves to a position opposing the heating plate 14, and the information code is dried by the heat from the heating plate 14. Note that temperature data of the heating plate 14 is inputted to the central controlling computer 1A from a temperature adjusting device which controls the heating plate 14.

When the information code has been dried by the heat from the heating plate 14, the turret 2 is further rotated by ⅛ of a rotation. The paper tube C, on which the information code has been formed, moves to a position opposing the code reader 16.

The information code printed by the information code printer 12 is read at the code reader 16. The examination computer 1B converts these results into a digital code signal in accordance with the following processes, and compares the digital code signal with the recording paper information inputted from the touch panel 3A.

The photointerrupter 16A at the code reader 16 irradiates infrared rays toward the information code shown in FIG. 22 which is formed on the end surface of the paper tube C. The photointerrupter 16A receives the infrared rays which are reflected by the information code, and generates electric current output corresponding to the intensity of the received infrared rays.

Figure 23:
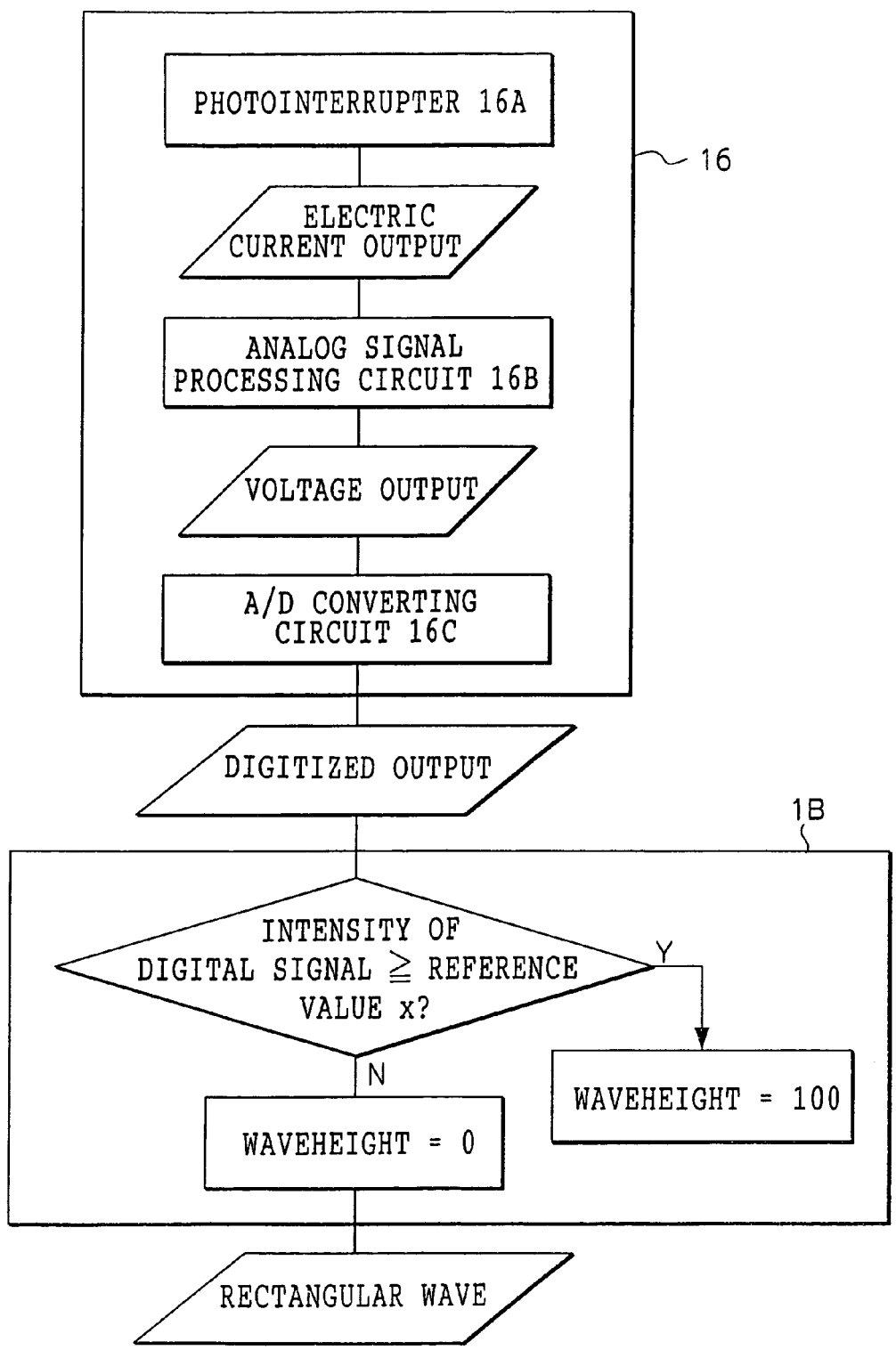
FIG. 23 is a flowchart showing processes for converting, into a rectangular wave, electric current output obtained by reading, at the code reader, the information code printed on the paper tube C.

As shown in FIG. 23, the electric current output which is outputted from the photointerrupter 16A is converted into a voltage signal at the analog signal processing circuit 16B. At the 16-bit A/D converting circuit 16C, the voltage signal is converted into digitized output having an output intensity of $2^{16}$ stages, i.e., 65,536 stages. Note that the phase of the signal is the same from the photointerrupter 16A to the A/D converting circuit 16C.

Figure 24:
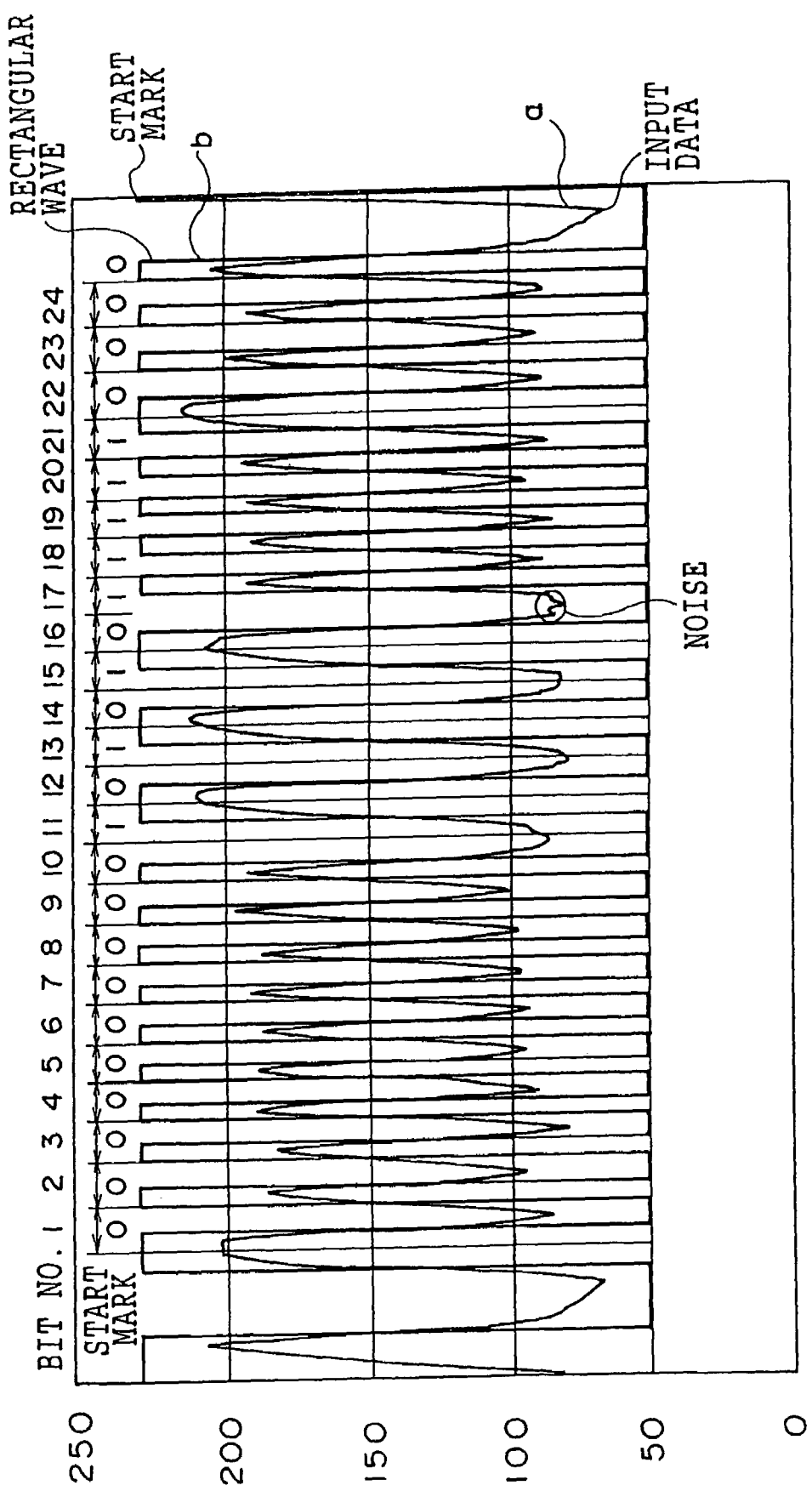
FIG. 24 is a waveform diagram showing a relationship between the electric current output obtained by reading, at the code reader, the information code printed on the paper tube C, and the rectangular wave obtained by converting the electric current output.

The electric current output which is outputted from the photointerrupter 16A is shown by curve a in FIG. 24. The digitized output which is outputted from the A/D converting circuit 16C is also shown by curve a.

The digitized output is transmitted to the examination computer 1B. Then, a clock pulse, which is generated at a rotary encoder (not shown) which is interlocking with the driving motor 34, is also inputted to the examination computer 1B at the time of reading the information code; as a reference for making the bits of the digitized output, i.e., the bits of the information code read by the code reader 16, and the bits of a rectangular waveform output which will be described later, coincide with each other.

At the examination computer 1B, for each bit at the information code, a determination is made as to whether or not the output intensity of the digitized output is a given reference value x or more. When the output intensity of the digitized output at one bit is the reference value x or more, for that bit, a signal having a waveheight of 100% is outputted. For the other bits, when the output intensity of the digitized output is less than the reference value x, for these bits, a signal having a waveheight of 0% is outputted. In this way, the digitized output is converted into a rectangular waveform. The rectangular waveform, which is obtained by converting the digitized output in this way, is shown as curve b in FIG. 24.

At the rectangular wave b, the portions having a waveheight of 100% correspond to the infrared ray reflecting sections in the information code, and the portions having a waveheight of 0% correspond to the infrared ray absorbent sections in the information code. Thus, the examination computer 1B makes the portions having a waveheight of 100% in the rectangular wave b correspond to the white rectangles expressing the infrared ray reflecting sections, and makes the portions having a waveheight of 0% in the rectangular wave b correspond to the black rectangles expressing the infrared ray absorbent sections. In this way, the rectangular wave b is converted into information code print data. The rectangular wave b before conversion is shown in FIG. 25A, and the information code print data after conversion is shown in FIG. 25B.

As shown in FIG. 25A, the rectangular wave b starts by one section of a waveheight of 100%, followed by three sections of a waveheight of 0%, and one section of a waveheight of 100% which follows these sections of a waveheight of 0%. As shown in FIG. 25B, these sections correspond to, in the information code print data after conversion, the initial five sections which are a white rectangle, followed by three black rectangles and one white rectangle. Here, three or more black rectangles being disposed continuously only occurs in the start mark. In the sections from bit 1 to bit 24 expressing the recording paper information, there is no portion in which there are continuously three or more white rectangles or black rectangles.

Here, the examination computer 1B recognizes the initial five sections as a start mark, and judges that the sections expressing the recording paper information start from the section after these initial five sections.

Further, the examination computer 1B converts the information code print data, which is obtained by converting the rectangular wave, into a digital code signal which is formed from an arrangement of 1s and 0s, by the Manchester encoding method in which a "0" is used for a recording paper information bit corresponding to a unit arrangement in which a black rectangle is positioned after a white rectangle, and a "1" is used for a recording paper information bit corresponding to a unit arrangement in which a white rectangle is positioned after a black rectangle. For example, the digital code signal which is obtained by converting, in accordance with process 302, the information code print data shown in FIG. 25B, is

"000000000010101011111001".

Figure 26:
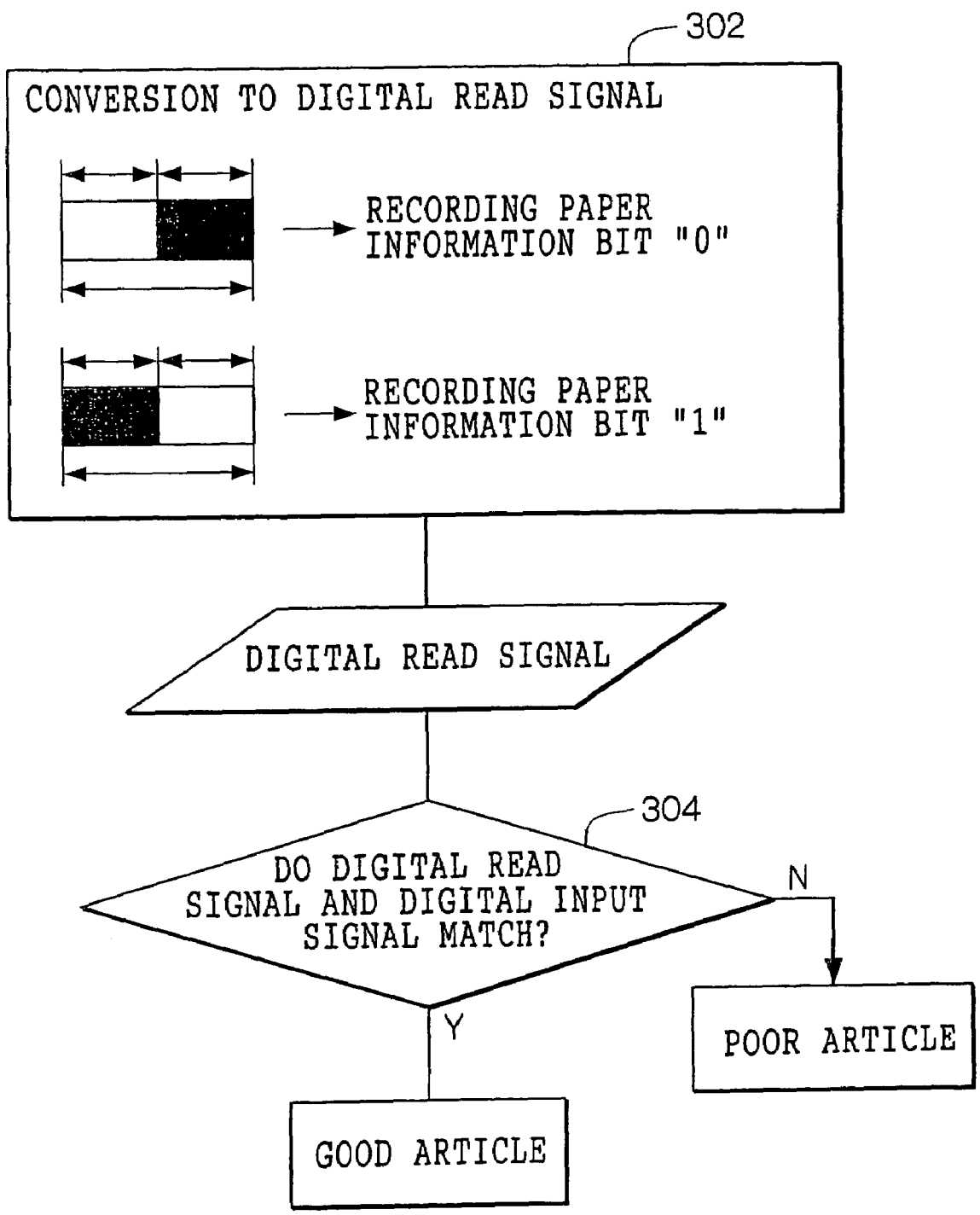
FIG. 26 is a flowchart showing processes, at a computer main body, of converting, into a digital code signal, the information code print data obtained by converting the rectangular wave, and comparing the digital code signal with a digital input signal based on recording paper information inputted from the keyboard, and judging whether the paper tube C is good or not.

As shown by process 304 in FIG. 26, the examination computer 1B compares the digital code signal with a digital input signal obtained by converting the recording information inputted from the touch panel 3A. Then, when these signals completely match, the examination computer 1B judges that the paper tube C is a good article, and outputs, to the central controlling computer 1A, a command stating that the paper tube classifying device 20 is to be controlled such that the paper tube C is guided to the good article chute 118. On the other hand, if there are, in the digital code signal, portions that do not match the digital input signal, the examination computer 1B judges that the paper tube C is a poor article, and outputs, to the central controlling computer 1A, a command stating that the paper tube classifying device 20 is to be controlled such that the paper tube C is guided to the poor article chute 120.

The paper tube classifying device 20 receives the command from the central controlling computer 1A, and guides the paper tube C to the good article chute 118 or rolls the paper tube C down into the poor article recovery box 130.

At the code printing device 150, the paper tube holding device 4 is provided on the turret 2, and the code printing device 150 conveys the paper tube C on which the code is to be printed. Further, the paper tube installing device 6, the base layer printer 8, the heating plate 10, the information code printer 12, the heating plate 14, the code reader 16, the paper tube detaching device 18, and the paper tube classifying device 20 are disposed at the periphery of the turret 2. Thus, the entire device can be made compact, and incorporation into a production line or the like is easy.

Because a code which is an infrared ray readable code can be used as the information code, the information code can be read in a non-contact state. Thus, the efficiency of judging whether the paper tube C is good or poor can be improved.

Further, all of the infrared ray reflecting sections and the infrared ray absorbent sections at the information code are formed by a deep color such as black. Thus, even if the end surface of the paper tube C, on which the information code is printed by the code printing device 150, is copied by electronic photography, only black rings will show up in the copy. It is nearly impossible to copy or tamper with the information code by an inexpensive means.

Both the recording paper information inputted from the touch panel 3A and the information read from the information code are converted into digital signals and compared. Thus, comparison of these two information can be carried out easy and reliably on an existing desktop computer.

Moreover, because the Manchester encoding method is utilized in preparing and reading the information code, three or more infrared ray reflecting sections are not provided continuously, and three or more infrared ray absorbent sections are not provided continuously.

Accordingly, it is possible to easily read the starting point of an information code at the code reader 16 provided at the code printing device 150, with extremely little concern about misreading and by providing, in the information code, a section in which three or more infrared ray reflecting sections or three or more infrared ray absorbent sections are continuous.

As described above, in accordance with the present invention, there is provided a code applying device having the advantages that: the code applying device can efficiently apply a code, which expresses information relating to an information recording paper, by an infrared ray absorbent ink onto at least one end surface of a winding core, which is a winding core on which the information recording paper is wound and which is used at an information recording paper roll; the code applying device can automatically exclude poor goods to which the code was not applied accurately; and the code applying device can easily be incorporated into a production line.

Second Embodiment

A second embodiment of the present invention will be described with reference to FIGS. 27 through 39.

Figure 27:
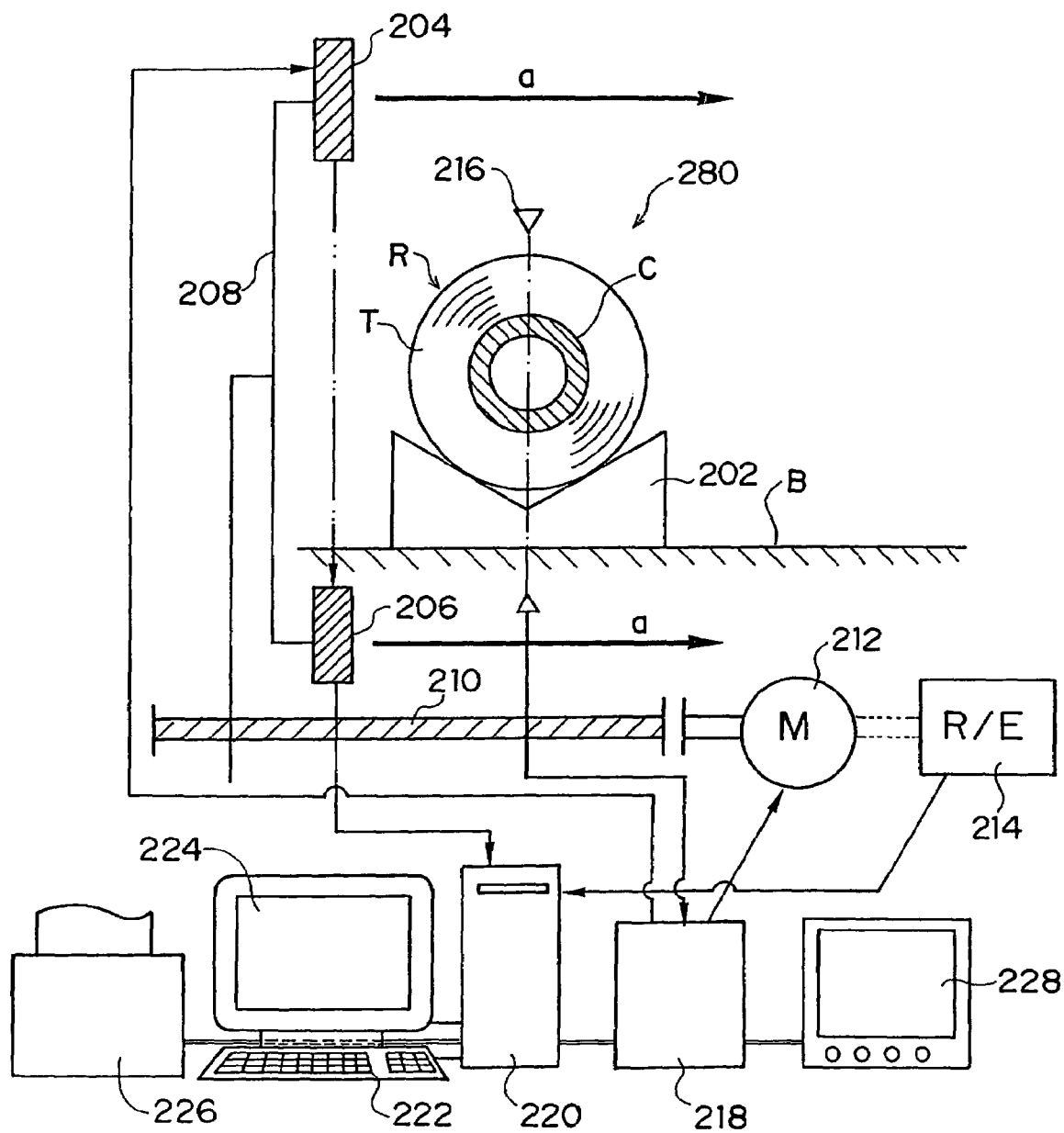
FIG. 27 is a schematic diagram showing the structure of an example of a roll width measuring device relating to the present invention.
Figure 28:
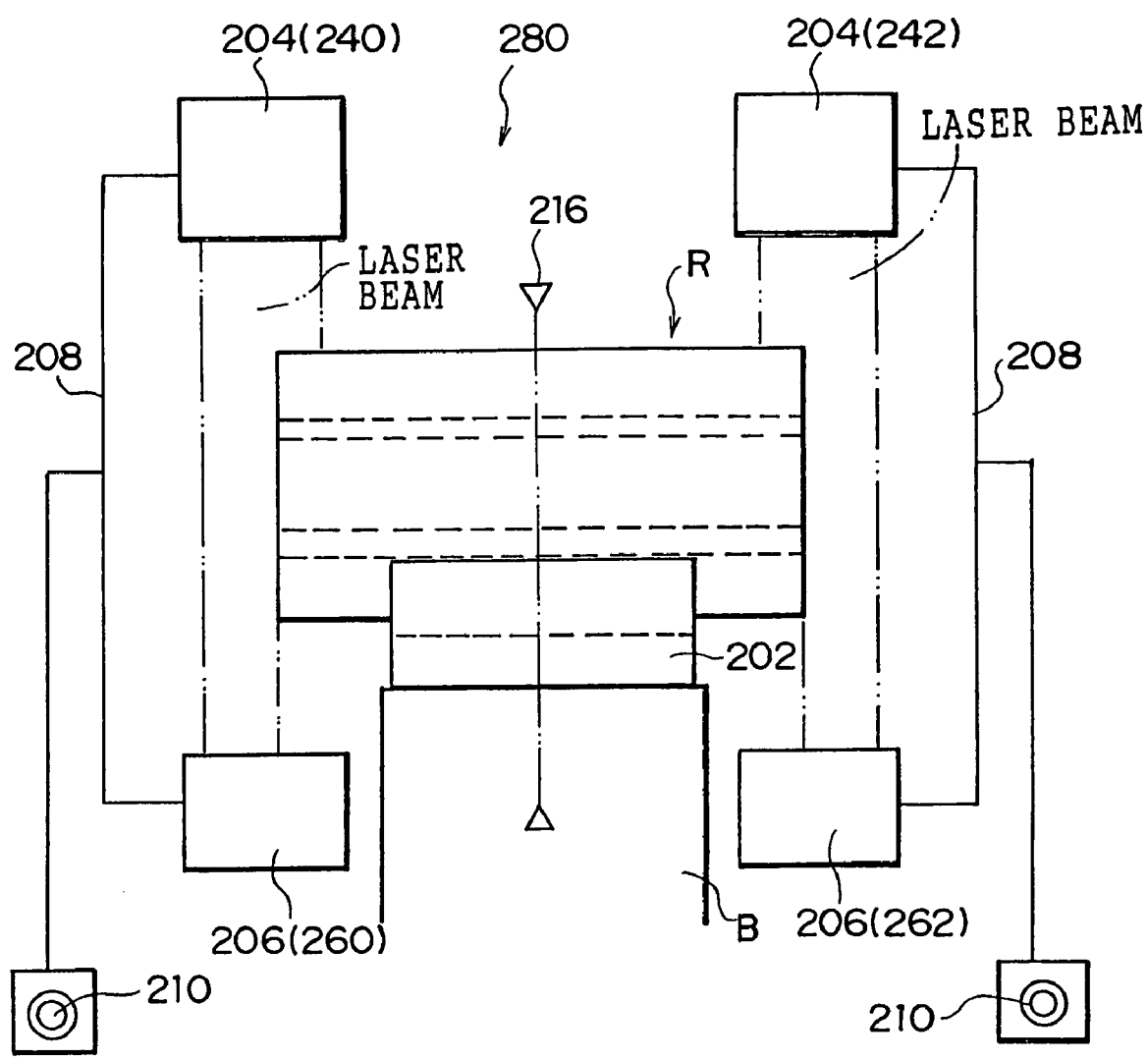
FIG. 28 is a schematic diagram showing the schematic structure of the roll width measuring device shown in FIG. 27, as seen from a downstream side in a moving direction of laser light irradiating devices and laser light receiving devices provided at the roll with measuring device.

FIGS. 27 and 28 illustrate the overall schematic structure of a roll width measuring device which is an example of a dimension measuring device relating to the present invention.

A roll width measuring device 280 is incorporated into, for example, a small roll processing device which manufactures small rolls by winding TA paper in small roll form onto paper tubes, and is used in examining whether or not the width of a small roll falls within a predetermined range. In addition, a roll winding offset examining device, which examines the magnitude of the winding offset from the end surface of the small roll, is also incorporated into the small roll processing device.

The roll width measuring device 280 is equipped with the base B; a roll holding stand 202 which is fixed on the base B and on which is loaded a small roll R whose width is to be measured; laser light irradiating devices 204 disposed above the roll holding stand 202, and downwardly irradiating strip-like laser beams which are parallel to the direction in which the small roll R is loaded at the roll holding stand 202; and laser light receiving devices 206 disposed beneath the roll holding stand 202, and receiving the laser beams from the laser light irradiating devices 204.

The roll width measuring device 280 is also equipped with light projecting/receiving device holding stands 208, ball screws 210, a motor 212, and a rotary encoder 214. The light projecting/receiving device holding stand 208 holds the laser light irradiating device 204 and the laser light receiving device 206 above and below the roll holding stand 202, respectively. Further, the light projecting/receiving device holding stands 208 can move horizontally along the direction of holding the small roll R at the roll holding stand 202, i.e., along a direction orthogonal to the axis of the small roll R held on the roll holding stand 202, as shown by arrow a in FIG. 27. The ball screws 210 move the light projecting/receiving device holding stands 208. The motor 212 drives the ball screws 210. The rotary encoder (hereinafter called "RE") 214 is joined to the rotating shaft of the motor 212.

The RE 214 outputs one pulse each time the ball screw 210 moves a given distance, e.g., 0.05 mm. FIG. 28 shows the structure of the roll width measuring device 280 as seen from the downstream side in the direction of movement of the laser light irradiating devices 204 and the laser light receiving devices 206 denoted by arrow a (and hereinafter called "moving direction a").

The small roll R is a roll in which a TA paper T is wound in a roll form on the paper tube C.

As shown in FIG. 28, the laser light irradiating devices 204 are provided as a pair, and the laser light receiving devices 206 are provided as a pair, and the respective pairs sandwich the stand B and the roll holding stand 202 from the left and right as seen from the downstream side in the moving direction a. Hereinafter, the laser light irradiating device 204 and the laser light receiving device 206, which are positioned at the left side in FIG. 28 with respect to the base B and the roll holding stand 202, are upon occasion called laser light irradiating device 240 and laser light receiving device 260, respectively. Further, the laser light irradiating device 204 and the laser light receiving device 206, which are positioned at the right side in FIG. 28 with respect to the base B and the roll holding stand 202, are upon occasion called laser light irradiating device 242 and laser light receiving device 262, respectively.

A sensor 216 for timing, which detects that the small roll R is loaded on the roll holding stand 202, is a photoelectric sensor which is basically formed from a light-emitting element and a light receiving element which are provided above and below the roll holding stand 202. It is detected whether or not the small roll R is placed on the roll holding stand 202 by utilizing the fact that, when the small roll R is placed on the roll holding stand 202, light from the light-emitting element is blocked by the small roll R and does not reach the light receiving element.

A sequencer 218, which controls the motor 212, and a desktop computer 220, which calculates the width of the small roll R on the basis of the data of the received light amounts measured at the laser light receiving devices 206, are connected to the roll width measuring device 280. Note that, in FIG. 27, reference numerals 222, 224 and 226 denote a keyboard, a display, and a printer, respectively. Further, reference numeral 228 denotes a touch panel input/display device.

The roll holding stand 202, the laser light irradiating device 204, the laser light receiving device 206, and the small roll R correspond to the tubular body holding device, the light irradiating device, the light receiving device, and the tubular body, respectively, in the dimension measuring device relating to the present invention.

The sequencer 218 and the desktop computer 220 correspond to the dimension computing device in the dimension measuring device of the present invention. Moreover, the laser light irradiating devices 240 and 242, which form the laser light irradiating devices 204, correspond to the first laser light irradiating device and the second laser light irradiating device in the dimension measuring device relating to the present invention. The laser light receiving devices 260 and 262, which form the laser light receiving devices 206, correspond to the first laser light receiving device and the second laser light receiving device in the dimension measuring device relating to the present invention.

Hereinafter, the details of the respective portions of the roll width measuring device 280 will be described.

The details of the laser light irradiating device 204 and the laser light receiving device 206 are shown in FIGS. 29A and 29B. FIG. 29A shows the laser light irradiating device 204 and the laser light receiving device 206 as seen from the downstream side with respect to the moving direction a, and FIG. 29B shows the laser light irradiating device 204 and the laser light receiving device 206 as seen from a direction orthogonal to the moving direction a.

As shown in FIGS. 29A and 29B, the laser light irradiating device 204 and the laser light receiving device 206 are provided with a case 204A and a case 206A, respectively, which are formed as elongated plate shapes which extend in a direction orthogonal to the moving direction a, i.e., a direction along the direction in which the small roll R is loaded at the roll holding stand 202.

At the bottom surface of the case 204A at the laser light irradiating device 204, semiconductor laser elements are arranged in one row along the longitudinal direction of the case 204A such that the light-emitting surfaces thereof face downward, so as to form a laser element array 204B.

Similarly, at the top surface of the case 206A at the laser light receiving device 206, light receiving elements, which receive the laser beams from the semiconductor laser element array 204B, are arranged in one row along the longitudinal direction of the case 206A so as to form a light receiving element array 206B. Usually, a photodiode or a phototransistor or the like is used as the light receiving element.

When the laser element array 204B is to emit laser beams, all of the semiconductor laser elements may be made to emit light simultaneously, or the semiconductor laser elements may be made to emit light successively from one end portion of the array toward the other end portion.

The laser light irradiating device 204 and the laser light receiving device 206 shown in FIGS. 29A and 29B are examples of the linear array type laser light emitting device and the linear array type laser light receiving device in the dimension measuring device relating to the present invention.

Figure 30A:
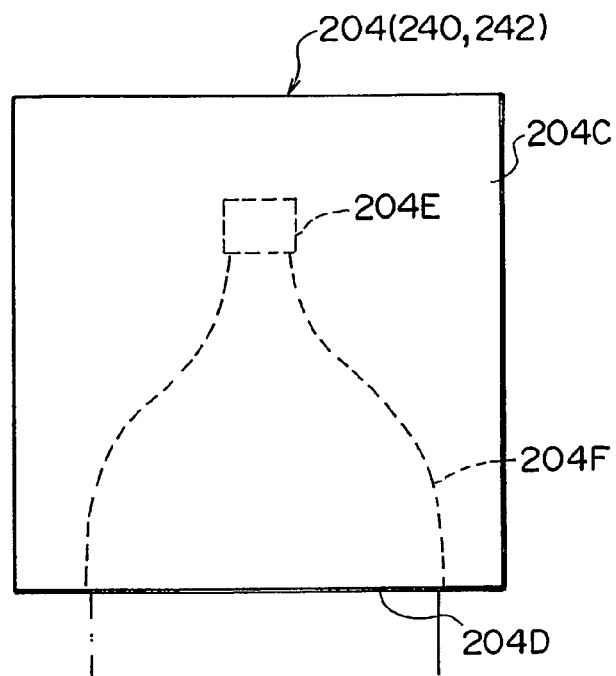
FIGS. 30A and 30B are enlarged detailed diagrams showing the structure of a second example of the laser light irradiating device and the laser light receiving device.

Other examples of the laser light irradiating device 204 and the laser light receiving device 206 are shown in FIG. 30A through FIG. 33. FIGS. 30A, 31A, 32A show the laser light irradiating device 204 and the laser light receiving device 206 as seen from the downstream side with respect to the moving direction a. FIGS. 30B, 31B, 32B show the laser light irradiating device 204 and the laser light receiving device 206 as seen from a direction orthogonal to the moving direction a.

Figure 30B:
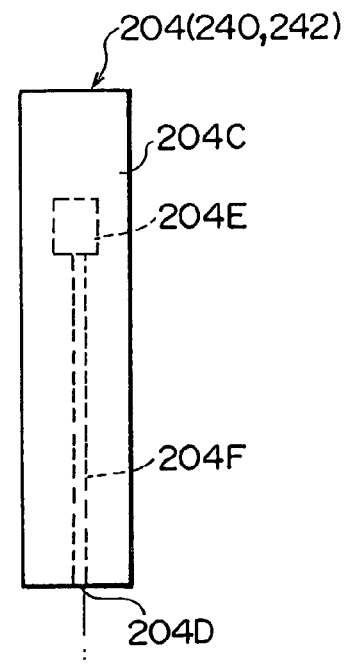

In the example shown in FIGS. 30A and 30B, the laser light receiving device 206 is a linear array type laser light receiving device having the same structure as that shown in FIGS. 29A and 29B. On the other hand, the laser light irradiating device 204 is an optical fiber array type laser light irradiating device equipped with a case 204C which is a case formed as an elongated plate shape which extends in a direction orthogonal to the moving direction a, and at whose bottom surface a slit-shaped laser beam radiation hole 204D is open along the longitudinal direction; a single semiconductor laser element 204E accommodated at the interior of the case 204C; and an optical fiber array 204F formed from a group of optical fibers which are arranged along the longitudinal direction at the interior of the case 204C, and which guide the laser light generated at the semiconductor laser element 204E to the laser beam radiation hole 204D.

The optical fiber array 204F is disposed such that one end portion thereof opposes the portion of the semiconductor laser element 204E at which portion laser light is radiated, and the other end thereof is positioned in a vicinity of the laser beam radiation hole 204D. Accordingly, the laser light which is radiated from the semiconductor laser element 204E is transmitted through the optical fiber array 204F, and a strip-shaped laser beam is radiated downwardly from the laser beam radiation hole 204D. Either of quartz optical fibers or plastic optical fibers can be used as the optical fibers forming the optical fiber array 204F.

In the example shown in FIGS. 31A and 31B, the laser light irradiating device 204 is the same optical fiber array type laser light irradiating device as shown in FIGS. 30A and 30B. On the other hand, the laser light receiving device 206 is an optical fiber array type laser light receiving device equipped with a case 206C which is a case formed as an elongated plate shape which extends in a direction orthogonal to the moving direction a, and at whose top surface a slit-shaped laser beam receiving hole 206D, which receives the laser beam from the laser light irradiating device 204, is open along the longitudinal direction; a single light receiving element 206E accommodated at the interior of the case 206C; and an optical fiber array 206F formed from a group of optical fibers which are arranged along the longitudinal direction at the interior of the case 206C, and which guide the laser beam received at the laser beam receiving hole 206D to the light receiving element 206E. Either of quartz optical fibers or plastic optical fibers can be used as the optical fibers forming the optical fiber array 206F. Further, in the same way as the light receiving elements of the light receiving element array 206B, usually, a photodiode or a phototransistor or the like is used as the light receiving element 206E.

Figures 32A, 32B:
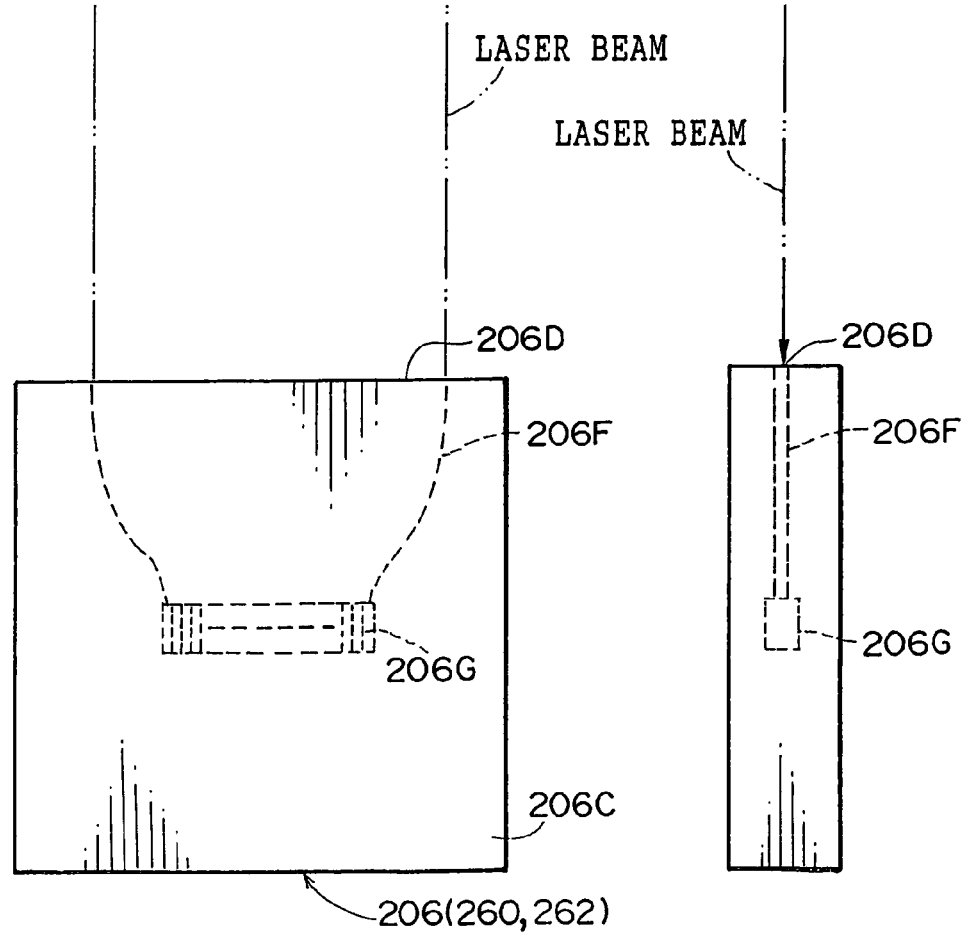
FIGS. 32A and 32B are enlarged detailed diagrams showing the structure of a fourth example of the laser light irradiating device and the laser light receiving device.

In the example shown in FIGS. 32A and 32B, the laser light irradiating device 204 is an optical fiber array type laser light irradiating device which is similar to that shown in FIGS. 30A and 30B. On the other hand, the laser light receiving device 206 is similar to the laser light receiving device 206 shown in FIGS. 31A and 31B with regard to the points that the laser light receiving device 206 of this example is equipped with the laser beam receiving hole 206D formed in the top surface of the case 206C, and the optical fiber array 206F which extends from the laser beam receiving hole 206D into the interior of the case 206C. However, the laser light receiving device 206 in this example differs from the laser light receiving device 206 shown in FIGS. 31A and 31B in that the laser light receiving device 206 of this example has, in place of the single light receiving element 206E, a light receiving element array 206G formed from a group of light receiving elements arranged along the longitudinal direction of the case 206C, and the optical fiber array 206F is disposed so as to guide, to the light receiving element array 206G, the laser beam received at the laser beam receiving hole 206D.

Figure 33:
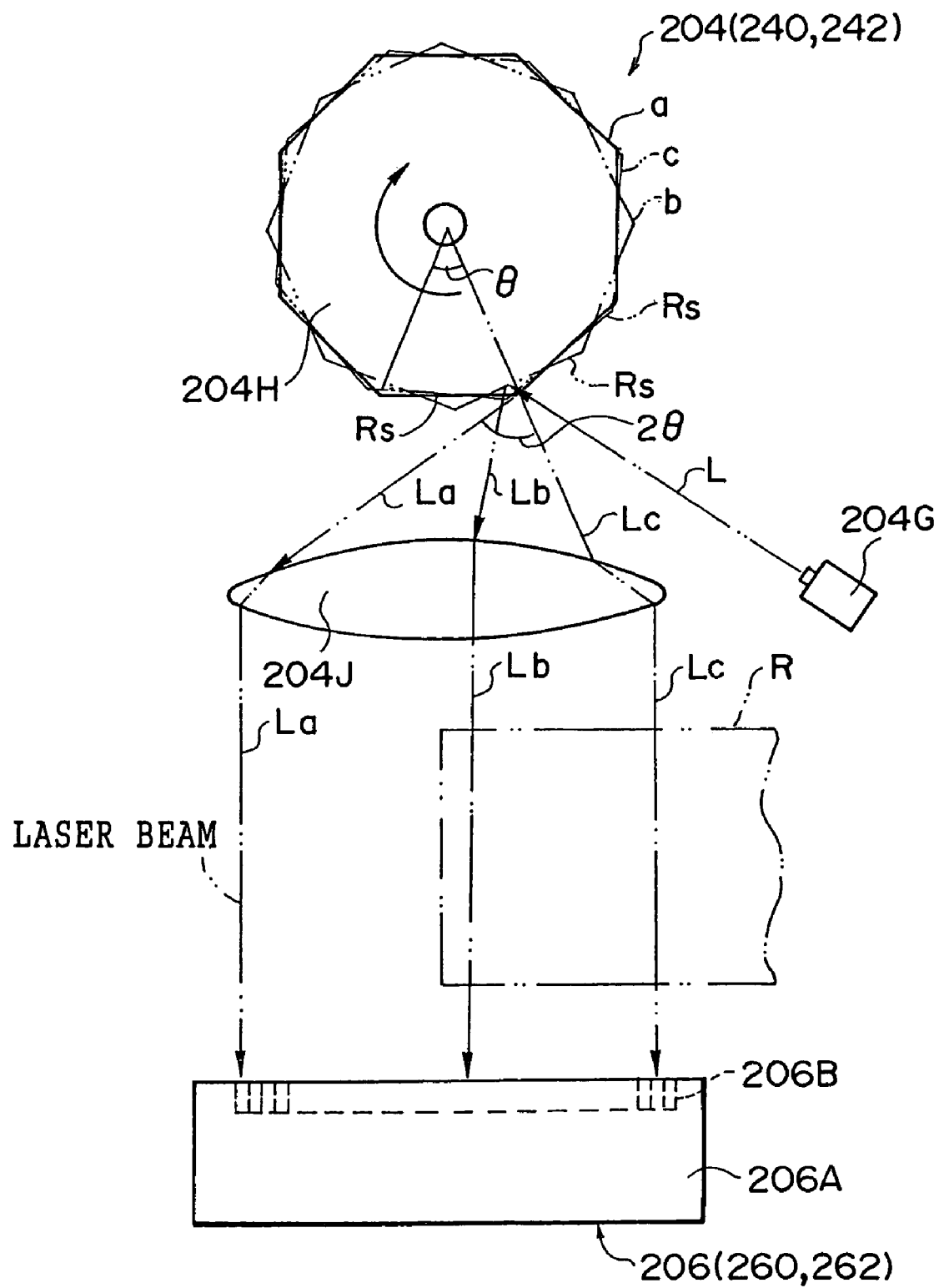
FIG. 33 is an enlarged detailed diagram showing the structure of a fifth example of the laser light irradiating device and the laser light receiving device.

In the example shown in FIG. 33, the laser light receiving device 206 has the same structure as that of the laser light receiving device 206 shown in FIGS. 30A and 30B, and is disposed at a position at which it can receive the laser beam from the laser light irradiating device 204.

On the other hand, the laser light irradiating device 204 is equipped with a single laser light source 204G; and a polygon mirror 204H which scans the laser light from the laser light source 204G in a direction orthogonal to the moving direction a of the light projecting/receiving device holding stand 208. An optical system 204J, which makes the laser light bent at the polygon mirror 204H into parallel light of a direction orthogonal to the light receiving element array 206B of the laser light receiving device 206, is disposed in a vicinity of the polygon mirror 204H. The polygon mirror 204H is disposed so as to rotate around a central shaft, at a position at which the laser light from the laser light source 204G hits the reflecting surfaces of the side surfaces of the polygon mirror 204H. As shown by the two-dot chain line in FIG. 33, the small roll R is held between the optical system 204J and the laser light receiving device 206.

Any of various type of laser oscillators, such as semiconductor laser elements or a solid state laser or the like, can be used as the laser light source 204G.

Eight reflecting surfaces are provided at the side surfaces of the polygon mirror 204H. However, the number of reflecting surfaces may be, for example, 12, 24, 25, 36, 48, or the like.

Due to the polygon mirror 204H rotating one time at a position, the laser light from the laser light source 204G is bent so as to be scanned from one end of the light receiving element array 206B at the laser light receiving device 206 to the other end.

Namely, when the polygon mirror 204H is at the position c shown by the two-dot chain line in FIG. 33, laser light L from the laser light source 204G hits a reflection surface Rs, which is one of the eight reflecting surfaces of the polygon mirror 204H, and is reflected thereby so as to be bent as shown by arrow Lc, and reach the right end, in FIG. 33, of the light receiving element array 206B.

When the polygon mirror 204H rotates from this position clockwise in FIG. 33 and reaches position b shown by the two-dot chain line in FIG. 33, the reflecting surface Rs also rotates clockwise. Thus, the laser light L is reflected at the reflecting surface Rs, is bent as shown by arrow Lb, and reaches the central portion of the light receiving element array 206B.

Then, when the polygon mirror 204H rotates further clockwise and reaches position a shown by the solid line in FIG. 33, the reflecting surface Rs also rotates further clockwise. Thus, the laser light L is reflected at the reflecting surface Rs, is bent as shown by arrow La, and reaches the left end portion, in FIG. 33, of the light receiving element array 206B.

When the polygon mirror 204H rotates even further clockwise from position a, the polygon mirror 204H again comes to position c in FIG. 33. Thus, the laser light L is again bent as shown by arrow Lc by the polygon mirror 204H, and irradiated onto the right end portion of the light receiving element array 206B.

In this way, by rotating the polygon mirror 204H clockwise, the laser light L is scanned from the right to the left in FIG. 33, and a laser beam is generated.

Figure 34:
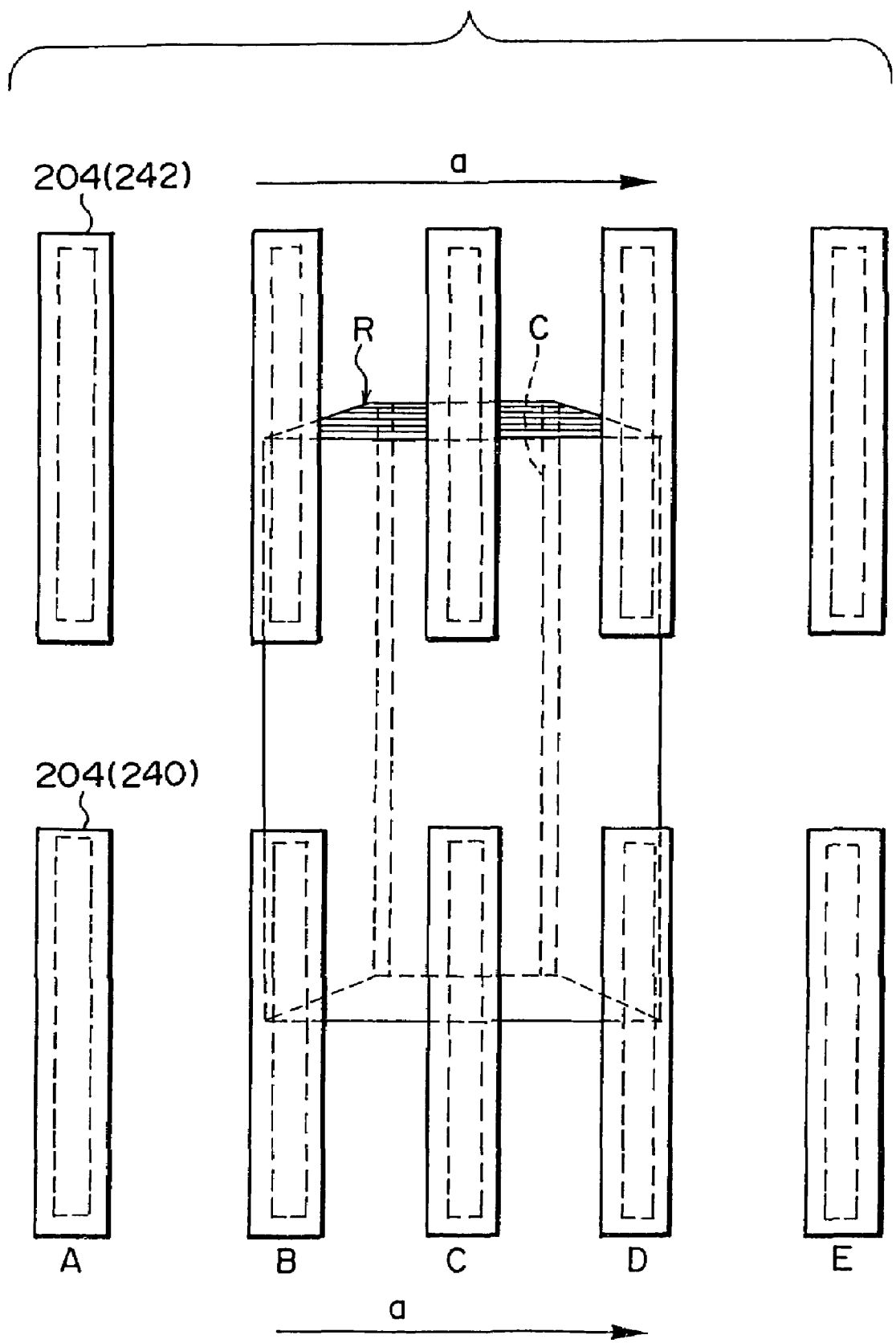
FIG. 34 is a schematic view, as seen from above, showing a state in which the laser light irradiating devices and the laser light receiving devices pass above the small roll.

The state in which the laser light irradiating devices 204 and the laser light receiving devices 206 pass over the small roll R along the moving direction a as seen from above is shown in FIG. 34. Although the laser light receiving devices 206 are omitted from FIG. 34, the laser light receiving devices 206 are positioned beneath the laser light irradiating devices 204, with the small roll R therebetween. Further, as an example, the small roll R is a structure having a wound configuration in which one end surface thereof projects conically from the peripheral portion toward the central portion, and the other end surface thereof is recessed conically toward the central portion.

When the laser light irradiating devices 204 and the laser light receiving devices 206 are at position A in FIG. 34, the laser beams from the laser light irradiating devices 204 reach the laser light receiving devices 206 without being blocked by any object. Thus, the amounts of light received at the laser light receiving devices 206 are maxima.

When the laser light irradiating devices 204 and the laser light receiving devices 206 move from position A in FIG. 34 to position B, the laser beams from the laser light irradiating devices 204 are blocked by the outer peripheral portion of the small roll R. Thus, the amounts of light received by the laser light receiving devices 206 at position B are smaller than the amounts of light received at position A.

When the laser light irradiating devices 204 and the laser light receiving devices 206 move from position B in FIG. 34 to position C, the laser beams from the laser light irradiating devices 204 are blocked by the central portion of the small roll R. Here, as described above, the central portion of the small roll R projects out further than the peripheral portion thereof. Thus, the amounts of light received by the laser light receiving devices 206 are minima at position C.

When the laser light irradiating devices 204 and the laser light receiving devices 206 pass position C in FIG. 34, the amounts, blocked by the small roll R, of the laser beams from the laser light irradiating devices 204 decrease. Thus, the amounts of light received by the laser light receiving devices 206 increase at position D. Further, when the laser light irradiating devices 204 and the laser light receiving devices 206 reach position E in FIG. 34, the laser beams from the laser light irradiating devices 204 are not blocked at all by the small roll R. Thus, the amounts of light received at the laser light receiving devices 206 increase to amounts of received light which are substantially the same as the amounts of received light at the time when the laser light irradiating devices 204 and the laser light receiving devices 206 are at position A.

Accordingly, if the amounts of reduction in the amounts of light received at the laser light receiving devices 206 are measured, the dimension of the small roll R can be measured.

Next, the sequencer 218 and the desktop computer 220 will be described.

Figure 35:
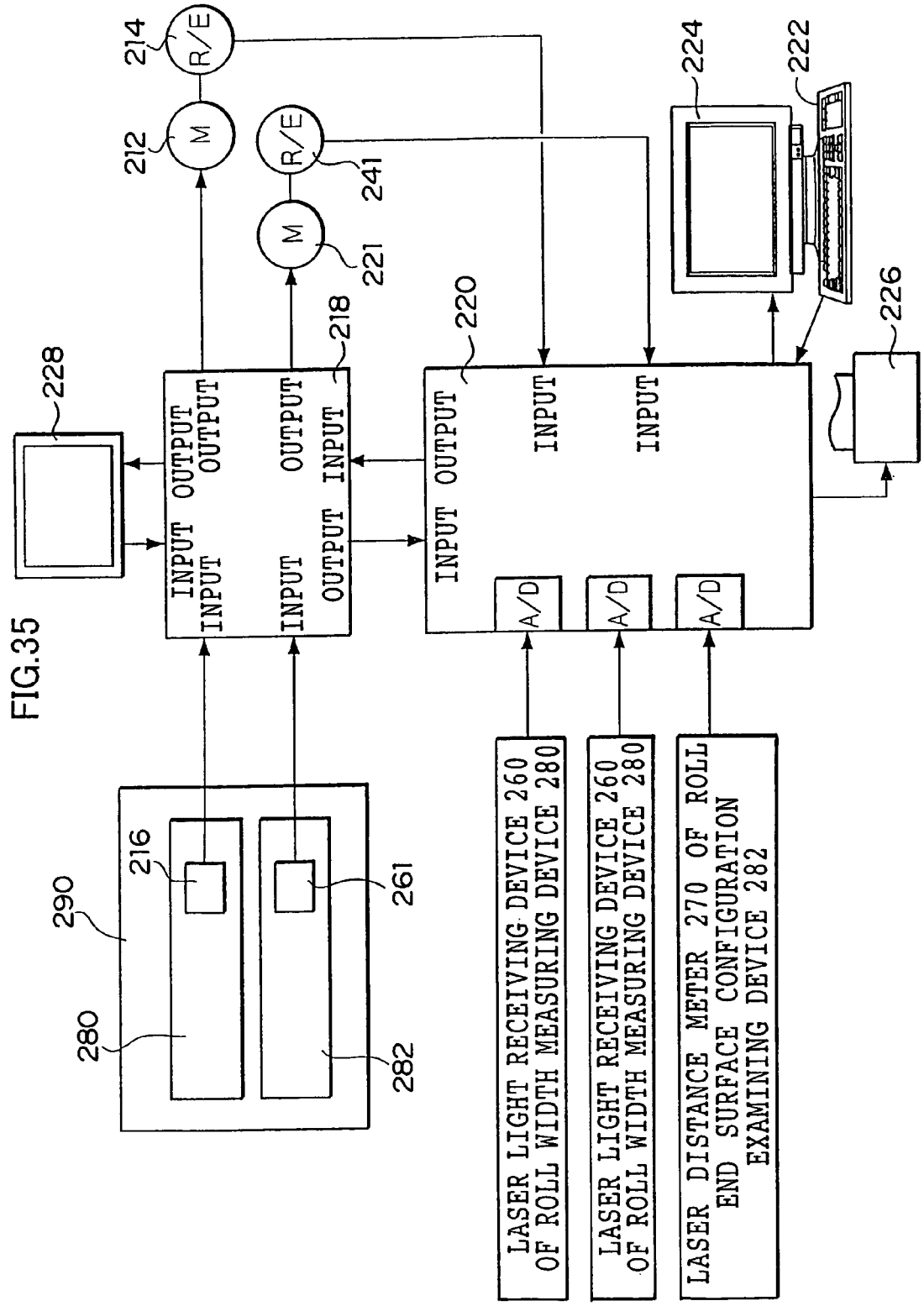
FIG. 35 is a block diagram showing the schematic structure of a sequencer and a desktop computer.

The schematic structure of the sequencer 218 and the desktop computer 220 is shown in FIG. 35.

The sequencer 218 is a sequencer which carries out sequence control of an entire small roll processing device 290 into which the roll width measuring device 280 is incorporated. As shown in FIG. 35, the following are connected to the sequencer 218: the touch panel input/display device 228 by which settings of processing sizes and operation commands at the small roll processing device 290 are inputted, and which displays the conditions of operation and the contents of abnormalities at the small roll processing device 290; the sensor 216 for timing which is provided at the roll width measuring device 280; a sensor 261 for timing which detects that the small roll R is loaded at a predetermined position at a roll winding offset examining device 282; and the motor 212 provided at the roll width measuring device 280 and a scanning motor 221 provided at the roll winding offset examining device 282.

Here, the small roll processing device 290 functions to wind the TA paper in the form of a small roll onto the paper tube C so as to manufacture the small roll R. The roll width measuring device 280 and the roll winding offset examining device 282 are incorporated into the small roll processing device 290.

The roll winding offset examining device 282 has a laser distance meter 270 which irradiates laser light toward the end surface of the small roll R and measures the distance to the end surface. The roll winding offset examining device 282 functions to examine whether or not the magnitude of the winding offset of the small roll R falls within a predetermined range, on the basis of the results of measurement by the laser distance meter 270.

The sensor 261 for timing is, in the same way as the sensor 216 for timing, formed from a light emitting element and a light receiving element. The sensor 261 for timing functions to sense whether or not the small roll R is loaded on a roll holding stand provided at the roll winding offset examining device 282.

The scanning motor 221 is a motor which scans the laser distance member 270 along the end surface of the small roll R at the roll winding offset examining device 282. An RE 241 is connected to the rotating shaft of the scanning motor 221. The RE 241 also outputs one pulse each time the laser distance meter 270 moves a given distance, e.g., 0.05 mm.

The desktop computer 220 has the functions of computing the received light amount data at the laser light receiving devices 260 and 262 of the roll width measuring device 280 and the results of measurement at the laser distance meter 270 of the roll winding offset examining device 282, and judging whether the small roll R is good or poor.

The laser light receiving devices 260 and 262, the laser distance meter 270, the RE 214, the RE 241, the display 224, the keyboard 222, and the printer 226 are connected to the desktop computer 220. Further, the sequencer 218 is connected to the desktop computer 220.

When dimensional parameters, such as a width w of the TA paper which is to be processed into the small roll R in the small roll processing device 290, and a diameter r of the small roll R, and the like, and operational commands and the like are inputted to the touch panel input/display device 228, the dimensional parameters and operational commands are inputted to the sequencer 218.

The sequencer 218 effects sequence control of the small roll processing device 290 on the basis of the operational commands, and outputs the dimensional parameters to the desktop computer 220.

At the small roll processing device 290, the roll width measuring device 280 and the roll winding offset examining device 282 are activated on the basis of the sequence control commands from the sequencer 218.

When the roll width measuring device 280 is activated, the sensor 216 for timing is turned ON at the roll width measuring device 280.

When a signal expressing that the small roll R is loaded on the roll holding stand 202 is inputted from the sensor 216 for timing to the sequencer 218, the sequencer 218 outputs a signal to the desktop computer 220. When the desktop computer 220 receives this signal, the desktop computer 220 sets the scanning ranges of the laser light irradiating devices 204, the laser light receiving devices 206, and the laser distance meter 270, on the basis of the diameter r of the small roll among the dimensional parameters inputted from the sequencer 218. On the basis of the operational ranges set at the desktop computer 220, the sequencer 218 controls the motor 212 and the scanning motor 221. In this way, at the roll width measuring device 280, the scanning of the laser light irradiating devices 204 and the laser light receiving devices 206 is started.

When scanning is started, one pulse is outputted from the RE 214 to the desktop computer 220 each time the laser light irradiating devices 204 and the laser light receiving devices 206 move 0.05 mm.

The measurement data from the laser light receiving devices 206 (260, 262) is outputted as voltage. Thus, after the output is converted into analog data at an A/D converter, it is inputted to the desktop computer 220.

On the basis of the pulses from the RE 214 and the measurement data from the laser light receiving devices 206 (260, 262), the desktop computer 220 carries out computation in accordance with processes which will be described later, so as to determine the width of the small roll R.

The results of computation are stored in a memory within the desktop computer 220, and are simultaneously outputted to the sequencer 218 and displayed on the touch panel input/display device 228. Further, when a command expressing that the results of computation are to be displayed on the display 224, is inputted from the keyboard 222 to the desktop computer 220, the desktop computer 220 displays the results of computation in the form of a table or a graph on the display 224.

When the width w of the TA paper, and an allowable error which shows to what extent the width of the small roll R can be greater than the width of the TA paper, and examination standards such as the magnitude of winding offset which is permissible or the like, are inputted from the keyboard 222 to the desktop computer 220, the desktop computer 220 judges whether the small roll R is good or poor on the basis of the results of computation and the inputted examination standards.

The results of judgement are also outputted to the sequencer 218 and are displayed on the touch panel input/display device 228.

The computation processes for determining the width of the small roll R on the basis of the analog data from the laser light receiving devices 206 (260, 262) will be described hereinafter.

Figure 36:
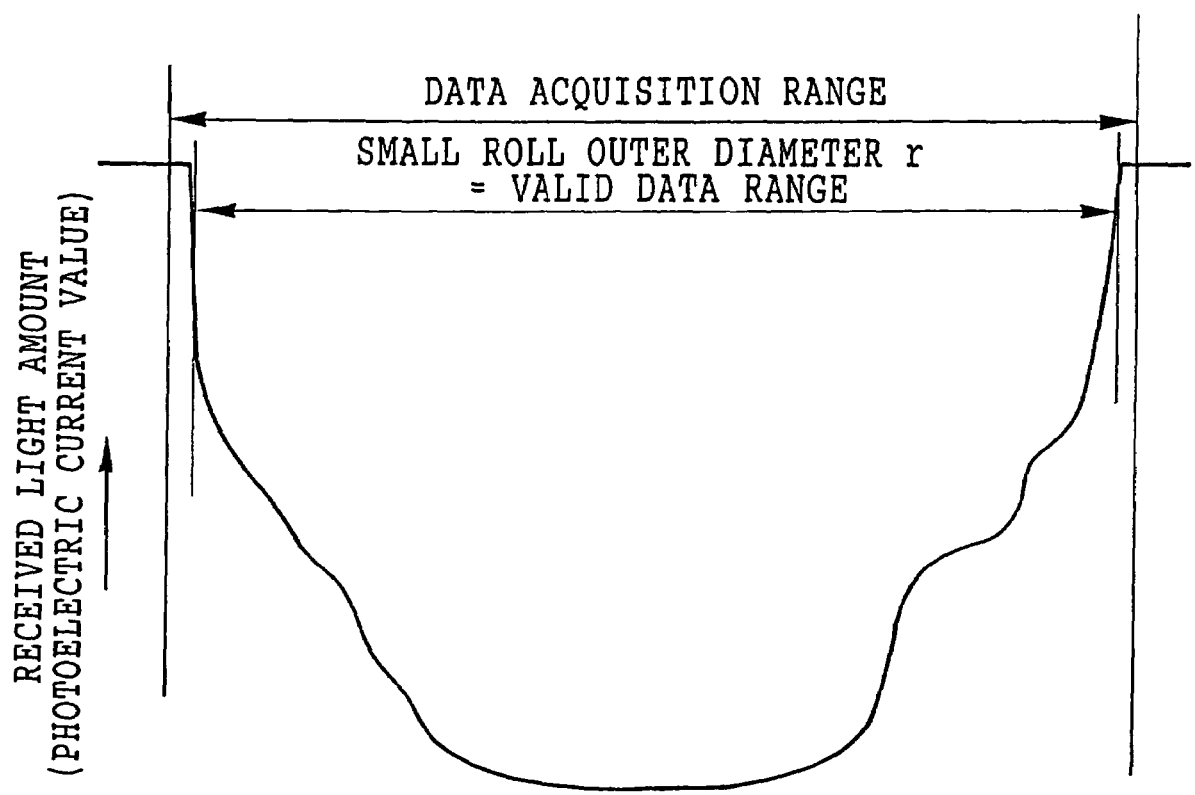
FIG. 36 is a schematic view showing the relationship between a valid data range, and a data acquisition range which is a scanning range at which data of photoelectric current values are inputted, at the desktop computer shown in FIG. 35.

On the basis of the diameter r of the small roll R inputted from the sequencer 218, the desktop computer 220 determines a valid data range, which is a range of data which form a received light amount-conveyed distance curve which will be described later. The relationship between the valid data range and a data acquisition range, which is a range in which data of the received light amounts from the laser light receiving devices 206 is inputted at the desktop computer 220, is shown in FIG. 36.

Figure 37:
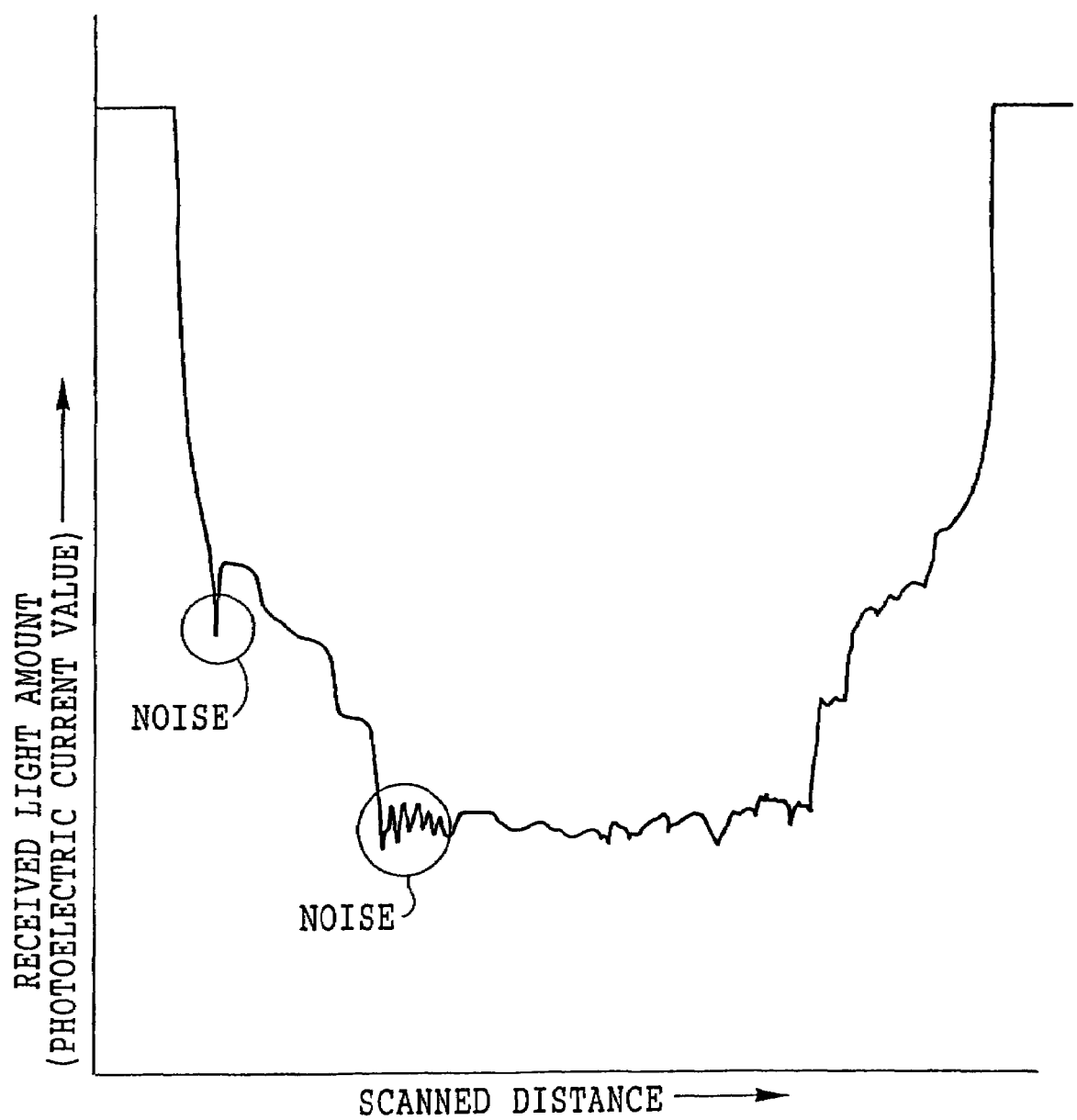
FIG. 37 is a graph showing an example of a time curve of amounts of received light, before noise is eliminated at the desktop computer.

When the valid data range is set, the desktop computer 220 prepares a received light amount-scanned distance curve, by plotting the scanned distance, i.e., the moved distance, of the laser light receiving device 206 on the horizontal axis and the received light amount on the vertical axis. An example of the received light amount-scanned distance curve is shown in FIG. 37. The received light amount-scanned distance curve corresponds to the received light amount curve in the present invention.

Noise, which comes from fuzz and dust at the side surface of the small roll R, i.e., spiked peaks, or in other words, spiked recess portions, can be seen as shown in FIG. 37. The desktop computer 220 removes the noise from the data of the received light amount inputted from the laser light receiving device 206 via an A/D converting device, and thereafter, calculates the width of the small roll R. This noise removal can be carried out in accordance with the following processes for example.

First, the positions of all of the recessed and projecting portions in a distance curve of the received light amount (photoelectric current value) are detected. Then, an allowable noise depth $n_1$, which is the maximum depth of noise that can be allowed, and an allowable noise width $t_1$, which is the maximum width of noise that can be allowed, are determined in advance.

Then, as shown in FIG. 38A, the received light amount-scanned distance curve changes from convex to concave by a changed amount n which is larger than the allowable noise depth $n_1$. In a section within a range of the allowable noise width $t_1$ from the point of change from convex to concave, when the curve changes from concave to convex by a changed amount n' which is greater than the allowable noise depth $n_1$, a spike-shaped recess portion arises at this section. Thus, a central computing processing device 220A determines that the recess portion in this section is noise. Then, as shown in FIG. 38B, the central computing processing device 220A replaces this noise portion in the section with the highest height within the section.

The remaining noise is eliminated by carrying out averaging for each predetermined number.

Figure 39:
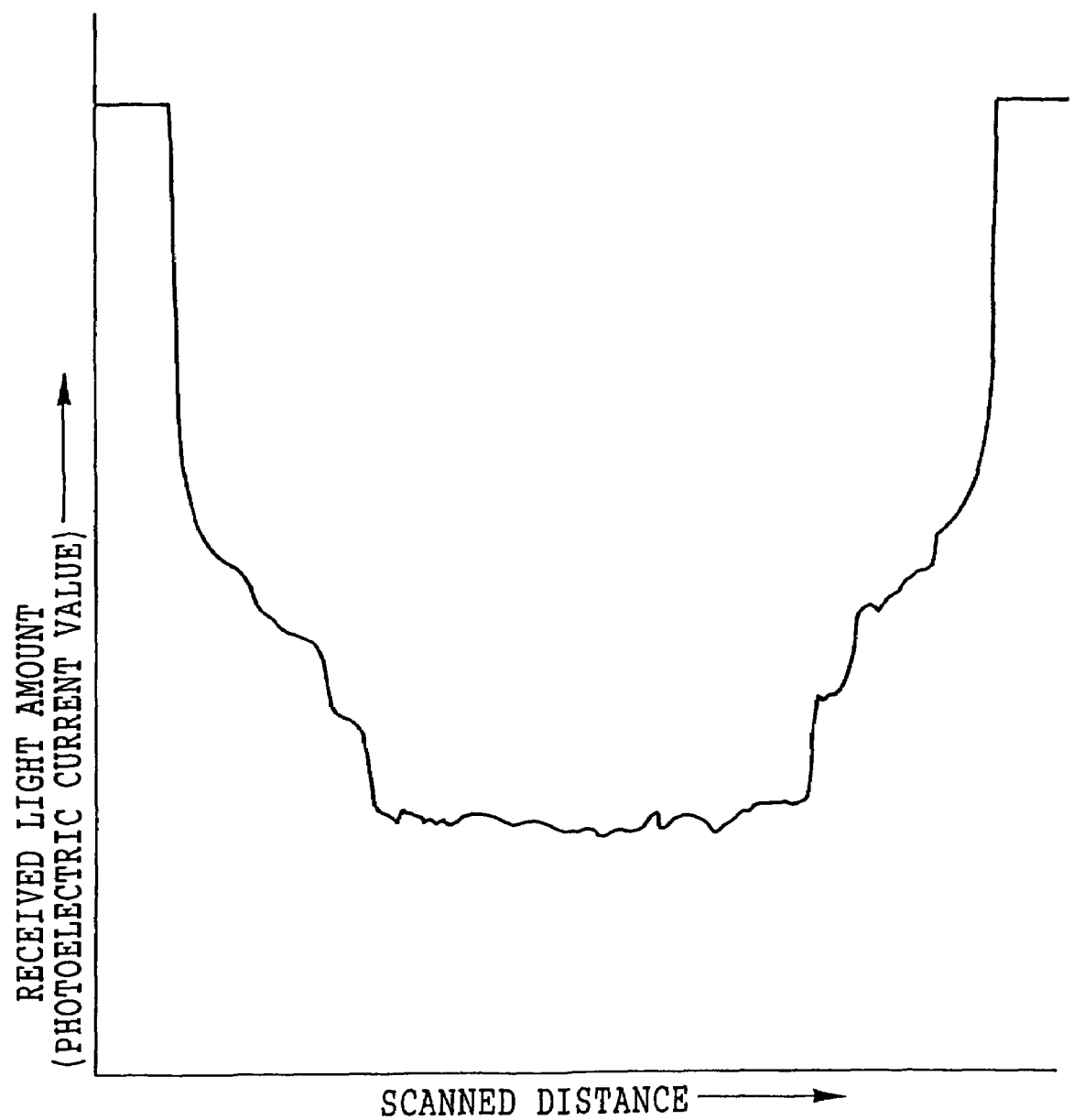
FIG. 39 is a graph showing an example of a time curve of amounts of received light after noise has been eliminated at a central computing device.

A curve in which noise has been eliminated from the received light amount-scanned distance curve of FIG. 37 in accordance with the above-described processes is shown in FIG. 39.

Next, the desktop computer 220 determines the position of the minimum received light portion in the received light amount-scanned distance curve of FIG. 39. The desktop computer 220 calls up, from a main storage device therein, a relational expression between received light amounts (photoelectric currents) determined in advance by experimentation and widths of the small roll R. On the basis of the relational expression, the desktop computer 220 determines the distances from the central portion, which is the portion corresponding to the minimum received light portion, at each end surface of the small roll R. Because these distances correspond to the maximum widths from the central portion of the small roll R, the distances are totalled so as to determine the maximum width of the small roll R.

The roll width measuring device 280 relating to the present embodiment can measure the width of the roll without contact. Thus, even if there is an object in which glue protrudes out from the end surfaces thereof such as in the case of a small roll of information recording paper, total measurement can be carried out automatically and with high accuracy, without dirtying, damaging or deforming the object.

Accordingly, the roll width measuring device 280 can be incorporated into a roll wind-up device, which winds a strip-shaped, sheet-like article such as an information recording paper or the like onto a core in the form of a small roll, so as to produce a small roll, and can be used preferably in the complete examination of the width of the small roll.

A paper tube is usually used as the winding core of the small roll. It is easy for fuzz to form at the end surfaces of a paper tube. However, in the roll width measuring device 280, the computer 220 computes the width of the small roll after removing noise from the measurement data of the laser light receiving devices 206. Thus, the width of a small roll, at which an information recording paper is wound on a paper tube, can be measured accurately.

Further, in order to scan the laser beams from the laser light irradiating devices 204, the ball screws 210 are rotated by the motor 212 such that the light projecting/receiving device holding stands 208 are moved. Thus, scanning can be carried out with high accuracy.

As described above, in accordance with the present invention, there is provided a dimension measuring device and a roll wind-up device equipped with the dimension measuring device, in which the width of a tubular object can be measured without contact, and accordingly, even if there is an object in which glue protrudes out from the end surfaces thereof such as a small roll, the object can be measured automatically and with high accuracy without dirtying, damaging or deforming the object.

Third Embodiment

A third embodiment of the present invention will be described hereinafter with reference to FIGS. 40 through 49.

Figure 40:
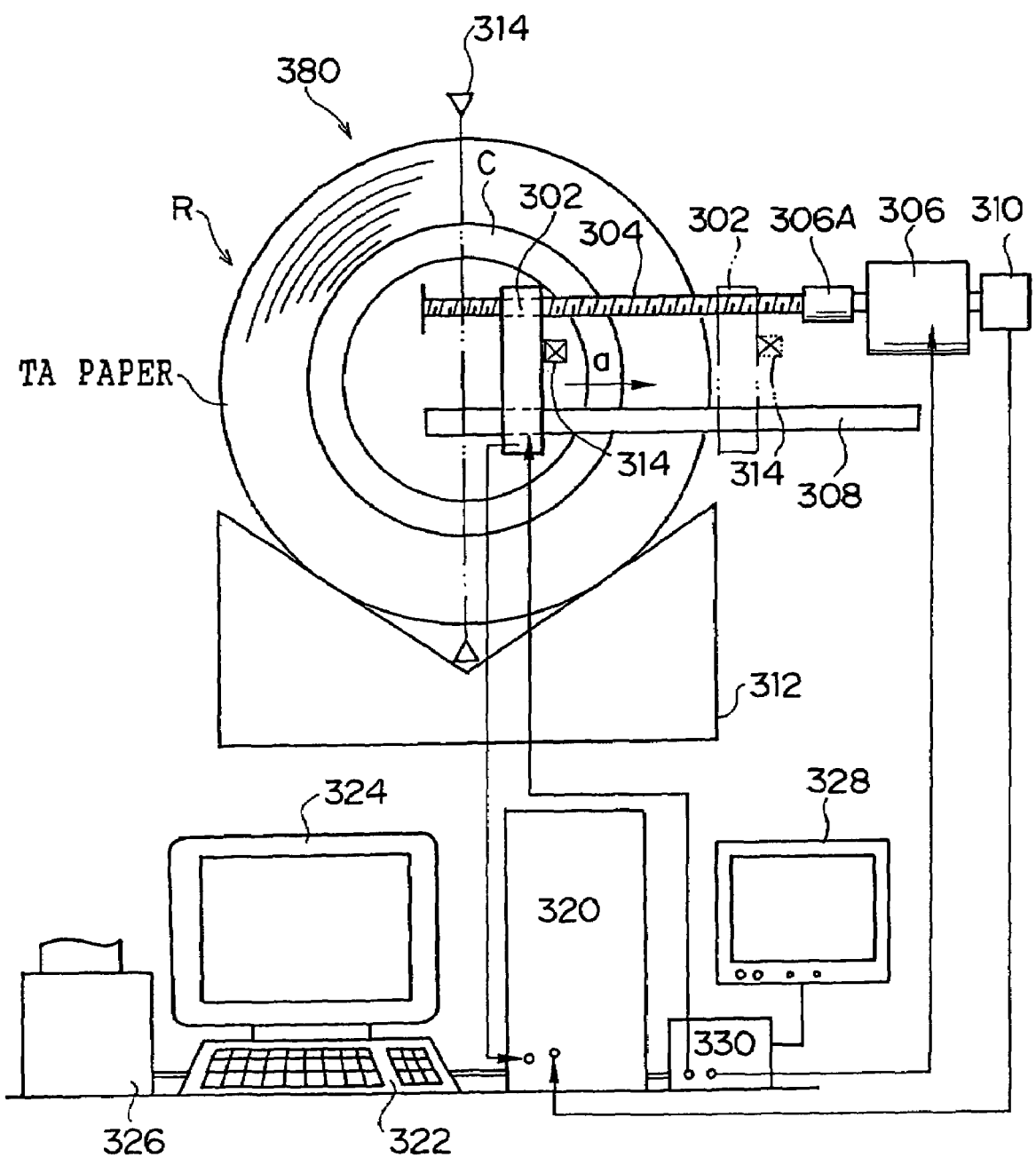
FIG. 40 is a schematic structural view, as seen from an end surface of a small roll R loaded on a roll holding stand, of a roll winding offset measuring device relating to the present invention.
Figure 41:
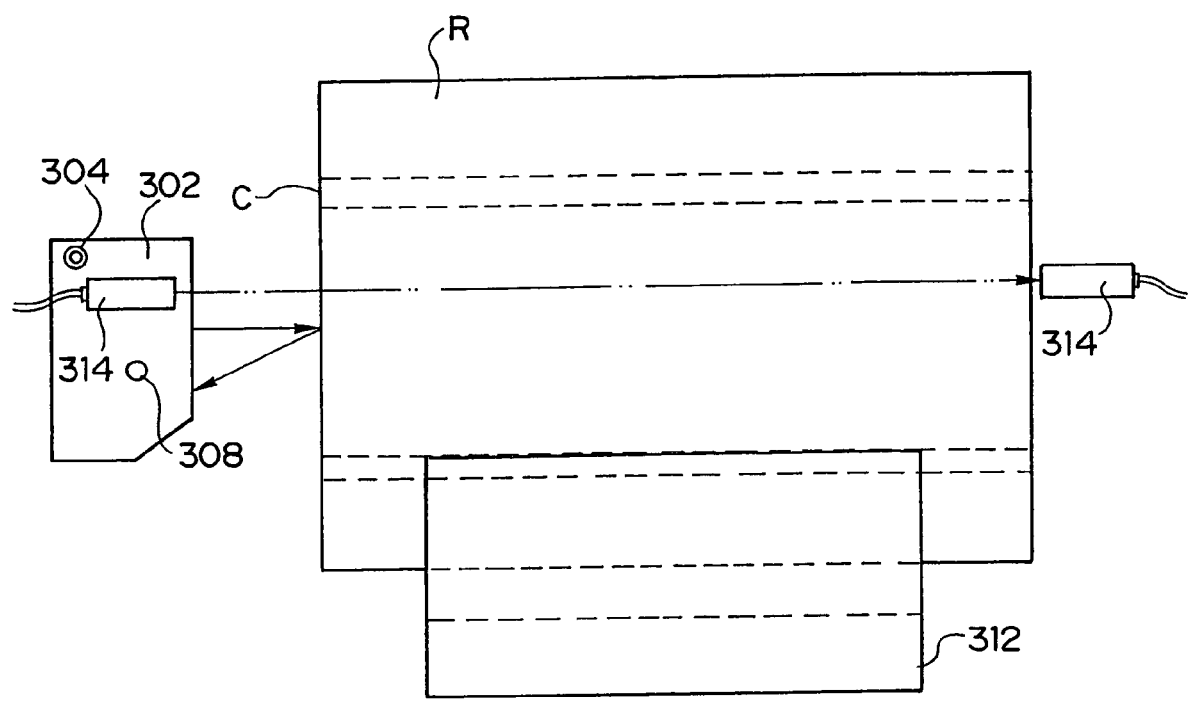
FIG. 41 is a schematic structural view of the roll winding offset measuring device, as seen from a downstream side in relation to a moving direction a of a displacement measuring device.
Figure 42:
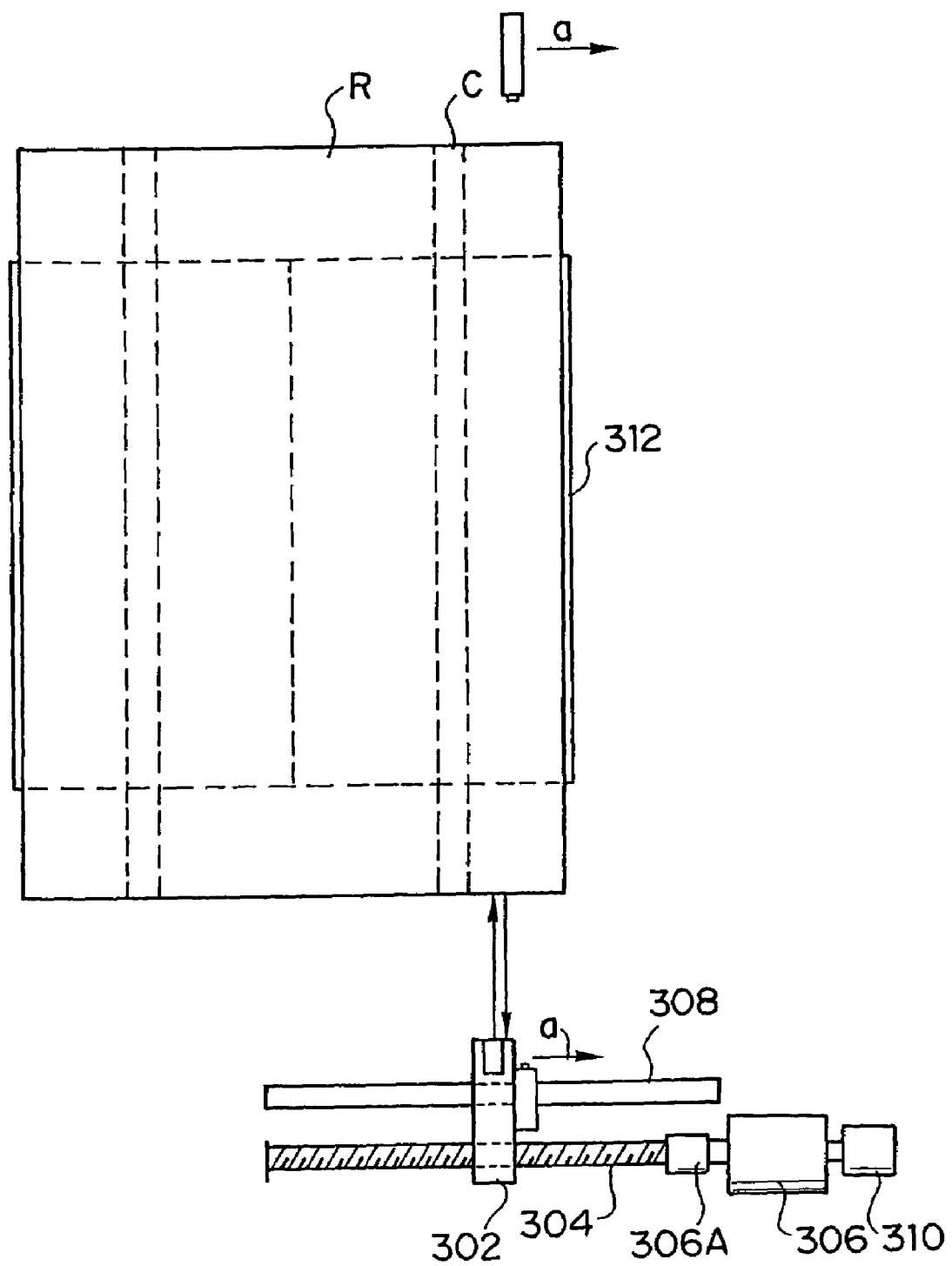
FIG. 42 is a schematic structural view of the roll winding offset measuring device, as seen from a downstream side in relation to the moving direction a of the displacement measuring device.

A roll winding offset measuring device of the present embodiment measures the winding offset of a small roll in which the TA paper is wound on the paper tube C, and judges whether the small roll is good or poor. FIGS. 40 through 42 show the schematic structure of the roll winding offset measuring device. Note that a servo motor 306 and a rotary encoder 310, which will be described later, are omitted from FIG. 41.

A roll winding offset measuring device 380 shown in FIG. 40 is incorporated, for example, into a small roll processing device which manufactures small rolls by winding TA paper in the form of a small roll onto paper tubes, and is used in examining whether or not the magnitude of the winding offset of the small roll falls within a predetermined range. A roll width examining device, which examines the width of the small roll, is also incorporated into the small roll processing device.

As shown in FIGS. 40 through 42, the roll winding offset measuring device 380 relating to the present embodiment is equipped with a roll holding stand 312 on which is loaded the small roll R whose winding offset is to be measured; a laser-irradiating-type displacement measuring device 302 which, while scanning one end surface of the small roll R, which is loaded on the roll holding stand 312, parallel to the end surface and in the radial direction from the central portion of the end surface toward the peripheral portion thereof, measures the distance to the end surface of the small roll R; a ball screw 304 which extends in the horizontal direction and parallel to the end surface of the small roll R, and which moves the displacement measuring device 302 at a constant speed in the direction of arrow a in FIG. 40 (hereinafter, "scanning direction a") so as to scan the end surface of the small roll R; and a rod-shaped guide member 308 disposed parallel to the ball screw 304, and guiding the displacement measuring device 302 along the scanning direction a. The displacement measuring device 302 corresponds to the displacement measuring means in the roll winding offset measuring device relating to the present invention.

The ball screw 304 is joined to the rotating shaft of the servo motor 306 via a joint 306A. Due to the ball screw 304 rotating due to the servo motor 306, the displacement measuring device 302 scans the end surface along the moving direction a from, for example, the position shown by the solid line in FIG. 40 to the position shown by the two-dot chain line.

The rotary encoder 310, which provides information relating to the position of the displacement measuring device 302, is also joined to the rotating shaft of the servo motor 306. The rotary encoder 310 outputs one pulse each time the displacement measuring device 302 moves a predetermined distance, e.g., 0.05 mm.

As shown in FIG. 40, the roll winding offset measuring device 380 also has a computer 320 to which output from the rotary encoder 310 and the displacement measuring device 302 is inputted, and which, on the basis of this input, computes the position and the magnitude of the winding offset of the small roll R; and a sequencer 330 which is connected to the computer 320, and which, while transmitting and receiving various types of control commands and control data to and from the computer 320, controls the servomotor 306 and the displacement measuring device 302. Note that the computer 320 and the sequencer 330 are omitted from FIGS. 41 and 42. A keyboard 322, a display 324, and a printer 326 are connected to the computer 320.

A sensor 314 for timing, which has a light-emitting element and a light receiving element which receives the light from the light emitting element, and which optically senses a measurement start point ahead of the displacement measuring device 302, is provided adjacent to the displacement measuring device 302 at the downstream side thereof in the moving direction. Due to the sensor 314 for timing moving together with the displacement measuring device 302 and the light from the light emitting element being blocked by the small roll R such that the light does not reach the light receiving element, the sensor 314 for timing senses that the measurement start point has been reached. The computer 320 correspond to the computing means and the goodness/poorness judging means of the roll winding offset measuring device of the present invention.

Figure 43:
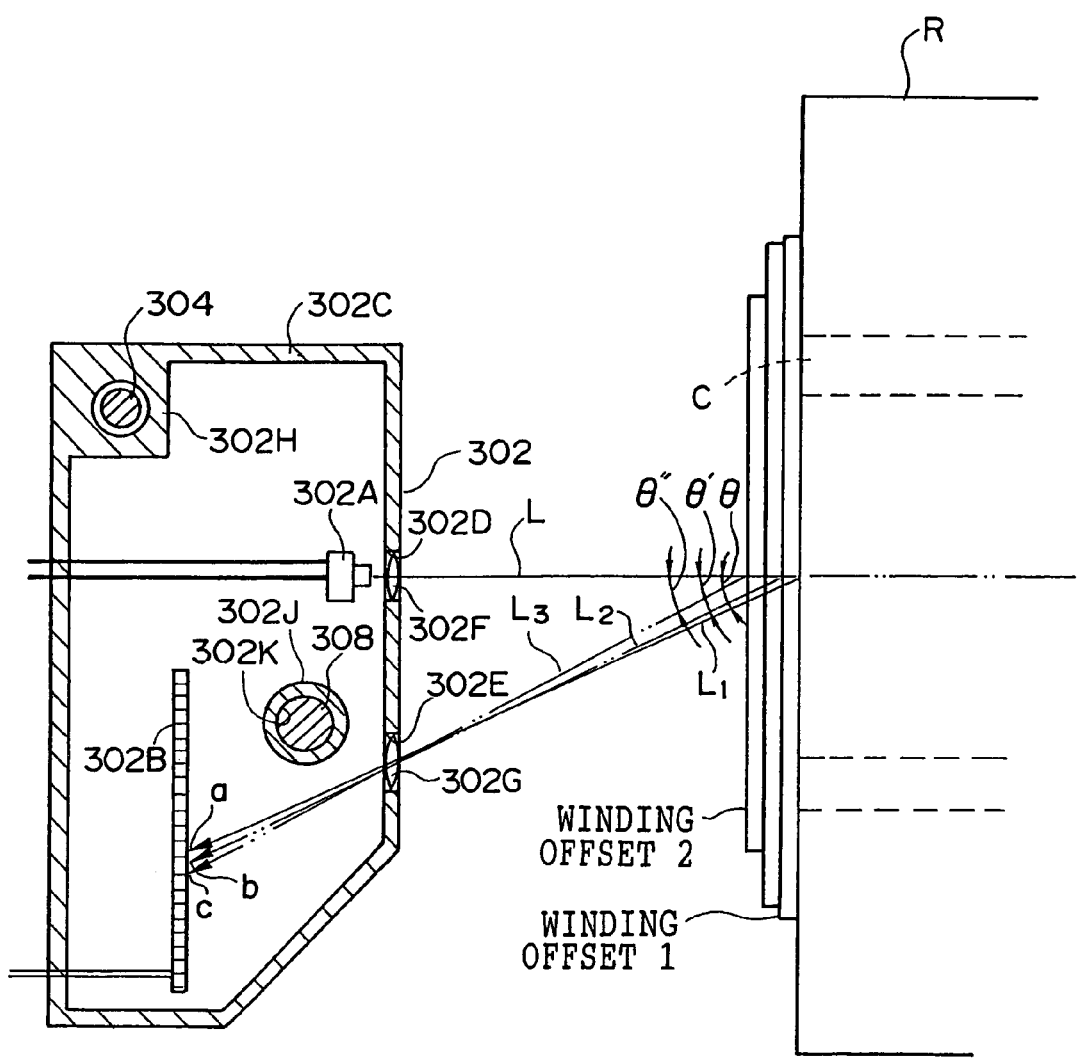
FIG. 43 is an enlarged sectional view showing details of the structure of the displacement measuring device.

Details of the structure of the displacement measuring device 302 are shown in FIG. 43.

As shown in FIG. 43, the displacement measuring device 302 is equipped with a semiconductor laser element 302A which irradiates the laser light L toward the end surface of the small roll R; a CCD array 302B in which charged coupled devices (CCDs) are disposed in a straight line along the vertical direction in FIG. 41, and which receives the reflected light of the laser light L which hits the end surface of the small roll R and is reflected thereby; and a case 302C which accommodates the semiconductor laser element 302A and the CCD array 302B in the interior thereof.

The semiconductor laser element 302A is connected to the sequencer 330, and the CCD array 302B is connected to the computer 320.

In the case 302C, a light projecting side light path 302D, which is an opening through which the laser light L exits, is provided on the optical path of the laser light L, and a light receiving side light path 302E, through which the reflected light from the small roll R enters, is provided on the optical path of the reflected light. A light projecting side lens 302F, which condenses the laser light L onto the end surface of the small roll R, is fit in the light projecting side light path 302D. A light receiving side lens 302G, which condenses the reflected light onto the CCD array 302B, is fit in the light receiving side light path 302E.

Moreover, a ball screw screwing portion 302H, with which the ball screw 304 is screwed together, is provided in the case 302C at the upper end portion in FIG. 43. A hollow cylindrical guide portion 302J, which engages with the guide member 308 and which guides the displacement measuring device 302, is provided at a position set apart from the optical path of the reflected light at the central portion of the case 302C. Due to the guide member 308 sliding in the interior of a guide hole 302K formed in the central portion of the guide portion 302J, the displacement measuring device 302 is prevented from rotating around the ball screw 304.

As will be described hereinafter, the displacement measuring device 302 measures the position and the magnitude of the winding offset while scanning the end surface.

It is supposed that, as shown in FIG. 43, a winding offset 1 and a winding offset 2, which is positioned at the inner side of the winding offset 1 and whose projecting amount is greater than that of the winding offset 1, have arisen as winding offsets at the end surface of the small roll R. Further, it is assumed that, at the portion of the end surface of the small roll R at which portion there is no winding offset, the laser light L travels the optical path L1, is reflected, and is imaged onto point a on the CCD array 302B.

The distance from the winding offset 1 portion to the displacement measuring device 302 is shorter than that at the portion of the end surface where there is no winding offset. Accordingly, the laser light L which hits the winding offset 1 portion is reflected at a position closer to the displacement measuring device 302 than that of the laser light L which hits the portion where there is no winding offset, travels the path designated as optical path L2 in FIG. 43, passes through the center of the light receiving side lens 302G, and is imaged on the CCD array 302B. Here, as shown in FIG. 43, an angle θ' formed by reflected light L2 and the laser light L is greater than an angle θ formed by reflected light L1 and the laser light L. Accordingly, the reflected light L2 is imaged on the CCD array 302B at a point b which is positioned further downward than the point a in FIG. 43.

As mentioned above, the amount of projection of the winding offset 2 is greater than that of the winding offset 1. Thus, the distance from the winding offset 2 to the displacement measuring device 302 is even shorter. Accordingly, the laser light L which hits the winding offset 2 is reflected at a position closer to the displacement measuring device 302 than that of the laser light L which hits the winding offset 1, travels the path designated as optical path L3 in FIG. 43, passes through the center of the light receiving side lens 302G, and is imaged on the CCD array 302B. Here, as shown in FIG. 43, an angle θ" formed by reflected light L3 and the laser light L is greater than the angle θ' formed by the reflected light L2 and the laser light L. Thus, the reflected light L3 is imaged on the CCD array 302B at a point c which is positioned further downward than the point b.

In this way, the greater the projected amount of the winding offset, the further downward on the CCD array 302B the reflected light, which hit the winding offset, is imaged.

Here, because the displacement measuring device 302 moves parallel to the end surface of the small roll R, the distance between the displacement measuring device 302 and the end surface is constant. Accordingly, the distance from the displacement measuring device 302 to the end surface and the winding offset can be determined from the position of the imaging point on the CCD array, in accordance with the principles of triangulation.

Hereinafter, the structure of the computer 320 and the sequencer 330 will be described.

Figure 44:
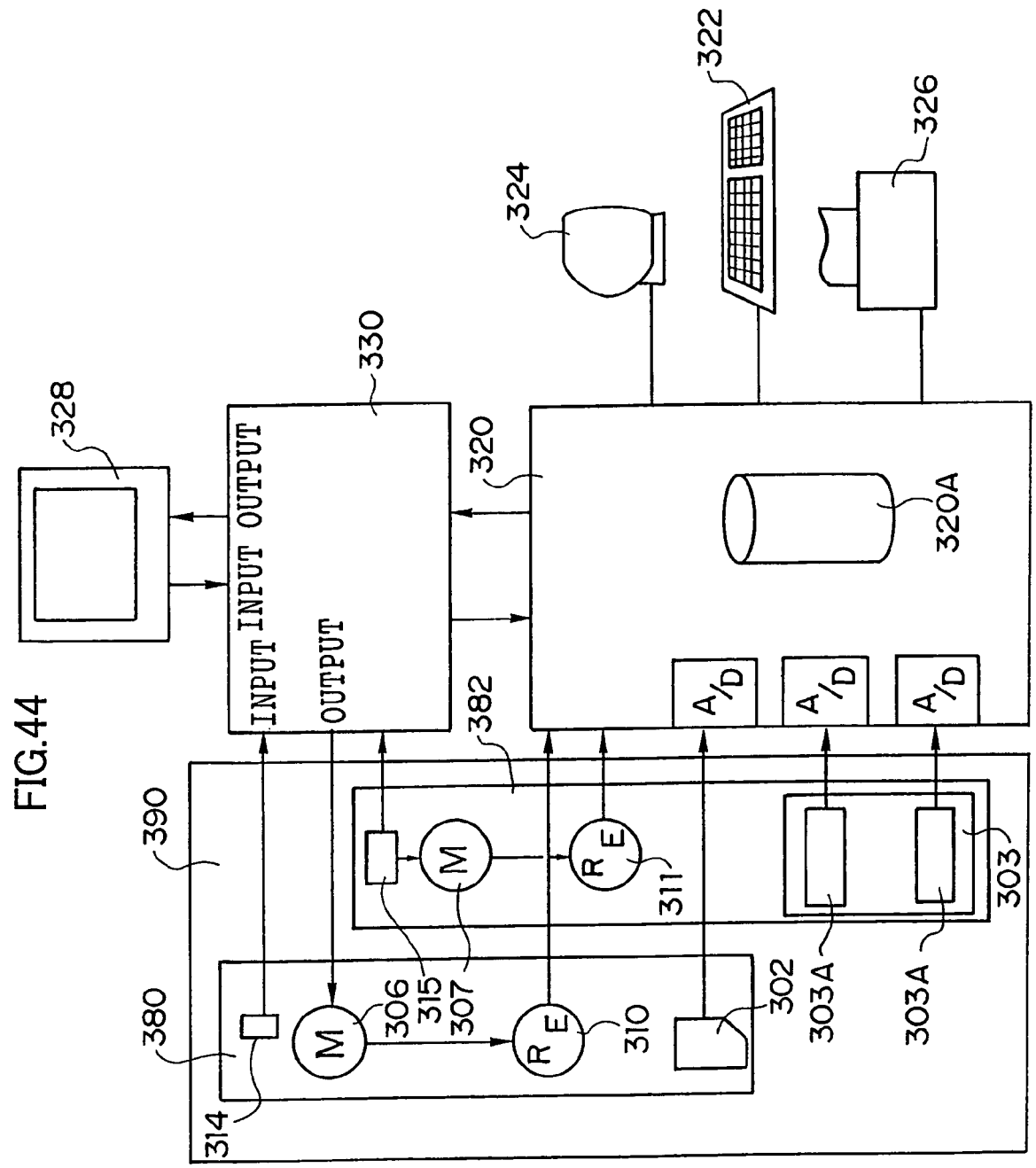
FIG. 44 is a schematic view showing the structure of a sequencer and a desktop computer which control the roll winding offset measuring device.
Figure 45:
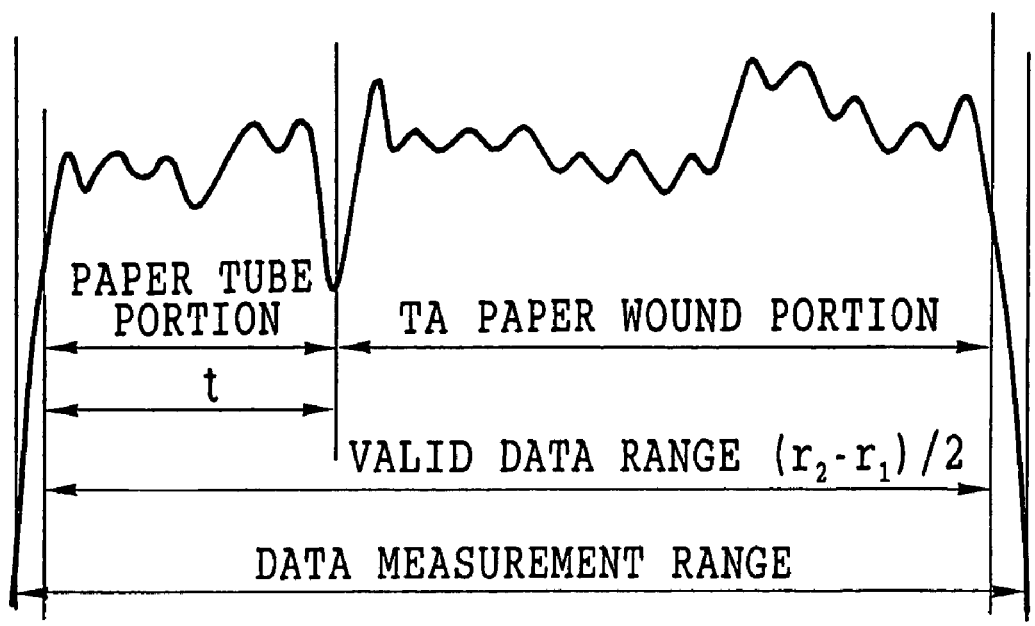
FIG. 45A is a diagram showing an example of distance data which varies in accordance with a scanned distance.
FIG. 45B is a end surface diagram of the small roll for explaining the valid data range.
Figure 45:
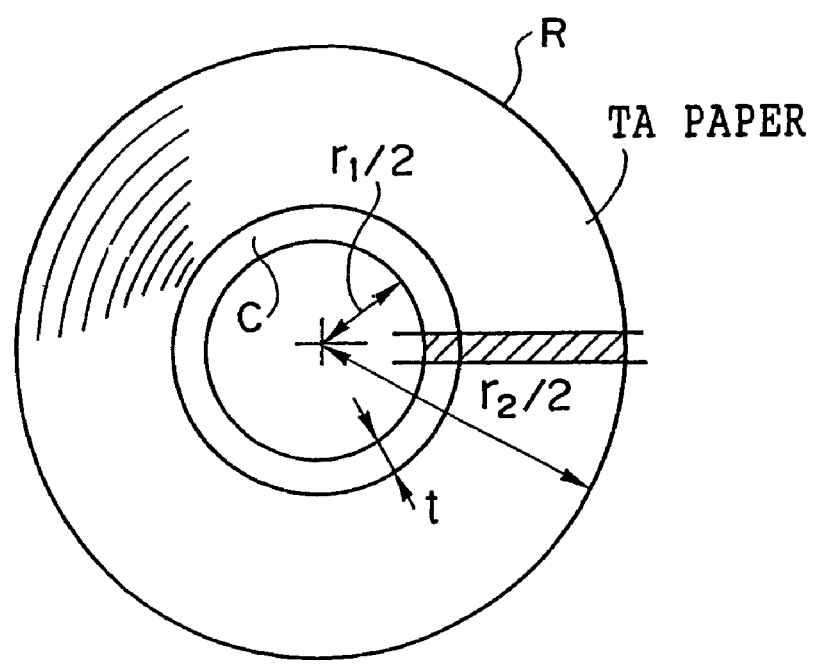

The schematic structure of the computer 320 and the sequencer 330 is shown in FIG. 44.

The sequencer 330 is a sequencer which carries out sequence control of an entire small roll processing device 390 into which the roll winding offset measuring device 380 is incorporated.

The small roll processing device 390 functions to wind the TA paper in the form of a small roll onto the paper tube C so as to manufacture the small roll R. The roll winding offset measuring device 380 and a roll width examining device 382, which examines whether or not the width of the small roll R falls within a predetermined range, are incorporated into the small roll processing device 390.

As shown in FIG. 44, the following are connected to the sequencer 330: a touch panel input/display device 328 by which settings of processing sizes and operation commands at the small roll processing device 390 are inputted, and which displays the conditions of operation and the contents of abnormalities at the small roll processing device 390; the sensor 314 for timing which is provided at the roll winding offset measuring device 380; a sensor 315 for timing which detects that the small roll R is loaded at a predetermined position at the roll width examining device 382; and the servo motor 306 provided at the roll winding offset measuring device 380 and a motor 307 provided at the roll width examining device 382.

The roll width examining device 382 has a roll width measuring device 303 which optically measures the width of the small roll R. The roll width examining device 382 functions to examine whether or not the width of the small roll R falls within a predetermined range, on the basis of the results of measurement of the roll width measuring device 303. The roll width measuring device 303 has, at each end portion of the small roll R, a light emitting portion (not shown) which irradiates laser light in a strip-form parallel to the axis of the small roll R, and a pair of light receiving portions 303A receiving the laser light from the light emitting portion and measuring the width of the small roll R.

The sensor 315 for timing is, in the same way as the sensor 314 for timing, formed from a light emitting element and a light receiving element. The sensor 315 for timing functions to sense whether or not the small roll R is loaded on a roll holding stand provided at the roll width examining device 382.

The motor 307 is a motor which scans the roll width measuring device 303 along the end surface of the small roll R. A rotary encoder 311 is connected to the rotating shaft of the motor 307. The rotary encoder 311 also outputs one pulse each time the roll width measuring device 303 moves a given distance, e.g., 0.05 mm.

The computer 320 has the functions of computing the measured data at the displacement measuring device 302 of the roll winding offset measuring device 380, and the received light data at the light receiving portions 303A of the roll width examining device 382, and judging whether the small roll R is good or poor.

The displacement measuring device 302, the light receiving portions 303A at the roll width measuring device 303, the rotary encoder 310, the rotary encoder 311, the display 324, the keyboard 322, and the printer 326 are connected to the computer 320. Further, the sequencer 330 is connected to the computer 320.

When dimensional parameters, such as the width w of the TA paper which is to be processed into the small roll R in the small roll processing device 390, and an inner diameter $r_1$ of the paper tube C at the small roll R, and an outer diameter $r_2$ of the small roll R, and the like, and operational commands and the like are inputted to the touch panel input/display device 328, the dimensional parameters and operational commands are inputted to the sequencer 330.

The sequencer 330 effects sequence control of the small roll processing device 390 on the basis of the operational commands, and outputs the dimensional parameters to the computer 320.

At the small roll processing device 390, the roll winding offset measuring device 380 and the roll width examining device 382 are activated on the basis of the sequence control commands from the sequencer 330.

When the roll winding offset measuring device 380 is activated, the displacement measuring device 302 and the sensor 314 for timing are turned on at the roll winding offset measuring device 380.

When a signal expressing that the small roll R is loaded on the roll holding stand 302 is inputted from the sensor 314 for timing to the sequencer 330, the sequencer 330 outputs a signal to the computer 320. When the computer 320 receives this signal, the computer 320 sets the scanning ranges of the displacement measuring device 302 and the roll width measuring device 303, on the basis of the outer diameter $r_2$ of the small roll inputted from the sequencer 330. On the basis of the operational ranges set at the computer 320, the sequencer 330 controls the servo motor 306. In this way, at the roll winding offset measuring device 380, the scanning of the displacement measuring device 302 is started.

When scanning is started, one pulse is outputted from the rotary encoder 310 to the computer 320 each time the displacement measuring device 302 and the roll width measuring device 303 move 0.05 mm.

The measurement data from the displacement measuring device 302 is outputted as voltage. Thus, after this output is converted into analog data at an A/D converter, it is inputted to the computer 320.

On the basis of the pulses from the rotary encoder 310 and the measurement data from the displacement measuring device 302, the computer 320 carries out computation in accordance with processes which will be described later, so as to determine the magnitude of the winding offset of the small roll R.

The results of computation are stored in a memory within the computer 320, and are simultaneously outputted to the sequencer 330 and displayed on the touch panel input/display device 328. Further, when a command expressing that the results of computation are to be displayed on the display 324, is inputted from the keyboard 322 to the computer 320, the computer 320 displays the results of computation in the form of a table or a graph on the display 324.

When the width w of the TA paper, and an allowable error which shows to what extent the width of the small roll R can be greater than the width w of the TA paper, and examination standards such as the magnitude of winding offset which is permissible or the like, are inputted from the keyboard 322 to the computer 320, the computer 320 judges whether the small roll R is good or poor on the basis of the results of computation and the inputted examination standards.

The results of judgement are also outputted to the sequencer 330 and are displayed on the touch panel input/display device 328.

The processes for determining the magnitude of the winding offset on the basis of the measurement data inputted from the displacement measuring device 302 will be described hereinafter.

An example of the distance data to the end surface of the small roll R, which the computer 320 computes on the basis of the positional data of the imaging points read from the CCD array 302B, is shown in FIGS. 45A and 45B. FIG. 45A is a graph in which distance data is plotted on the vertical axis, and the scanned distance of the displacement measuring device 302 is plotted on the horizontal axis. FIG. 45B is an end surface view showing the relationship between the end surface of the small roll R and a valid data range which will be described later.

Figure 47:
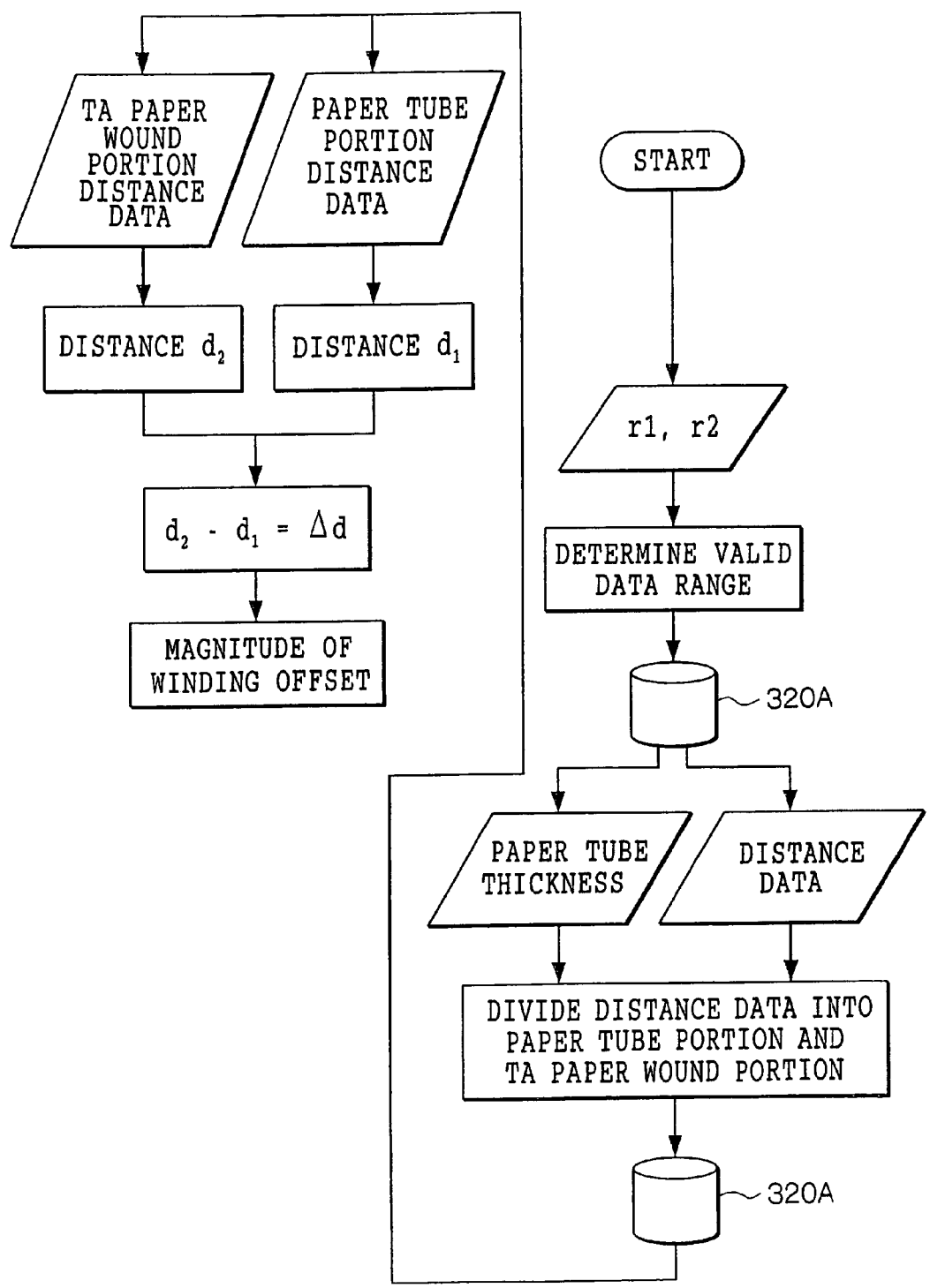
FIG. 47 is a flowchart showing a computational program for computing the magnitude of the winding offset on the basis of distance data read from a CCD array at the displacement measuring device.

The computer 320 calls up a computational program for computing the magnitude of the winding offset, from a storage device 320A provided within the computer 320. The contents of the computational program are shown in FIG. 47. Then, the computer 320 determines the magnitude of the winding offset in accordance with the computational program, from the position data of the imaged points read from the CCD array 302B.

The contents of the computational program will be described hereinafter.

As shown in FIG. 47, a valid data range is determined on the basis of the outer diameter $r_2$ of the small roll R and the inner diameter $r_1$ of the paper tube C. Specifically, as shown in FIG. 45B, the hatched portion at the end surface of the small roll R, i.e., the range in which the scanned distance of the displacement measuring device 302 from the central point of the small roll R is greater than the inner diameter $r_1$ of the paper tube C and smaller than the outer diameter $r_2$ of the small roll R, is set as the valid data range. Here, the valid data range means a range of distance data used for determining a reference plane for evaluating the magnitude of the winding offset, and used for computing the magnitude of the winding offset.

When the valid data range has been set, the distance data within the valid data range is divided into distance data of the paper tube C portion and distance data of the TA paper wound portion. Here, the TA paper end surface is the end surface of the wound portion of the TA paper at the small roll R. Then, the respective distance data are temporarily stored in the storage device 320A.

Figure 46:
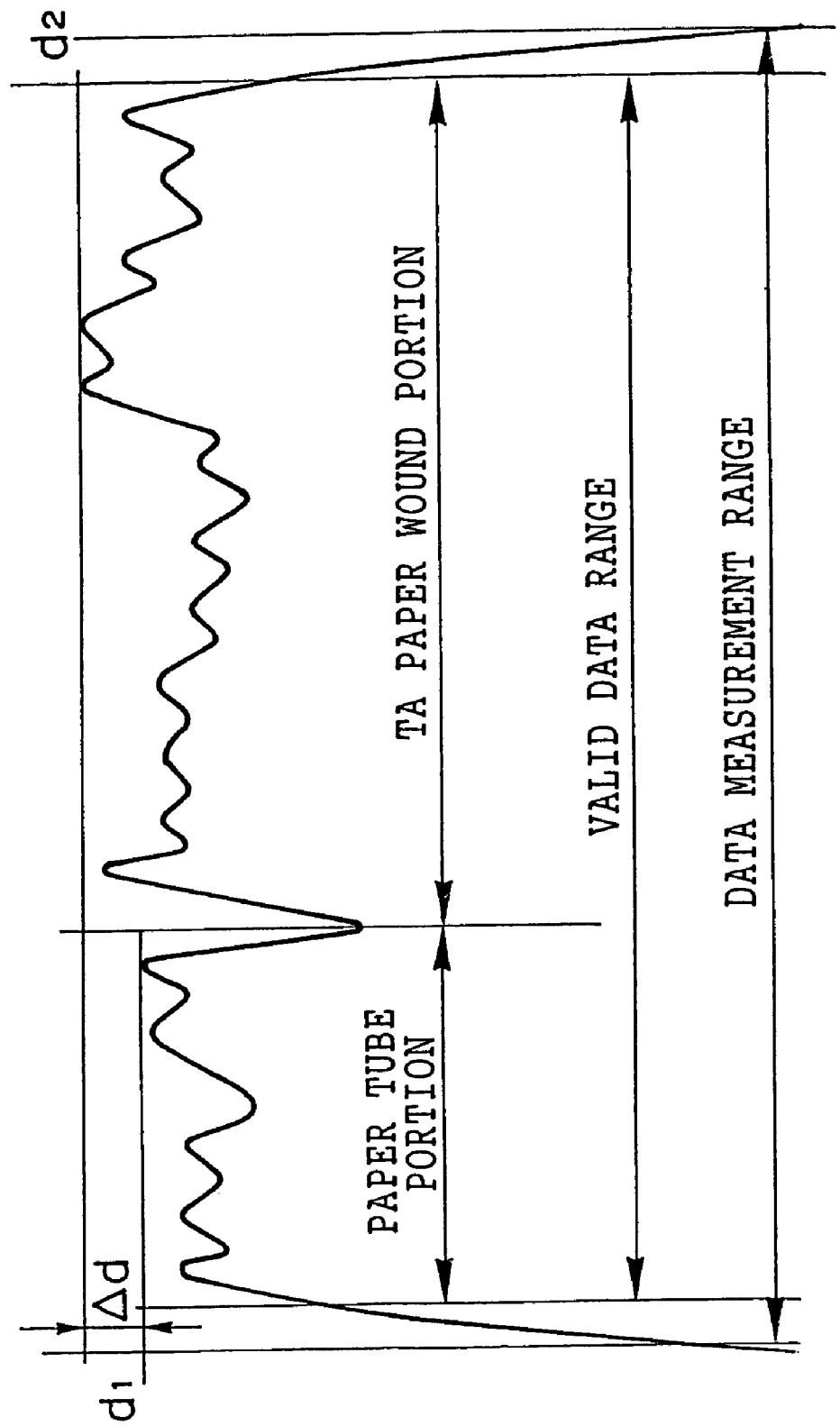
FIG. 46 is a graph showing the relationship, in the distance data shown in FIG. 45A, between a distance $d_1$ to the portion projecting the most from the end surface of the paper tube C, a distance $d_2$ of the portion projecting the most at the end surface of a TA paper, and a winding offset $\Delta d$.

Next, the distance data of the paper tube C portion and the TA paper wound portion are read from the storage device 320A, and a distance $d_1$, from a scanning plane, which is an imaginary plane in which the displacement measuring device 302 travels, to the portion which projects the most at the end surface of the paper tube C, and a distance $d_2$, from the scanning plane to the portion which projects the most at the TA paper wound portion, are determined. The relationship between the distance data and the distance $d_1$ and the distance $d_2$ is shown in FIG. 46.

A reference plane is an imaginary plane which is parallel to the scanning plane and which contacts the portion projecting the most at the paper tube C portion. When $d_2$ and $d_1$ have been determined, a height $\Delta d = d_2 - d_1$, from this reference plane, at the portion which projects the most at the TA paper wound portion is determined. Here, the winding offset is the projecting of the TA paper wound portion at the small roll R. Thus, the height $\Delta d$ is the height, from the reference plane, of the largest winding offset among the winding offsets.

The height $\Delta d$ which has been determined in this way is considered to be the amount of projection, i.e., the magnitude, of the winding offset.

Further, a central computing processing device 320A compares the magnitude $\Delta d$ of the winding offset, which was determined by the above processes, with a stipulated value x which has been inputted in advance. If the magnitude $\Delta d$ of the winding offset is less than or equal to the stipulated value x, it is judged that the small roll R is a good article. If the magnitude $\Delta d$ of the winding offset is greater than the stipulated value, it is judged that the small roll R is a poor article. Thus, the small roll R is classified into either a good article or a poor article.

There are many cases in which an adhesive applied to the reverse surface of the TA paper protrudes out at the end surfaces of the small roll R. However, the roll winding offset measuring device 380 can measure, without contact, the winding offset at the small roll R. Thus, the presence/absence of winding offset and the magnitude thereof can be measured without damaging or deforming the small roll R, and without the end surface of one small roll R being dirtied by the adhesive which has protruded out from the end surface of another small roll R.

Further, at the small roll R, there are many cases in which winding offset occurs at the portion at which the TA paper begins to be wound. In the roll winding offset measuring device 380, as described above, the displacement measuring device 302 moves at a low speed between the paper tube C and the portion at which the winding of the TA paper starts. When scanning the portion further toward the outer side than the portion at which the winding of the TA paper starts, the displacement measuring device 302 moves at high speed.

Accordingly, at the paper tube C and the portion at which the TA paper begins to be wound, the magnitude of the winding offset can be measured with high accuracy. Thus, the occurrence of oversights of winding offset can be prevented. Moreover, at the region where the TA paper is wound, which usually occupies the largest portion at the small roll R, the magnitude of the winding offset can be measured efficiently.

Further, at the winding offset measuring device 380, the ball screw 304 is screwed together with the displacement measuring device 302, and the ball screw 304 is rotated by the servo motor 306. Here, the servo motor 306 can control the rotational speed with high accuracy, and can carry out reversal of the rotating direction instantaneously. Thus, the scanned distance and scanning speed of the displacement measuring device 302 can be controlled with high accuracy.

Moreover, in the displacement measuring device 302, laser light is irradiated onto the end surface of the small roll R, the light reflected from the end surface is detected by the CCD array, and the distance from the end surface is determined in accordance with the principles of triangulation. Accordingly, the distance from the scanning plane to the winding offset arising at the end surface can be determined with high accuracy. Thus, at the winding offset measuring device 380, the magnitude of the winding offset can be measured at a high accuracy which is equivalent to that in a case in which measurement by a height gauge is carried out.

Moreover, in the winding offset measuring device 380, control of the entire device is carried out by the computer 320 and the sequencer 330. Thus, the measurement of the magnitude of the winding offset and the judgement of the goodness/poorness can be carried out completely automatically.

Figure 48:
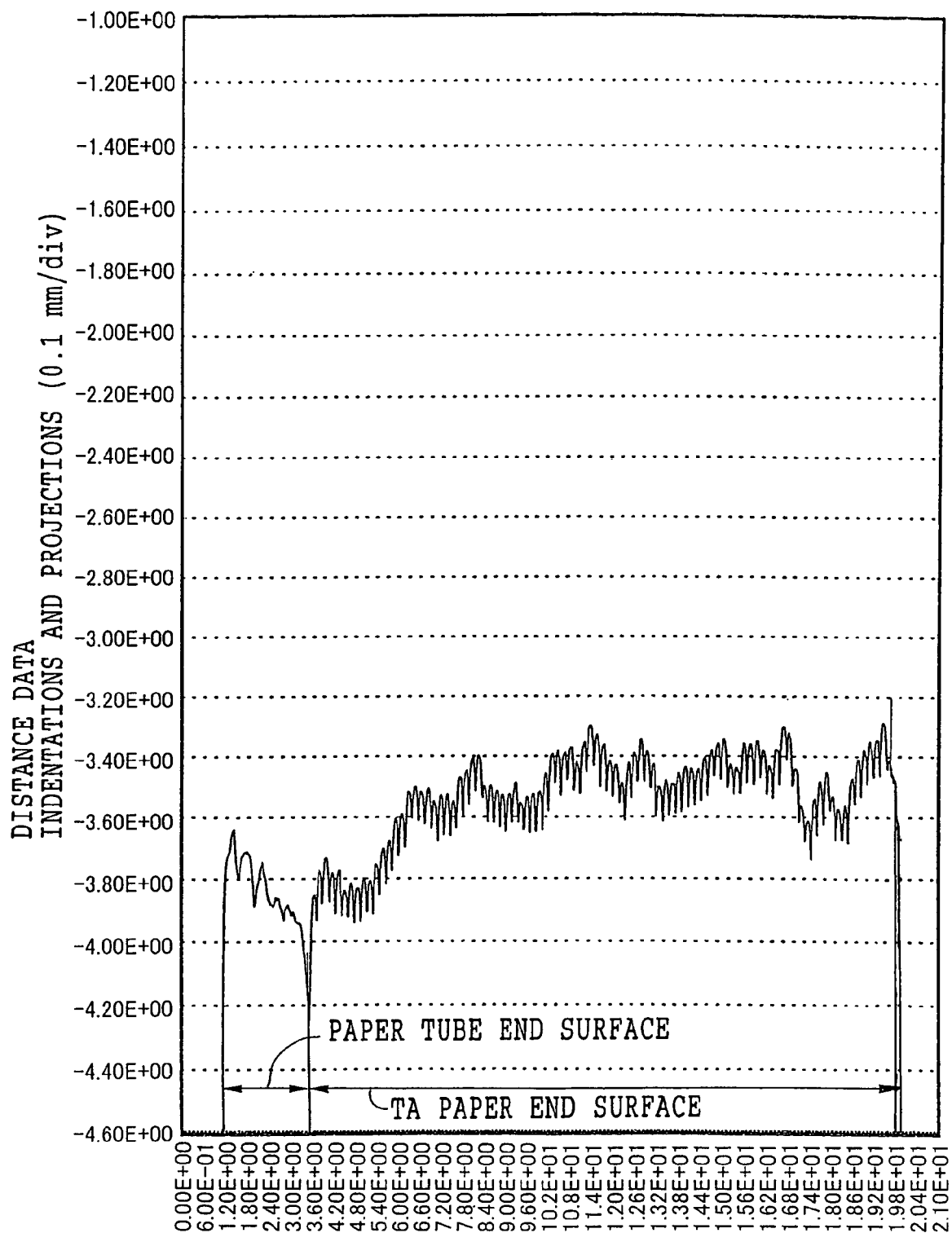
FIG. 48 is a graph showing an example of distance data of the small roll R in an experimental example.

The magnitude of the winding offset was actually measured experimentally for a small roll R having an outer diameter of 105 mm in which a TA paper was wound on a paper tube having an inner diameter of 50 mm and an outer diameter of 60 mm, by using the roll winding offset measuring device 380 shown in FIGS. 40 through 42, and by setting a scanning speed $v_1$ to 1.25 mm/s and a scanning speed $v_2$ to 12.5 mm/s. The distance data of the small roll R read from the CCD array is shown in FIG. 48. In this experimental example, as is clear from FIG. 48, clear distance data was obtained not only for the end surface of the TA paper portion, but also for the end surface of the paper tube C portion.

Figure 49:
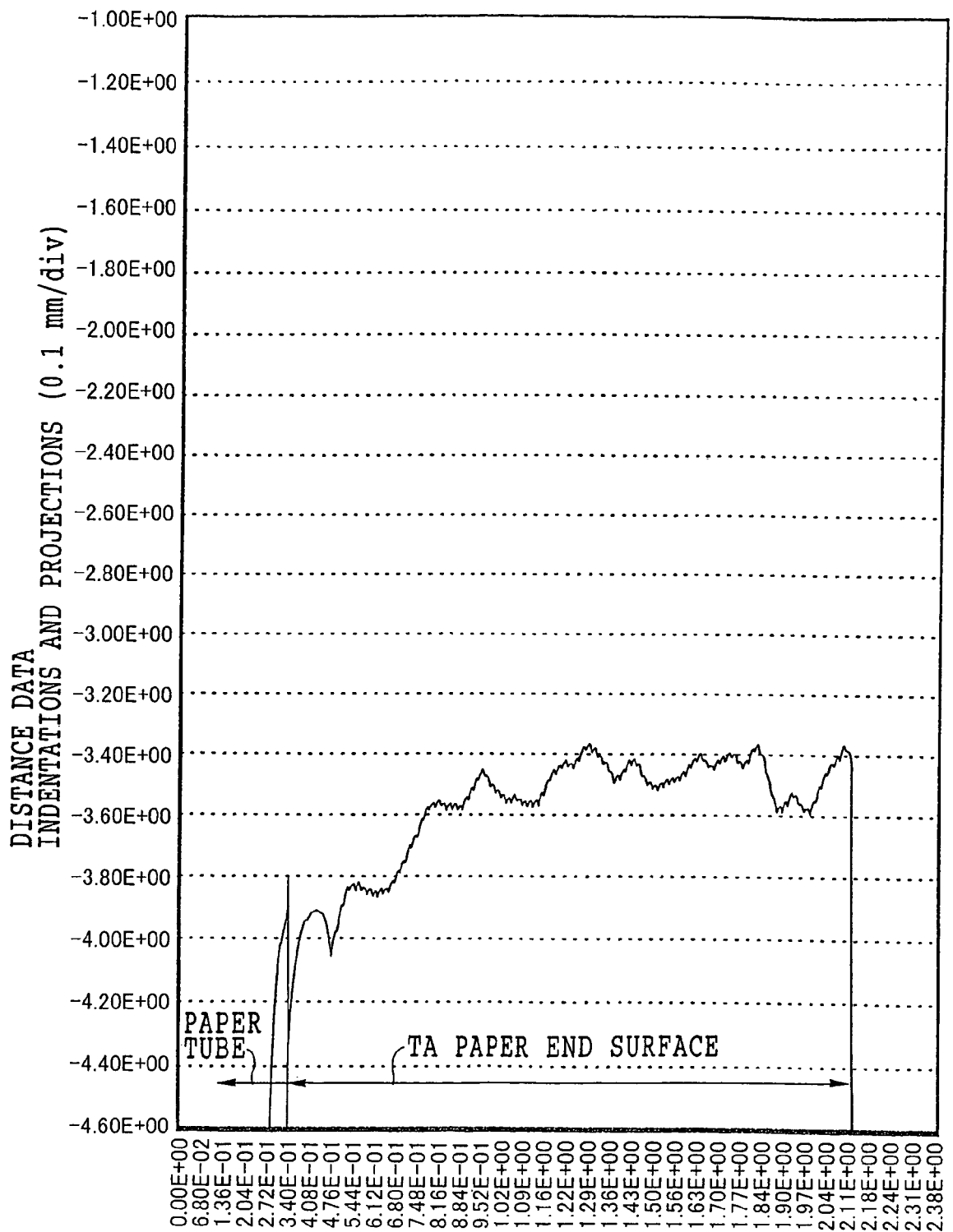
FIG. 49 is a graph showing an example of distance data of the small roll R in a comparative example.

For comparison, the magnitude of the winding offset of the same small roll R as in the experimental example was carried out in accordance with the same processes, except that the scanning speed $v_1$ was set to 12.5 mm/s. The results of this comparative example are shown in FIG. 49. As is clear from FIG. 49, hardly any distance data could be obtained for the end surface at the paper tube C portion.

As described above, in accordance with the present invention, there is provided a roll winding offset measuring device and a roll wind-up device equipped with the roll winding offset measuring device, which can measure, without contact, the displacement at the end surface of a roll, and accordingly, even if there is a roll in which adhesive protrudes out at the end surfaces such as in the case of a small roll, the absence/presence and the magnitude of winding offset can be measured automatically and with high accuracy without dirtying, damaging or deforming the roll.

Fourth Embodiment

A fourth embodiment of the present invention will be described with reference to FIGS. 50 through 62.

Figure 50:
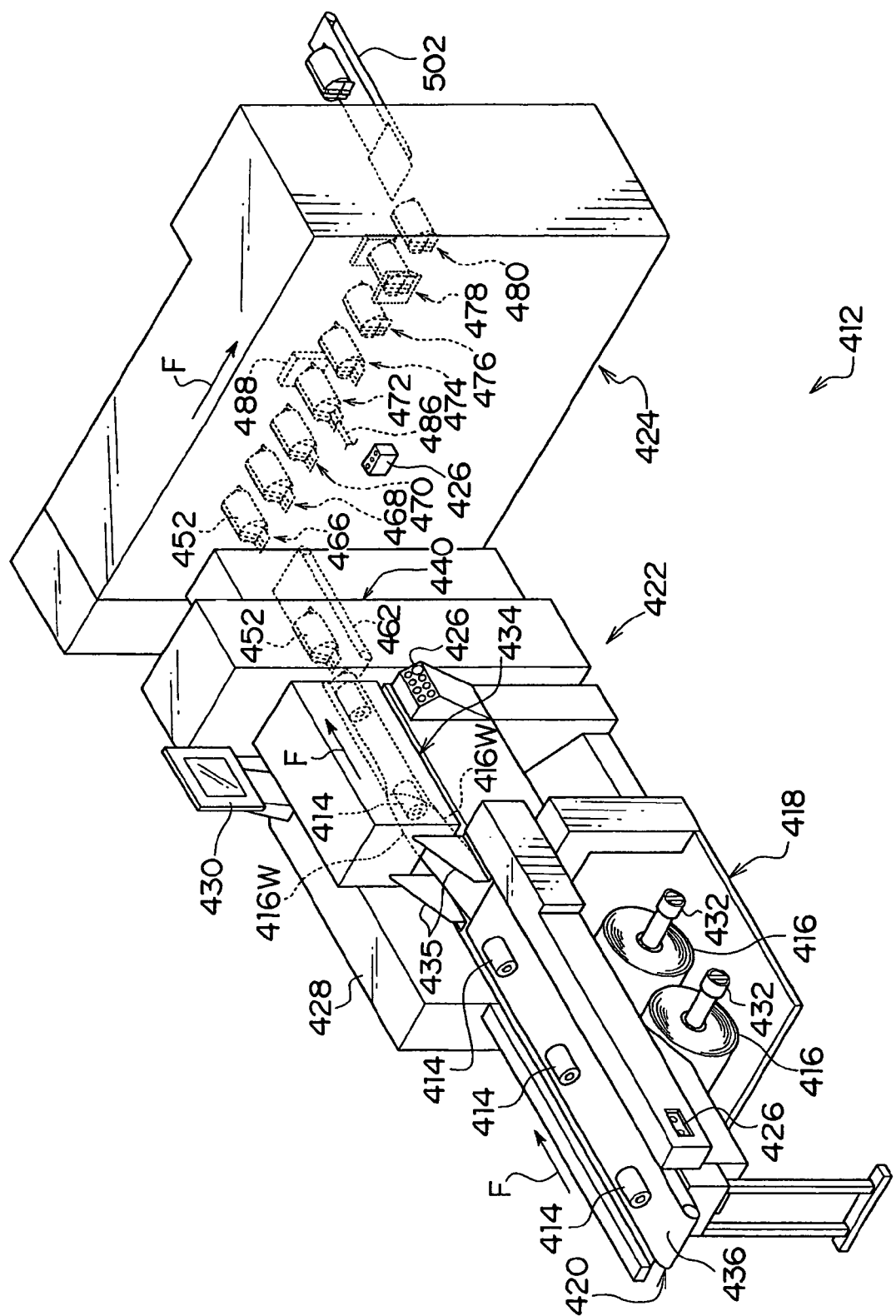
FIG. 50 is a perspective view showing the schematic structure of an example of a deaerating/packaging device relating to the present invention.

The overall structure of a deaerating/packaging device 412 relating to the present invention is shown in FIG. 50. The deaerating/packaging device 412 is used for packaging a paper roll 414 at which a so-called TA paper is wound in a roll form. The TA paper relating to the present embodiment is a paper in which a heat color forming agent is coated on one surface thereof, and color is formed when a predetermined amount of heat is applied to the surface by a heat transfer system or the like. Thus, TA paper can be used in order to obtain a high quality image in a simple photographic print or the like in, for example, a street or a store or the like. In order to maintain the characteristics of the TA paper, the TA paper must be packaged in a moisture-proof and light-shielded state. Note that the paper roll 414 is set in an image recording device in a state of being wound in roll form, and either before or after image recording, is cut into a predetermined configuration (generally, a sheet form) by a cutting device or the like which is provided in the image recording device or separately.

The deaerating/packaging device 412 has a packaging film supplying section 418 which supplies a film 416 for packaging which is a packaging material; and a paper roll supplying section 420 which supplies the paper roll 414 which is an object-to-be-packaged. The deaerating/packaging device 412 further has a temporarily packaging device 422 which temporarily packages the paper roll 414 by the film 416 for packaging; and a deaerating/sealing device 424 which deaerates the interior of the film 416 for packaging which has been temporarily packaged, and carries out sealing. The paper roll supplying section 420, the temporarily packaging device 422 and the deaerating/sealing device 424 each have an operation panel 426. The information which an operator inputs from the operation panels 426 is transmitted to a control device 428, and the packaging film supplying section 418, the paper roll supplying section 420, the temporarily packaging device 422, and the deaerating/sealing device 424 are controlled. A touch panel 430 is provided above the control device 428. The touch panel 430 displays information relating to the deaerating/packaging device 412. The operator can input predetermined information through the touch panel 430 as well.

Hereinafter, the expression "conveying direction" refers to the conveying direction of the paper roll 414, which is denoted by arrows F in the drawings. As can be seen from FIG. 50, within the temporarily packaging device 422, the axial direction of the paper roll 414 and the conveying direction coincide with each other. Within the deaerating/sealing device 424, these directions are orthogonal to each other.

The film 416 for packaging is a multilayer structure in which at least one side end surface is a thin film formed of a heat fusible resin, and is formed as a web-shaped film, and is wound in a roll-form such that the heat fusible resin is disposed at the inner side. A sealing agent, which exhibits adhesive strength when heat is applied thereto, is coated on the outer peripheral surface of the film 416 for packaging relating to the present embodiment. As will be described later, sealing of the outer surface of the film 416 for packaging is possible due to this sealing agent.

Setting shafts 432, on which the films 416 for packaging which are wound in roll-form are set, are provided in the packaging film supplying section 418. The film 416 for packaging is wound out successively from this state of being set on the setting shaft 432. Note that there are two setting shafts 432 in the packaging film supplying section 418 of the present embodiment. When the film 416 for packaging, which is set at one of the setting shafts 432, is completely wound out, the film 416 for packaging, which is set at the other setting shaft 432, is then wound out and supplied. In this way, it is possible to continuously supply the film 416 for packaging. The supplied film 416 for packaging, with its heat fusible resin thin film directed upward, reaches a center sealing section 434 of the temporarily packaging device 422 disposed downstream in the supplying direction.

The paper roll supplying section 420 has a supplying belt conveyor 436, and the paper rolls 414 are conveyed by this supplying belt conveyor 436. At this time, the paper rolls 414 are conveyed such that their axial directions are oriented to coincide with the conveying direction, and so as to be spaced apart from one another at constant intervals. At the center sealing section 434, the paper roll 414 is conveyed onto the heat fusible resin of the film 416 for packaging.

At the center sealing section 434, the paper roll 414 is conveyed in a state of being carried on the film 416 for packaging, by feed rollers (not shown). Then, first, guide plates 435 shown in FIG. 50 bend both transverse direction end portions 416W of the film 416 for packaging from downward to upward.

Figure 51:
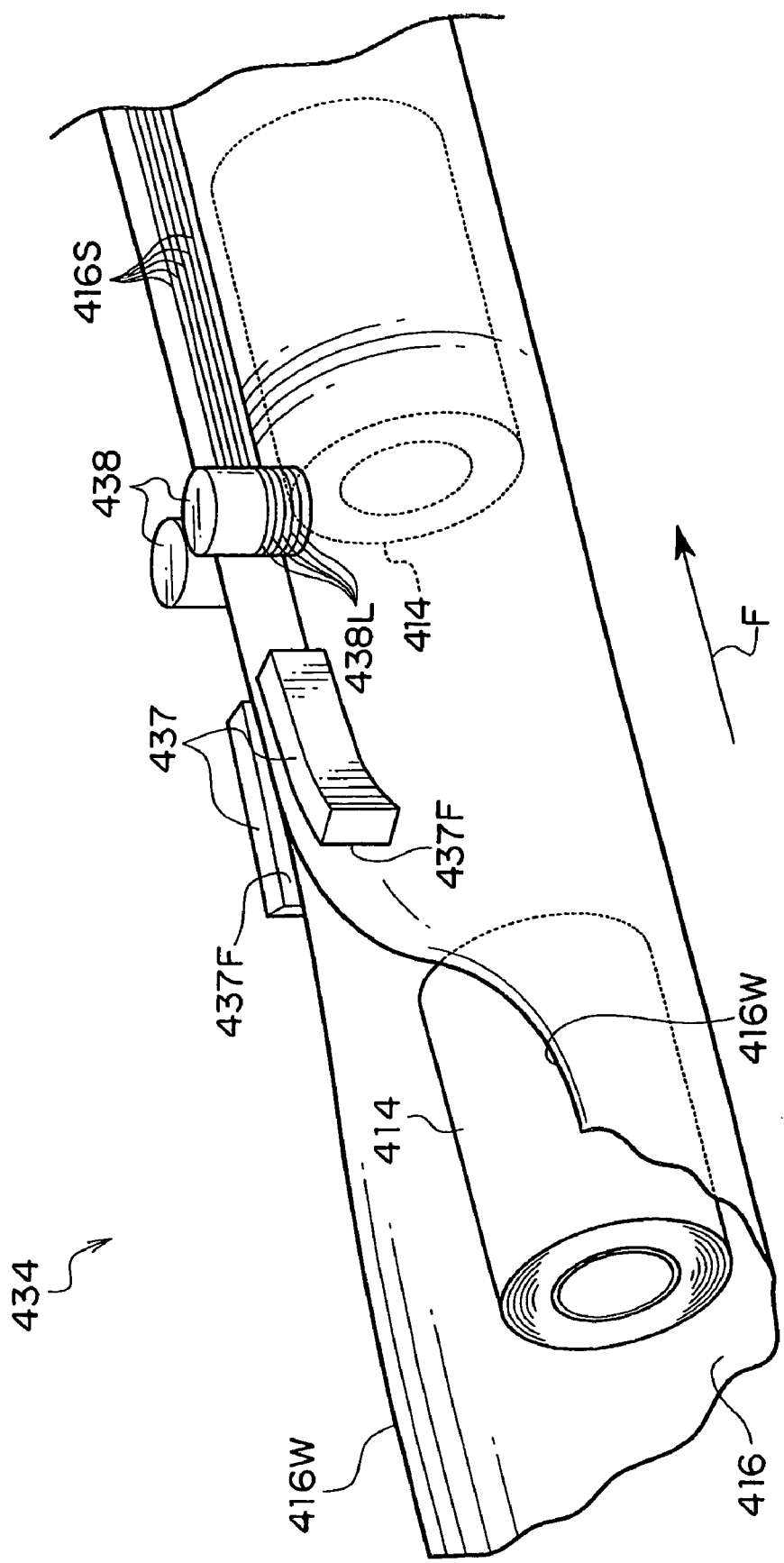
FIG. 51 is a perspective view showing the schematic structure of a center sealing portion of a temporarily packaging device forming a fourth embodiment.

As shown in FIG. 51, a pair of air heaters 437 is disposed downstream of the guide plates 435. The air heaters 437 are formed or are disposed such that an interval between opposing surfaces 437F thereof gradually narrows toward the conveying direction downstream side. A plurality of air holes are formed in the opposing surfaces 437F, and hot air supplied from an unillustrated hot air supplying source is blown out from the air holes. While the air heaters 437 make the both transverse direction end portions 416W of the film 416 for packaging approach each other along the opposing surfaces 437F, the air heaters 437 heat the heat fusible resin thin film and make the portions of the heat fusible resin thin film at the both transverse direction end portions 416W contact one another by the hot air blown from the air holes. Note that, in FIG. 51, the opposing surfaces 437F of the air heaters 437 are formed so as to be curved. However, the opposing surfaces 437F may be formed in planar forms.

A pair of corrugation forming rollers 438 is disposed at the downstream side of the air heaters 437, and clamp together the both transverse direction end portions 416W (the portions at which the heat fusible resin thin film has been fused by the air heaters 437) of the film 416 for packaging. A plurality of projections 438L are formed on the outer peripheral surfaces of the finding rollers 438 along the circumferential directions thereof. The projections 438L form a plurality of corrugations 416S, which extend along the conveying direction, in the clamped portion of the film 416 for packaging, so as to increase the adhesiveness of the heat fusible resin thin film. In this way, the film 416 for packaging becomes substantially tubular, and the paper rolls 414 are lined up in a row at the interior thereof at constant intervals.

Figure 52:
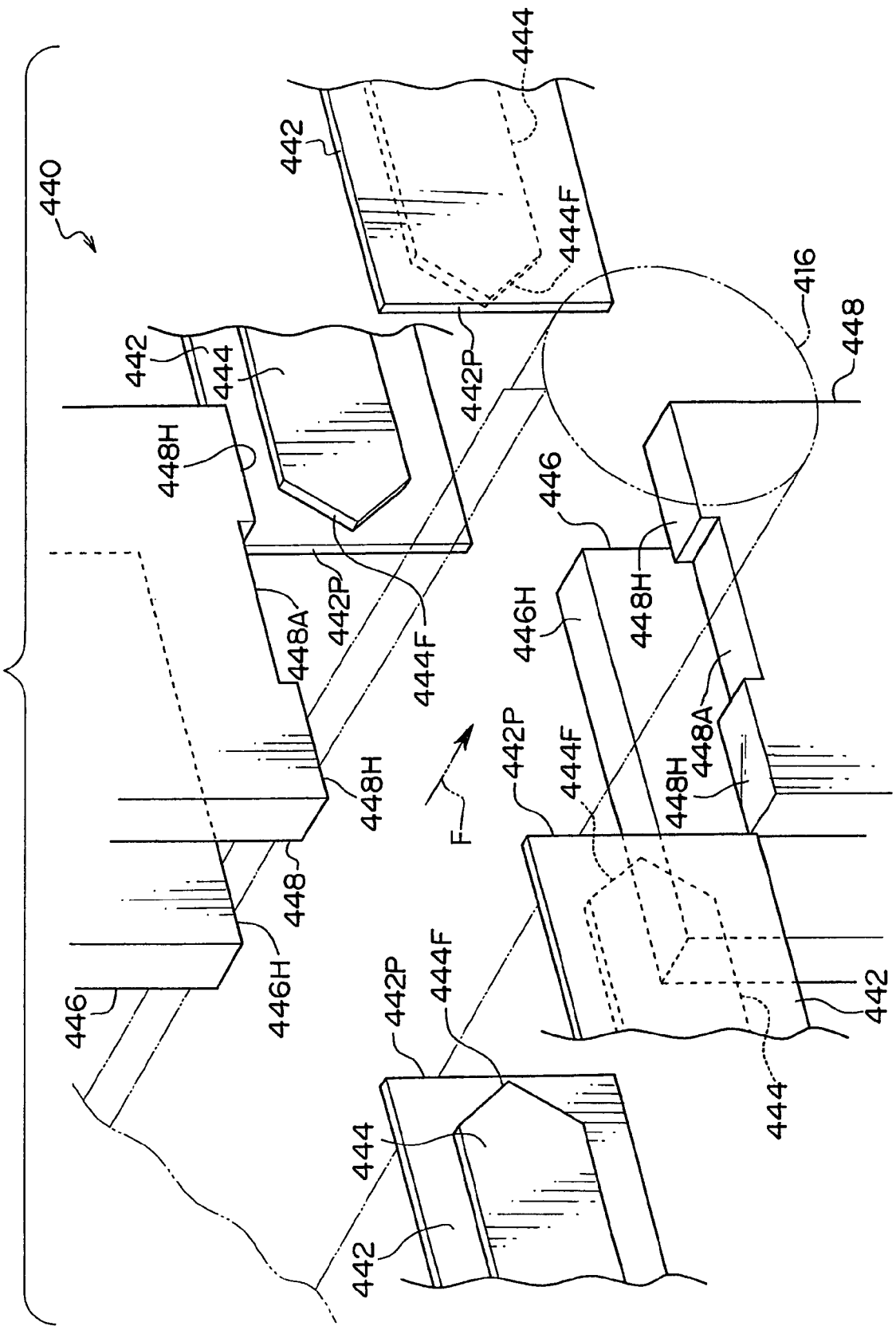
FIG. 52 is a perspective view showing the schematic structure of a temporary heat sealing portion.

As shown in FIGS. 52 and 53A, the temporarily packaging device 422 has a temporary heat sealing section 440. A conveyor 462 is provided in the temporary heat sealing section 440. The paper rolls 414 and the film 416 for packaging are conveyed along the axial direction of the paper rolls 414 by the conveyor 462.

The temporary heat sealing section 440 has a total of four presser plates 442 disposed at predetermined intervals along the conveying direction of the film 416 for packaging, with two presser plates 442 being located at either transverse direction side of the substantially tubular film 416 for packaging. The surfaces of the presser plates 442 which oppose the film 416 for packaging are presser surfaces 442P which are planar. As shown in FIG. 53B, at positions between the paper rolls 414 (i.e., at the positions of the gaps between the paper rolls 414), each of the four presser plates 442 moves synchronously toward the center of the film 416 for packaging so as to press the film 416 for packaging from the both transverse sides thereof so as to reshape the film 416 for packaging into partial substantially rectangular tubes.

The temporary heat sealing section 440 also has four bend-in plates 444 which are disposed adjacent to the respective presser plates 442. The surfaces of the bend-in plates 444 which oppose the film 416 for packaging are bend-in portions 444F which project in triangular shapes toward the film 416 for packaging. As shown in FIG. 53C, the four bend-in plates 444 move synchronously toward the center of the film 416 for packaging, at positions at which the film 416 for packaging has been formed into the substantially rectangular tubes by the presser plates 442. Bend-in portions 444F, which press the film 416 for packaging from the both transverse direction sides thereof, are formed at the bend-in plates 444. At these bend-in portions 444F, portions of the film 416 for packaging are folded over toward the center side thereof.

As shown in FIGS. 54A, 54B, 54C, the temporary heat sealing section 440 has pairs of heater blocks 446, 448 disposed above and below the film 416 for packaging; and a cutter 450 disposed above the film 416 for packaging. The heater blocks 446, 448 positioned above the film 416 for packaging integrally approach or move away from the film 416 for packaging, and synchronously therewith, the heater blocks 446, 448 positioned beneath the film 416 for packaging integrally approach or move away from the film 416 for packaging. Moreover, after a predetermined period of time has elapsed from the movement of the heater blocks 446, the cutter 450 moves downwardly.

The portions of the heater blocks 446 disposed at the conveying direction upstream side, which portions oppose the film 416 for packaging, are heater portions 446H which are planar. The heater portions 446H are heated to a temperature at which fusing of the heat fusible resin is possible. As shown in FIG. 54B, when the upper and lower heater blocks 446 approach one another so as to sandwich the film 416 for packaging, the heat fusible resin thin film is fused along the entire widthwise direction of the film 416 for packaging, such that the film 416 for packaging is fused at this portion.

The portions of the heater blocks 448 disposed at the conveying direction downstream side, which portions oppose the film 416 for packaging, are heater portions 448H which are heated to a temperature at which fusing of the heat fusible resin is possible. The transverse direction central portions are recessed in directions of moving away from each other, such that relief portions 448A are formed thereat. As can be seen in FIGS. 53D and 54C, when the upper and lower heater blocks 448 approach one another, the film 416 for packaging is nipped at the both side portions of the relief portions 448A. Thus, the heat fusible resin thin film is fused by the heat of the heater portions 448H. The temporary heat sealing section 440 is thus structured so as to fuse portions of the film 416 for packaging at the both transverse direction side portions of the film 416 for packaging. In contrast, at the relief portions 448A, because the film 416 for packaging is not nipped, the heat fusible resin thin film is not fused, and the film 416 for packaging is not fused.

Here, the sealing agent, which exhibits adhesive strength when heat is applied thereto, is coated on the outer surface of the film 416 for packaging relating to the present embodiment. Accordingly, when the heat of the heater portions 446H, 448H is applied, at the temporary heat sealing section 440, not only the inner surfaces of the film 416 for packaging, but also the outer surfaces thereof (i.e., the surfaces which were contacted by the bend-in portions 444F of the bend-in plates 444) are sealed (so-called point sealing), such that outer surface sealed portions 416S (see FIGS. 56 and 57) are formed.

After the film 416 for packaging has been fused by the heater blocks 446, 448, as shown in FIG. 54C, the cutter 450 is lowered and cuts the film 416 for packaging. In this way, the fusing by the heater blocks 446, 448 and the cutting by the cutter 450 are carried out continuously and successively at positions between the paper rolls 414. The respective paper rolls 414 are thereby temporarily packaged individually at the downstream side of the cutter 450. In this temporarily packaged state, the film 416 for packaging has gusset portions 454 which are folded-in in substantially triangular configurations as seen from the side; and fin portions 456, 458 at which the fused film is superposed at the distal end sides of the gusset portions 454. The film 416 for packaging is thus in a so-called pillow-type packaged state. Note that, as shown in FIGS. 54A, 54B, 54C, the cutter 450 is disposed between the heater blocks 446, 448 and adjacent to the conveying direction upstream side heater block 446. Accordingly, in the temporarily packaged state, as seen from the paper roll 414, the upstream side fin portion 456 is relatively longer than the downstream side fin portion 458.

Due to the relief portions 448A formed at the heater blocks 448, the heat fusible resin thin film at the transverse direction central portion of the film 416 for packaging is not fused. Accordingly, an opening portion 460 for a deaerating nozzle, which corresponds to a deaerating nozzle 486 which will be described later (see FIG. 57), is formed in the film 416 for packaging which has been cut by the cutter 450.

Hereinafter, the paper roll 414 and the film 416 for packaging, in which the opening portion 460 for a deaerating nozzle is formed and which is temporarily packaged in a pillow-type packaged state, is called a temporarily packaged body 452.

The temporarily packaged body 452 is next conveyed to the deaerating/sealing device 424. As can be seen from FIG. 50, the deaerating/sealing device 424 is disposed so as to be oriented orthogonal to the temporarily packaging device 422. Although the orientation of the temporarily packaged body 452 itself is not changed, the conveying direction is changed by 90°.

Figure 55:
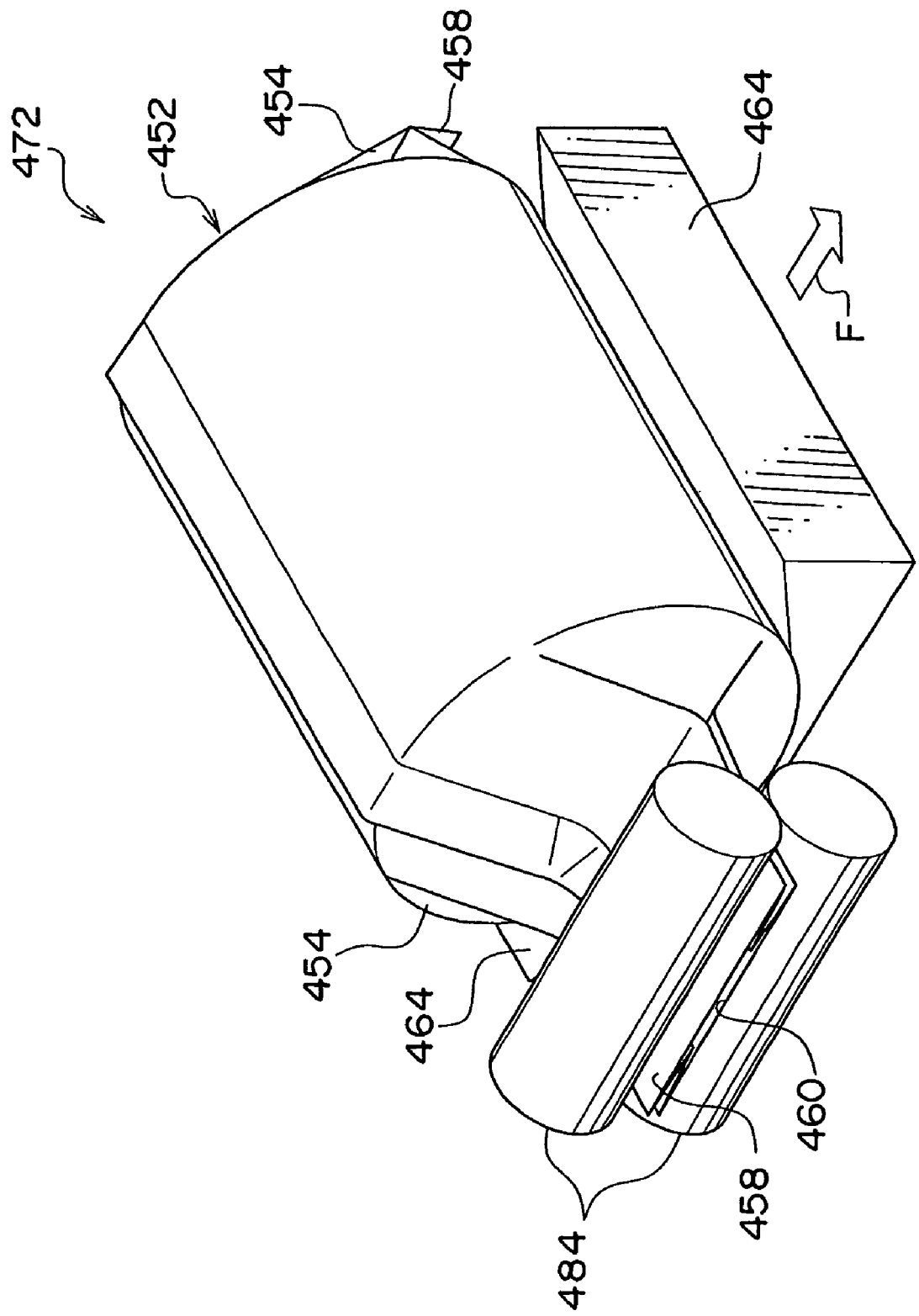
FIG. 55 is a perspective view showing the schematic structure of a device which opens the film for packaging at a deaerating/opening portion of a deaerating/sealing device forming the fourth embodiment.

As shown in FIG. 55, the deaerating/packaging device 412 has a plurality of supporting arms 464 which are formed by two arms. The supporting arms 464 are mounted to a conveyor device. In the state in which the temporarily packaged body 452 is supported by the supporting arms 464 so as to not inadvertently roll and fall down, stopping at a predetermined position and movement are repeated at uniform time intervals (so-called intermittent movement is carried out). As shown in FIG. 50, the stopping positions are, from the conveying direction upstream side, an introduction portion 466, a first idler portion 468, a second idler portion 470, an opening/deaerating portion 472, a deaerating/sealing portion 474, a fin bending portion 476, a fin pressing portion 478, and a discharging portion 480.

The temporarily packaged body 452, which has been introduced into the introduction portion 466, is first stopped successively at the first idler portion 468 and the second idler portion 470. No particular processing is carried out on the temporarily packaged body 452 at these idler portions, but the timing is adjusted so as to correspond to the processings of later steps.

As shown in FIGS. 55 and 56, a pair of suction pipes 484 are disposed in the opening/deaerating portion 472. The suction pipes 484 are disposed one above and one below the fin portion 456 in the same direction as the conveying direction of the temporarily packaged body 452. Each of the suction pipes 484 is connected to a suction device (not shown). Suction holes 484H are formed in the portion of the suction pipe 484 which portion opposes the opening portion 460 for a deaerating nozzle. Due to driving of the suction devices, the film 416 for packaging forming the fin portion 456 can be sucked from above and below. Further, the suction pipes 484 are moved upwardly and downwardly by a driving device (not shown) so as to approach one another and move away from one another. As shown in FIG. 56A, the fin portion 456 of the temporarily packaged body 452 which has reached the opening/deaerating portion 472 is temporarily sandwiched between the suction pipes 484. Then, in the state in which the film 416 for packaging of the fin portion 456 is sucked up and down by the driving of the suction devices, as shown in FIG. 56B, the suction pipes 484 move apart. In this way, the opening portion 460 for a deaerating nozzle is opened widely up and down.

As shown in FIG. 57, the deaerating nozzle 486 is provided at the opening/deaerating portion 472 at a position corresponding to the opening portion 460 for a deaerating nozzle. Further, the opening/deaerating portion 472 has a hollowing preventing plate 488 disposed so as to oppose the deaerating nozzle 486 with the temporarily packaged body 452 therebetween; and a pair of presser plates 490 disposed above and below the deaerating nozzle 486. The hollowing preventing plate 488 is disposed along the conveying direction of the temporarily packaged body 452, and presses the temporarily packaged body 452 in the axial direction thereof. In this way, the film 416 for packaging (and in particular, the gusset portion 454 and the fin portion 458) is sandwiched between the hollowing preventing plate 488 and an axial direction end surface of the paper roll 414, such that the film 416 for packaging does not move inadvertently.

The deaerating nozzle 486 and the presser plates 490 are held by a holder (not shown). Synchronously with the conveying of the temporarily packaged body 452, the holder moves to the deaerating/sealing portion 474. Similarly, the deaerating nozzle 486 and the presser plates 490 move at the same speed synchronously with the temporarily packaged body 452.

The deaerating nozzle 486 is connected to an unillustrated suction device (e.g., a pump or the like), such that air can be sucked from a distal end 486T thereof. Further, the deaerating nozzle 486 is moved by an unillustrated moving device in directions of advancing toward and withdrawing from the temporarily packaged body 452 (in direction G and the direction opposite thereto).

The presser plates 490 are moved by an unillustrated driving device in directions of approaching and moving away from each other. Clamping portions 492, which are formed from elastic bodies of, for example, sponge rubber or the like, are mounted to the portions of the presser plates 490 which oppose one another.

Accordingly, the deaerating nozzle 486 advances toward the temporarily packaged body 452 which is positioned at the opening/deaerating portion 472, and is inserted, from the distal end 486T side thereof, into the opening portion 460 for a deaerating nozzle. As shown in FIG. 57, when the deaerating nozzle 486 is inserted up to a predetermined position, the advance of the deaerating nozzle 486 is stopped. Thereafter, the presser plates 490 approach each other so as to nip the fin portion 456 at the clamping portions 492. The clamping portions 492 are formed of elastic materials. Thus, the film for packaging 416 of the fin portion 456 can be made to fit tightly to the deaerating nozzle 486, without the deaerating nozzle 486 being pressed excessively and such that, due to the elastic force, no gap arises between the deaerating nozzle 486 and the film 416 for packaging forming the fin portion 456. In this state, by driving the suction device, the interior of the temporarily packaged body 452 is deaerated. At this time, the film 416 for packaging is sandwiched between the hollowing preventing plate 488 and an axial direction end surface of the paper roll 414, such that the film 416 for packaging does not move needlessly. Thus, even if the interior of the temporarily packaged body 452 is deaerated, the film 416 for packaging can be prevented from being pulled in into the interior of the paper roll 414 (into the hollow portion of the winding core), and the temporarily packaged body 452 can be maintained in its initial state.

Further, in this state, the temporarily packaged body 452 is moved by the driving of the conveyor device to which the supporting arms 464 are mounted, and synchronously therewith, the unillustrated holder moves. Namely, the temporarily packaged body 452 arrives at the deaerating/sealing portion 474, while the deaerating nozzle 486 is inserted in the opening portion 460 for a deaerating nozzle of the temporarily packaged body 452 and the fin portion 456 is nipped by the clamping portions 492 of the presser plates 490.

Due to the deaerating, the film 416 for packaging attempts to fit tightly to the paper roll 414. However, here, in the present embodiment, not only are the inner surfaces of the fin portion 456 sealed by the heat fusible resin, but also, the outer surfaces as well are sealed by the sealing agent, such that the outer surface sealed portion 416S is formed. Accordingly, the pillow-type packaged state (in particular, the gusset portion 454 and the fin portion 456) is not inadvertently destroyed by the deaeration, and the configuration of the pillow-type packaged state can be maintained without wrinkles forming.

Figure 58:
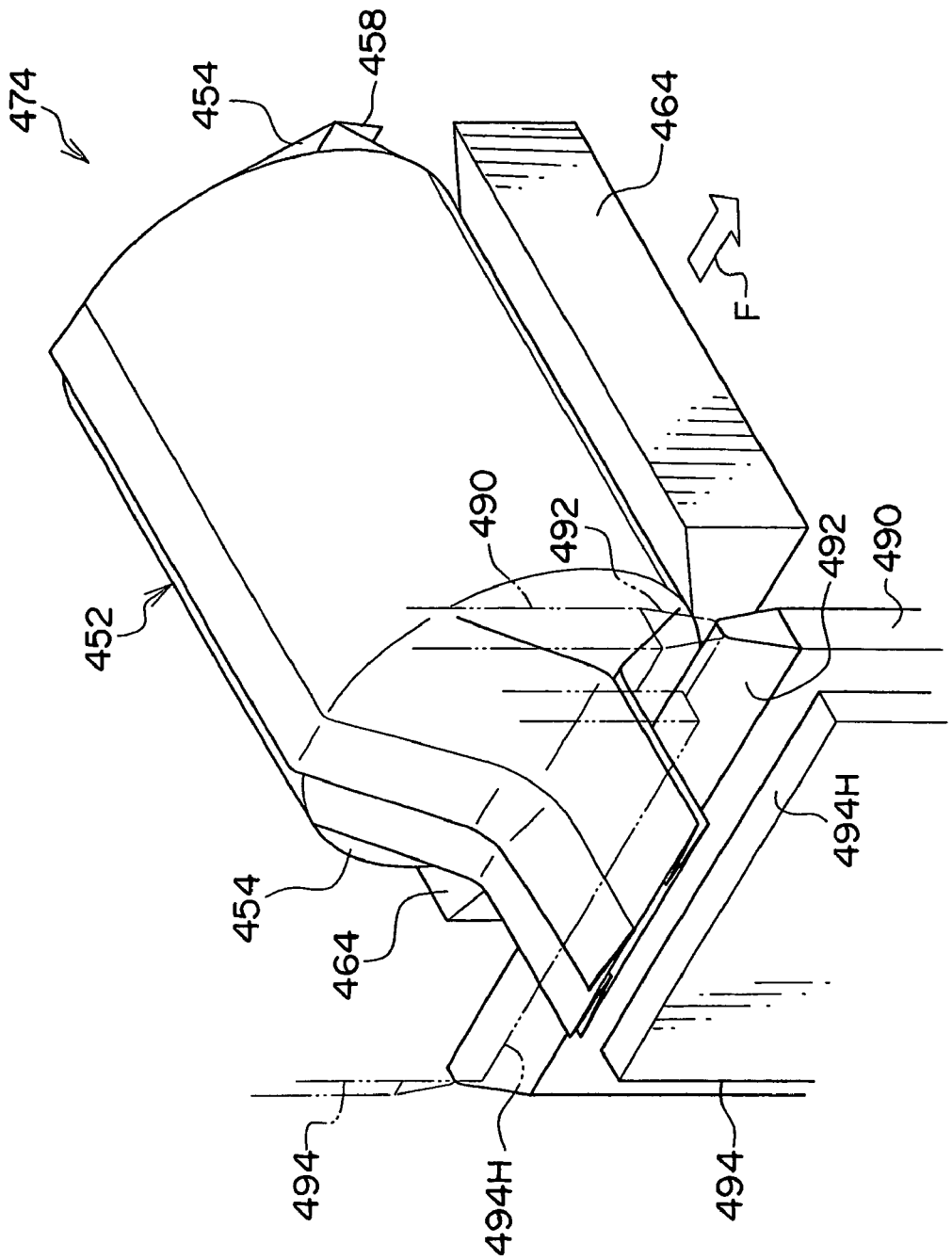
FIG. 58 is a perspective view showing the schematic structure of a deaerating/sealing portion of the deaerating/sealing device.
Figure 59:
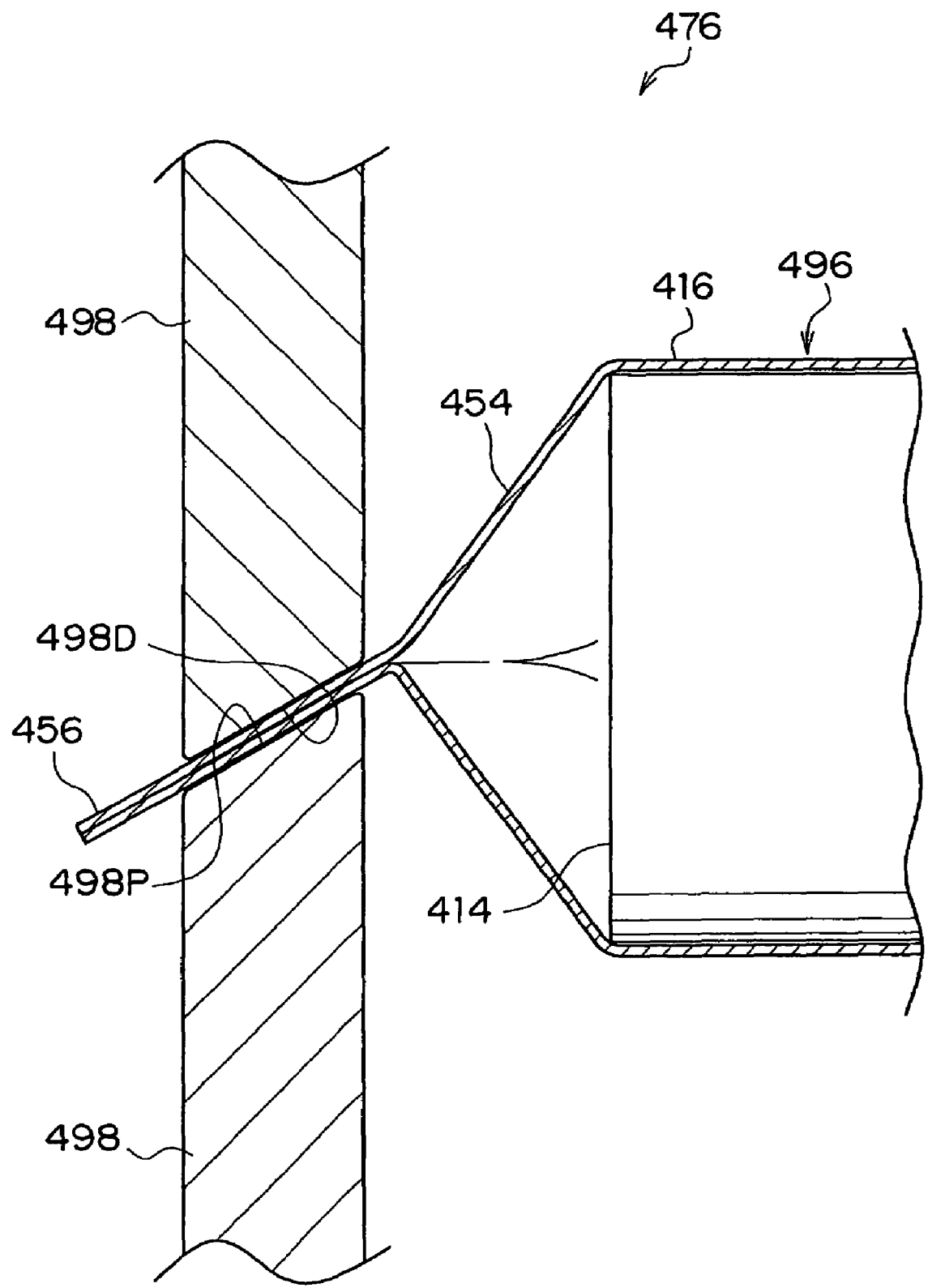
FIG. 59 is a perspective view showing the schematic structure of a fin folding portion of the deaerating/sealing device.
Figure 60:
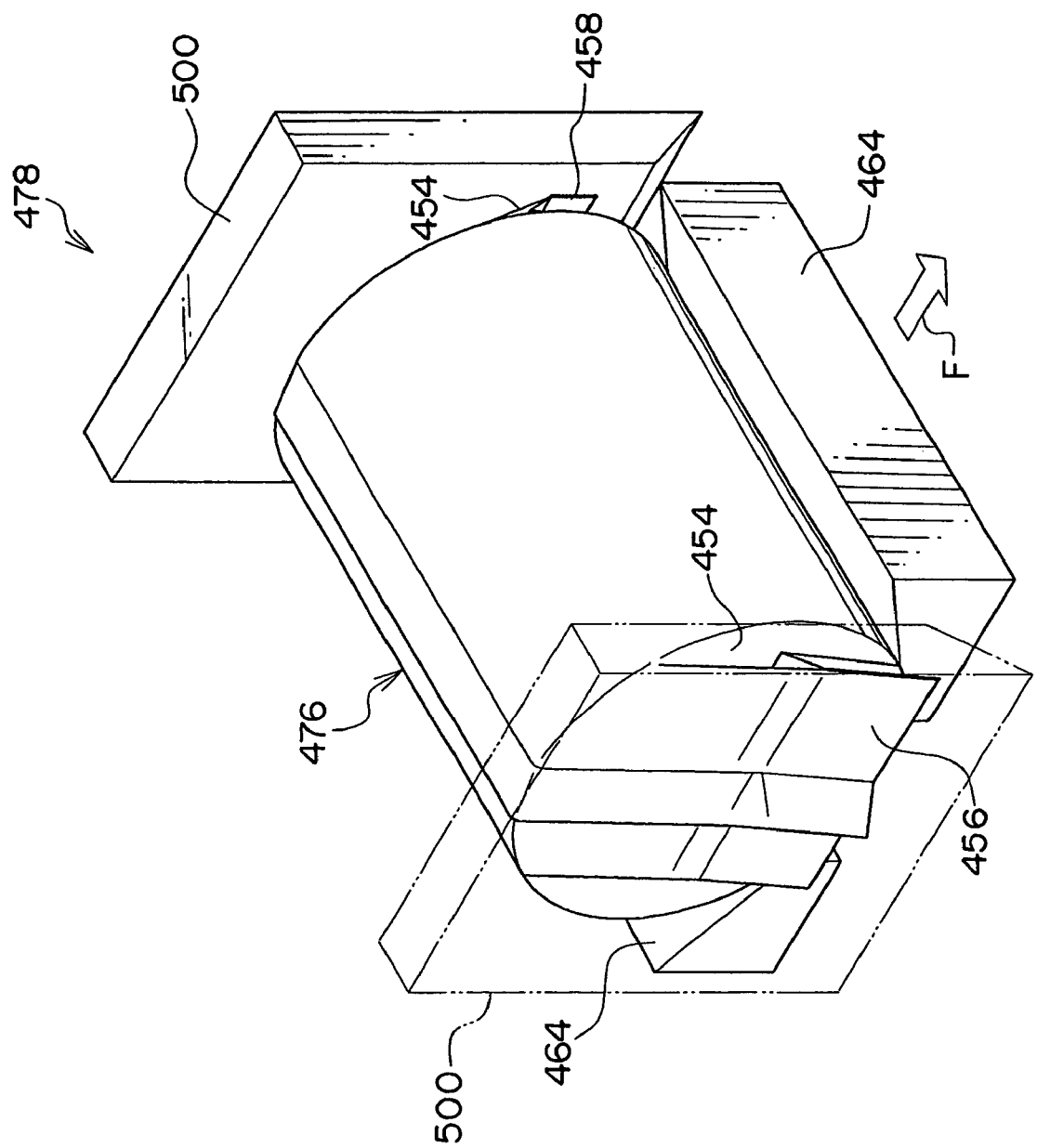
FIG. 60 is a perspective view showing the schematic structure of a fin pressing portion of the deaerating/sealing device.

As shown in FIG. 58, the deaerating/sealing portion 474 has a pair of heater blocks 494 which are disposed so as to be positioned above and below the fin portion 456. The heater blocks 494 are disposed further toward the distal end side of the fin portion 456 than the presser plates 490, and do not contact the presser plates 490 which have reached the deaerating/sealing portion 474. Further, the heater blocks 494 synchronously approach and move apart from one another, and nip the fin portion 456. The opposing portions of the heater blocks 494 are planar heater portions 494H which are heated to a temperature at which fusing of the heat fusible resin is possible.

When the temporarily packaged body 452 reaches the deaerating/sealing portion 474, first, the deaerating nozzle 486 is withdrawn from the opening portion 460 for a deaerating nozzle, and is pulled out from the opening portion 460 for a deaerating nozzle. Simultaneously with the pulling-out of the deaerating nozzle 486, the opening portion 460 for a deaerating nozzle is clamped by the elastic force of the clamping portions 492. Therefore, air does not inadvertently enter into the temporarily packaged body 452.

Next, the upper and lower heater blocks 494 approach one another and nip the fin portion 456. The heater portions 494H fuse the heat fusible resin thin film along the entire widthwise direction of the fin portion 456. Thus, the film 416 for packaging is fused at this portion, and the temporarily packaged body 452 is completely sealed in this deaerated state. After fusing, the presser plates 490 and the heater blocks 494 move apart.

In this way, when the temporarily packaged body 452 is sealed, the packaged paper roll 414 is isolated from the exterior, shielded from light, and kept moisture-proof by the film for packaging, and therefore does not deteriorate needlessly. Note that the packaging of the paper roll 414 is substantially completed at this stage. Thus, hereinafter, the film for packaging and the paper roll 414 which is packaged by the film for packaging will together be called an actually packaged body 496.

Next, due to the driving of the conveyor device, the actually packaged body 496 reaches the fin folding portion 476. The fin folding portion 476 has fin folding plates 498 which are disposed above and below the fin portions 456, 458, and which can move up and down by an unillustrated driving device so as to approach and move apart from each other. The opposing surfaces of the fin folding plates 498 are clamping surfaces 498P which are inclined and are maintained at a predetermined temperature. When the fin portions 456, 458 are clamped by the clamping surfaces 498P of the fin folding plates 498, the heat fusible resin thin film of the film 416 for packaging is folded along the clamping surfaces 498P due to the heat from the fin folding plates 498, such that a fold is formed therein.

Figure 61:
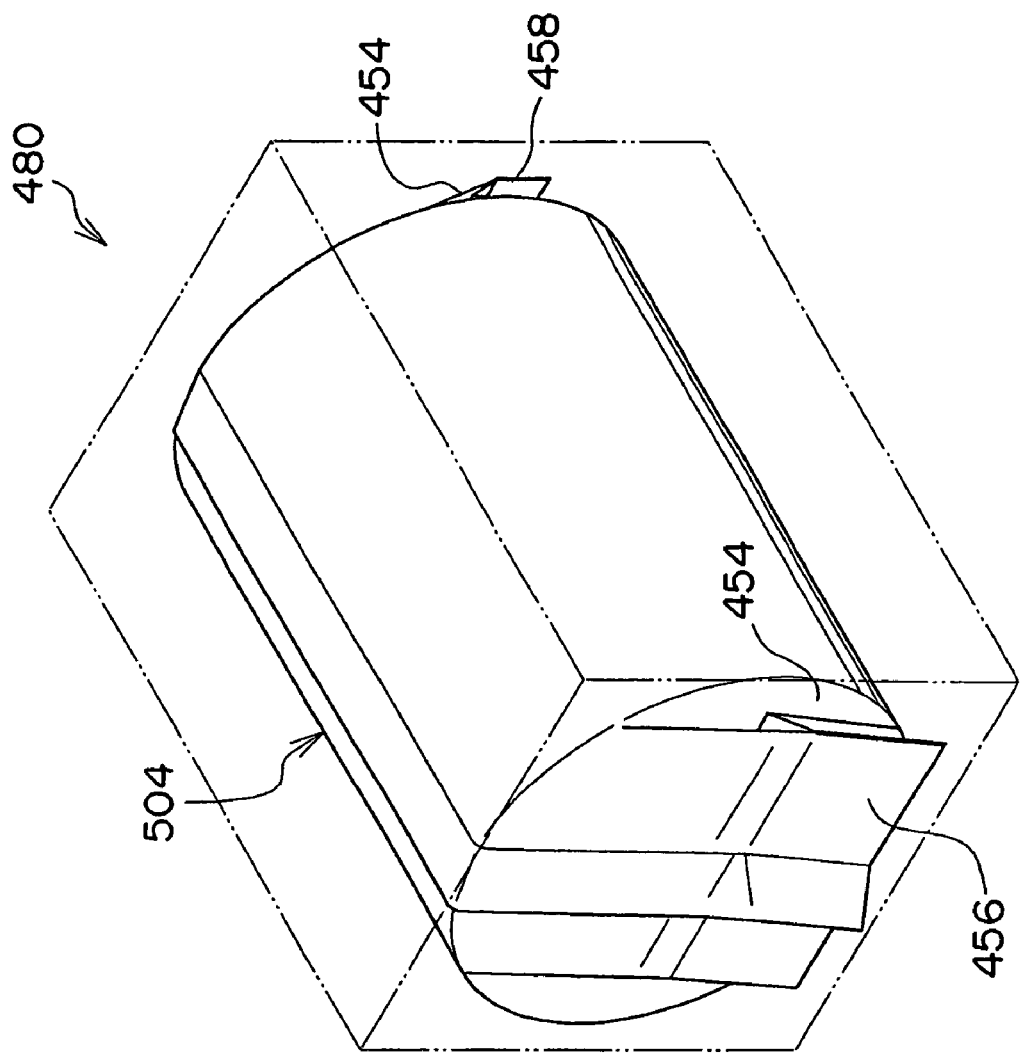
FIG. 61 is a perspective view showing a packaged structure obtained by the deaerating/packaging device of the fourth embodiment.
Figure 62:
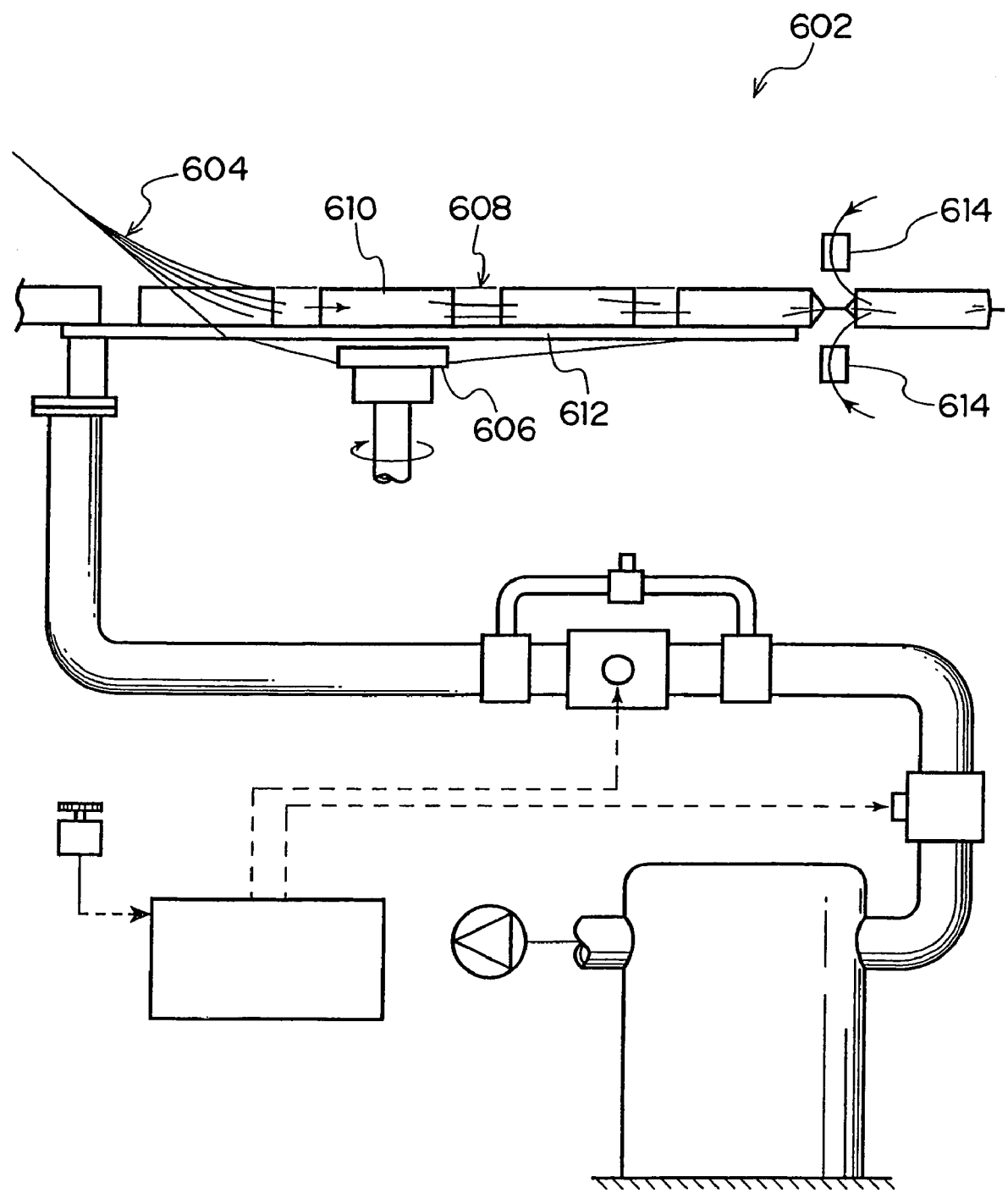
FIG. 62 is a schematic structural view showing a conventional deaerating/packaging device.

Further, due to the driving of the conveyor device, the actually packaged body 496 reaches the fin pressing portion 478. Presser plates 500 are disposed at the both axial direction sides of the actually packaged body 496 at the fin pressing portion 478. The presser plates 500 move along the axial direction of the actually packaged body 496 so as to approach and move apart from one another. At the positions at which the presser plates 500 are closest to each other, the presser plates 500 press and fold-in the fin portions 456, 458. In this way, the lengths by which the fin portions 456, 458 project outwardly can be shortened. By pressing the fins, the packaging of the paper roll 414 by the deaerating/packaging device 412 of the present embodiment is completed, and as shown in FIG. 61, a packaged structure 504 relating to the present embodiment is completed.

Finally, the actually packaged body 496 is discharged by the discharge portion 480 from the deaerating/sealing device 424, and is conveyed and discharged by a discharging conveyor 502. Of course, the discharging conveyor 502 does not absolutely have to be provided, and the actually packaged body 496 can be shipped or the like in the state of having been discharged from the discharge portion 480 of the deaerating/packaging device 412.

As is clear from the above description, in the deaerating/packaging device 412 of the present embodiment, the paper rolls 414 are temporarily packaged individually by the temporarily packaging device 422. In the state in which the temporarily packaged body 452 is formed, the only open portion formed at the temporarily packaged body 452 is the opening portion 460 for a deaerating nozzle. Accordingly, when the interior of the temporarily packaged body 452 is deaerated at the deaerating/sealing device 424, deaeration is carried out such that air does not inadvertently exist between the paper roll 414 and the film 416 for packaging, and the film 416 for packaging can be made to fit tightly to the paper roll 414.

In addition, in the deaerating/packaging device 412 of the present embodiment, even if the deaerating nozzle 486 is not inserted deep into the temporarily packaged body 452, the interior of the temporarily packaged body 452 can be deaerated. Accordingly, as can be understood from FIG. 57 as well, if the distal end of the deaerating nozzle 486 is positioned about at the fin portion 456, the amount of insertion of the deaerating nozzle 486 is sufficient. Thus, the ability of the film 416 for packaging to fit tightly to the paper roll 414 is not deteriorated by the deaerating nozzle 486.

In this way, in the state in which the interior of the temporarily packaged body 452 is deaerated, the film 416 for packaging is made to fit tightly to the paper roll 414 so as to form the actually packaged body 496. Thus, a so-called tight package can be formed.

Further, because the deaerating nozzle 486 is not inserted deep into the temporarily packaged body 452, the deaerating nozzle 486 does not contact the paper roll 414 and damage the paper roll 414.

In the above description, the paper roll 414 which is formed by TA paper is used as an example of the object-to-be-packaged which is packaged by the deaerating/packaging device 412 of the present invention. However, the object-to-be-packaged is of course not limited to the same. Similarly, the packaging material for packaging the object-to-be-packaged is not limited to the film 416 for packaging which has the above-described structure. An appropriate packaging material can be selected in light of the relationship with the object-to-be-packaged.

The packaged state at the time of packaging the object-to-be-packaged is not limited to the above-described pillow-type packaged state, and an appropriate form can be selected in accordance with the type of the object-to-be-packaged or the like. When a pillow-type packaged state is used, the packaging material can reliably be made to fit tightly to the object-to-be-packaged so as to correspond to variations in the configuration of the objects-to-be-packaged. Tight packaging is possible even if, for example, the objects-to-be-packaged have different sizes or configurations.

When the pillow-type packaged state is used, as in the present embodiment, if the fin portion 456 is sealed before deaeration, the configuration of the gusset portion 454 and the fin portion 456 is not destroyed at the time of deaeration, and the configuration of the pillow-type packaged state can be maintained. Therefore, this is preferable. In particular, in the present embodiment, because not only the inner surfaces of the film 416 for packaging, but also the outer surfaces are sealed, it is possible to maintain the configurations of the gusset portions 454 even more reliably. Of course, in cases in which destruction of the gusset portions 454 can be prevented by sealing only the inner surfaces, there is no need to seal the outer surfaces, and a film in which a sealing agent is not coated on the outer surfaces thereof can be used as the film for packaging. Further, the structure for sealing the inner surfaces can be appropriately selected in accordance with the structure of the packaging material. For example, when using a packaging material which does not have a heat fusible resin thin film, the packaging material can be sealed by coating a sealing agent on the inner surfaces. In any case, it is preferable to use, as the packaging material, a material having good sealability in accordance with the specific structure for sealing.

The position at which sealing is carried out also is not particularly limited, provided that it is a position such that destruction of the configurations of the gusset portions 454 can be prevented. From this standpoint, the sealing position is preferable a position as near as possible to the object-to-be-packaged, within a range in which the object-to-be-packaged can be packaged reliably.

If the size of the opening portion 460 for a deaerating nozzle (or, the space between the two temporary heat sealing portions 440) is made larger, the relative positional offset between the deaerating nozzle 486 and the opening portion 460 for a deaerating nozzle can be eliminated, and the deaerating nozzle 486 can reliably be inserted into the opening portion 460 for a deaerating nozzle. However, if the size is too large, it is easy for wrinkles to form at the opening portion 460 for a deaerating nozzle at the time the opening portion 460 for a deaerating nozzle is sealed. Accordingly, in order to achieve both, it preferable that the size of the opening portion 460 for a deaerating nozzle falls within a predetermined range. For example, if the deaerating nozzle 486 which is tubular is used, the space between the two temporary heat sealing portions 440 is preferably two to three times the outer diameter of the deaerating nozzle 486. Accordingly, if the outer diameter of the deaerating nozzle 486 is 8 mm for example, the space between the two temporary heat sealing portions 440 is preferably 16 to 24 mm.

Further, in order for a portion which is point sealed to not inadvertently peel apart even though the surface area which is sealed is small, it is preferable to apply a local pressing force by, for example, forming convex and concave portions at the heater portions 448H of the heater blocks 448, or the like.

Moreover, the deaerating/packaging method of the present invention can of course be carried out by the above-described deaerating/packaging device 412, but may be implemented without using the deaerating/packaging device 412. For example, some or all of the steps of the deaerating/packaging method may be carried out manually by an operator.

Because the present invention has the above-described structure, an object-to-be-packaged can be packaged in a state in which a packaging material is fit tightly thereto, and damage to the object-to-be-packaged can be prevented.

What is claimed is:

1. A roll winding offset measuring device comprising:
   a displacement measuring device disposed so as to oppose one end surface of a roll formed by winding a strip-shaped sheet onto a winding core, the displacement measuring device linearly scanning the one end surface of the roll substantially parallel to the one end surface of the roll from a center to an outer side or from an outer side to the center, and measuring, without contact, a distance from a predetermined reference plane, which is substantially parallel to the one end surface of the roll, to each sheet end surface portion projecting outwardly in a roll axial direction; and
   a computing device which, on the basis of measured data of each distance, determines a magnitude of winding offset of the sheet at the one end surface of the roll.

2. The device of claim 1, further comprising a goodness/poorness judging device which judges whether the roll is good or poor on the basis of the magnitude of the winding offset.

3. The device of claim 1, wherein the displacement measuring device has a first scanning speed $v_1$, at which the displacement measuring device scans a winding core portion and a portion where sheet winding starts, and a second scanning speed $v_2$, at which the displacement measuring device scans a portion at an outer side of the portion where sheet winding starts, and the first scanning speed $v_1$ is lower than the second scanning speed $v_2$.

4. The device of claim 1, wherein the displacement measuring device is an optical displacement measuring means for measuring distance by illuminating light to the end surface of the roll.

5. The device of claim 1, wherein the winding core is a paper tube.

6. The device of claim 1, wherein the sheet is an information recording paper.

7. The device of claim 3, wherein the first scanning speed $v_1$ is ⅕ or less of the second scanning speed $v_2$.

8. The device of claim 3, wherein the first scanning speed $v_1$ is 10 mm/sec or less.

9. The device of claim 1, wherein the computing device:
   (a) divides obtained distance data into distance data of a winding core portion and distance data of a sheet wound portion, on the basis of thickness data of the winding core which is inputted in advance;
   (b) determines a maximum distance $d_1$, which is a distance of a portion which projects the most outwardly in an axial direction of the roll, among the distance data of the winding core portion;
   (c) determines a maximum distance $d_2$, which is a distance of a portion which projects the most outwardly in the axial direction of the roll, among the distance data of the sheet wound portion; and
   (d) determines a difference $\Delta d$ between the maximum distances $d_2$ and $d_1$, and uses the difference $\Delta d$ as the magnitude of the winding offset.

10. The device of claim 9, wherein a goodness/poorness judging device judges that the roll is a good article when the difference $\Delta d$ is a predetermined stipulated value or less, and judges that the roll is a poor article when the difference $\Delta d$ is greater than the stipulated value.

11. The device of claim 9, wherein the computing device determines a valid distance data range from an outer diameter of the roll and an inner diameter of the winding core which are inputted in advance, and determines the maximum distances $d_1$ and $d_2$ from distance data which falls within the valid distance data range.

* * * * *